(12) United States Patent
Kazerooni et al.

(10) Patent No.: US 8,801,641 B2
(45) Date of Patent: Aug. 12, 2014

(54) EXOSKELETON AND METHOD FOR CONTROLLING A SWING LEG OF THE EXOSKELETON

(75) Inventors: Homayoon Kazerooni, Berkeley, CA (US); Kurt Amundson, Berkeley, CA (US); Russdon Angold, American Canyon, CA (US); Nathan Harding, Oakland, CA (US)

(73) Assignees: Ekso Bionics, Inc., Richmond, CA (US); The Regents of the University of California, Oakland, CA (US)

( * ) Notice: Subject to any disclaimer, the term of this patent is extended or adjusted under 35 U.S.C. 154(b) by 609 days.

(21) Appl. No.: 12/922,918

(22) PCT Filed: Jul. 23, 2009

(86) PCT No.: PCT/US2009/051563
§ 371 (c)(1),
(2), (4) Date: Sep. 16, 2010

(87) PCT Pub. No.: WO2010/011848
PCT Pub. Date: Jan. 28, 2010

(65) Prior Publication Data
US 2011/0105966 A1 May 5, 2011

Related U.S. Application Data

(60) Provisional application No. 61/129,843, filed on Jul. 23, 2008.

(51) Int. Cl.
*A61H 1/02* (2006.01)
*A61H 3/00* (2006.01)
*B25J 9/00* (2006.01)

(52) U.S. Cl.
CPC ........ *A61H 3/008* (2013.01); *A61H 2201/5071* (2013.01); *A61H 2201/1614* (2013.01); *A61H 2201/165* (2013.01); *A61H 2201/1623* (2013.01); *A61H 2201/1642* (2013.01); *A61H 2201/1246* (2013.01); *A61H 2201/1676* (2013.01); *A61H 2201/1215* (2013.01); *A61H 2003/002* (2013.01); *A61H 1/0244* (2013.01); *A61H 2201/0165* (2013.01); *A61H 2201/1621* (2013.01); *A61H 2201/1628* (2013.01); *A61H 1/0255* (2013.01); *A61H 2201/1238* (2013.01); *A61H 2201/5056* (2013.01); *A61H 2201/164* (2013.01); *B25J 9/0006* (2013.01); *A61H 2201/5051* (2013.01); *A61H 2201/5061* (2013.01); *A61H 3/00* (2013.01)
USPC ........ 601/35; 601/5; 601/33; 602/16; 602/23; 128/898

(58) Field of Classification Search
CPC ....... A61H 3/00; A61H 3/008; A61H 1/0266; A61H 2201/1676; A61H 2201/1246; A61H 2201/5051; A61H 2201/5056; A61H 2201/5061; A61H 2201/5071; A61H 2201/1614; A61H 2201/0165; A61H 2201/1215; A61H 2201/1238; A61H 2201/1621; A61H 2201/1623; A61H 2201/1628; A61H 2201/164; A61H 2201/1642; A61H 2201/165; A61H 2003/022; B25J 9/006; B25J 9/104
USPC .............. 601/5, 23, 24, 33, 34, 35; 602/5, 16, 602/23–26; 128/898
See application file for complete search history.

(56) References Cited

U.S. PATENT DOCUMENTS

| | | |
|---|---|---|
| 2,010,482 A | 8/1935 | Cobb |
| 2,305,291 A | 12/1942 | Filippi |
| 2,573,866 A | 11/1951 | Murphy |
| 4,557,257 A | 12/1985 | Fernandez et al. |
| 4,647,004 A | 3/1987 | Bihlmaier |
| 4,872,665 A | 10/1989 | Chareire |
| 5,020,790 A | 6/1991 | Beard et al. |
| 5,282,460 A | 2/1994 | Boldt |
| 5,476,441 A | 12/1995 | Durfee et al. |
| 5,658,242 A | 8/1997 | McKay et al. |
| 5,662,693 A | 9/1997 | Johnson et al. |
| 5,704,945 A | 1/1998 | Wagner et al. |
| 5,888,212 A | 3/1999 | Petrofsky et al. |
| 5,961,476 A | 10/1999 | Betto et al. |

| | | | |
|---|---|---|---|
| 6,821,233 | B1 | 11/2004 | Colombo et al. |
| 6,966,882 | B2 | 11/2005 | Horst |
| 7,048,707 | B2 | 5/2006 | Schwenn et al. |
| 7,135,003 | B2 | 11/2006 | Dariush |
| 7,153,242 | B2 | 12/2006 | Goffer |
| 7,190,141 | B1 | 3/2007 | Ashrafiuon et al. |
| 7,198,071 | B2 | 4/2007 | Bisbee, III et al. |
| 7,217,247 | B2 | 5/2007 | Dariush et al. |
| 7,313,463 | B2 | 12/2007 | Herr et al. |
| 7,390,309 | B2 | 6/2008 | Dariush |
| 7,393,335 | B2 | 7/2008 | Carvey et al. |
| 7,404,782 | B2 | 7/2008 | Kudoh et al. |
| 7,416,538 | B2 | 8/2008 | Katoh et al. |
| 7,628,776 | B2 | 12/2009 | Gibson et al. |
| 7,713,217 | B2 | 5/2010 | Ikeuchi et al. |
| 8,070,700 | B2 | 12/2011 | Kazerooni et al. |
| 8,257,294 | B2 | 9/2012 | Brehm |
| 2003/0093021 | A1 | 5/2003 | Goffer |
| 2004/0116839 | A1 | 6/2004 | Sarkodie-Gyan |
| 2006/0004307 | A1 | 1/2006 | Horst |
| 2006/0052732 | A1 | 3/2006 | Shimada et al. |
| 2006/0211956 | A1 | 9/2006 | Sankai |
| 2006/0249315 | A1 | 11/2006 | Herr et al. |
| 2006/0260620 | A1 | 11/2006 | Kazerooni et al. |
| 2006/0276728 | A1* | 12/2006 | Ashihara et al. .................. 601/5 |
| 2007/0056592 | A1 | 3/2007 | Angold et al. |
| 2007/0078351 | A1* | 4/2007 | Fujita et al. ................... 600/500 |
| 2007/0123997 | A1* | 5/2007 | Herr et al. ........................ 602/16 |
| 2007/0162152 | A1 | 7/2007 | Herr et al. |
| 2007/0233279 | A1 | 10/2007 | Kazerooni et al. |
| 2008/0009771 | A1 | 1/2008 | Perry et al. |
| 2008/0154165 | A1 | 6/2008 | Ashihara et al. |
| 2009/0292369 | A1 | 11/2009 | Kazerooni et al. |
| 2010/0094185 | A1 | 4/2010 | Amundson et al. |

OTHER PUBLICATIONS

Relationship between muscle fatigue and oxygen uptake (European Journal of Applied Physiology—1992—65:335-339).*

Gregorczyk et al., "The Effects of a Lower Body Exoskeleton Load Carriage Assistive Device on Oxygen Consumption and Kinematics During Walking with Loads," *25th Army Science Conference*, Florida, USA. 2006.

Walsh et al., "A Quasi-Passive Leg Exoskeleton for Load-Carrying Augmentation," International Journal of Humanoid Robotics, 2007.

"Exoskeleton Prototype Project: Final Report on Phase I," (Oct. 1966). Contract No. N00014-66-C0051, Mechanical Equipment Branch, Mechanical Technology Laboratory, Research and Development Center, General Electric Company: Schenectady, New York, pp. 1-72.

"Machine Augmentation of Human Strength and Endurance: Hardiman I Prototype Project," (Jul. 1969). ONR Contract No. N00014-66-C0051, Specialty Materials Handling Products Operation, General Electric Company: Schenectady, New York, 60 pgs.

"Research and Development Prototype for Machine Augmentation of Human Strength and Endurance: Hardiman I Project," (May 1971). ONR Contract No. N00014-66-C0051, Specialty Materials Handling Products Operation, General Electric Company, Schenectady, New York, pp. 1-25.

Agrawal, A. et al. (Jul. 2005). "Design of a Two Degree-of-freedom Ankle-Foot Orthosis for Robotic Rehabilitation." *Proceedings of the 2005 IEEE 9th International Conference on Rehabilitation Robotics*, Chicago, Illinois, pp. 41-44.

Arroyo, P. (Dec. 1998). "Design of a Minimally Actuated Assistive Walking Device," Masters of Science Thesis submitted to the Graduate School at the University of California, Berkeley, 25 pgs.

Belforte, G. et al. (2001). "Pneumatic Active Gait Orthosis," *Mechatronics* 11:301-323.

Bharadwaj, K. et al. (Nov. 2005). "Design of a Robotic Gait Trainer using Spring Over Muscle Actuators for Ankle Stroke Rehabilitation." *Journal of Biomechanical Engineering*, vol. 127, pp. 1009-1013.

Chu, A. (Apr. 2003). "Design Overview of 1$^{st}$ Generation Exoskeleton," Master of Science Thesis submitted to the Mechanical Engineering Department at the University of California, Berkeley, pp. 1-62.

Clark, D. C. et al. (Aug. 1962). "Exploratory Investigation of the Man Amplifier Concept," Technical Documentary Report No. AMRL-TDR-62-89, Behavioral Science Laboratory, Aerospace Medical Division, Air Force Systems Command, Wright-Patterson Air Force Base: Ohio, 81 pgs.

Croshaw, P.F. (Jul. 1969). "Hardiman I Arm Test: Hardiman I Prototype Project." General Electric Company, Schenectady, New York.

Crowell, H.P. et al. (Nov. 2002). "Exoskeleton Power and Torque Requirements Based on Human Biomechanics." Army Research Laboratory, ARL-TR-2764.

Dollar, A.M. et al, (Feb. 2008). "Lower-Extremity Exoskeletons and Active Orthoses: Challenges and State of the Art." *IEEE Transactions on Robotics*, vol. 24, No. 1, pp. 144-158.

Donelan, J.M. et al. (2002). "Simultaneous Positive and Negative External Mechanical Work in Human Walking." *Journal of Biomechanics*, vol. 35, pp. 117-124.

Durfee, W.K. et al. (2004). "Preliminary Design and Simulation of a Pneumatic, Stored-energy, Hybrid Orthosis for Gait Restoration." *Proceedings of the 2004 ASME International Mechanical Engineering Congress*, Anaheim, California.

Endo, K., et al. (Oct. 2006). "A Quasi-passive Model of Human Leg Function in Level-ground Walking." *Proceedings of the 2006 IEEE/RSJ International Conference on Intelligent Robots and Systems*, Beijing, China, pp. 4935-4939.

Ferris, D. et al. (Aug. 2001). "An Ankle-foot Orthosis Powered by Artificial Muscles," *Proceedings of the 25$^{th}$ Annual Meeting of the American Society of Biomechanics*, 2 pgs.

Ferris, D.P. et al. (2005). "Powered Lower Limb Orthoses for Gait Rehabilitation." *Top Spinal Cord Injury Rehabilitation*, vol. 11, No. 2, pp. 34-49.

Ferris, D.P. et al. (2006). "An Improved Powered Ankle-foot Orthosis using Proportional Myelectric Control." *Gait & Posture*, vol. 23, pp. 425-428.

Gotschall, J.S. et al. (2003). "Energy Cost and Muscular Activity Required for Propulsion During Walking." *Journal of Applied Physiology*, No. 94, pp. 1766-1772.

Griffin, T.M. et al. (Jan. 1999). "Walking in Simulated Reduced Gravity: Mechanical Energy Fluctuations and Exchange." *The Journal of Applied Physiology*, vol. 86, pp. 383-390.

Grundman, J. et al. (1987). "Computer Control of Multi-task Exoskeleton for Paraplegics." *Theory and Practice of Robots and Manipulators, Proceedings of RoManSy 1986—6$^{th}$ CISM-IFToMM Symposium*, The MIT Press, pp. 233-240.

Harley, J. A. (Aug. 1995). "Design and Construction of an Underactuated Assistive Walking Device," Master of Science Thesis submitted to the Graduate School at the University of California, Berkeley, pp. 1-31.

Hesse, S. et al. (Dec. 2003). "Upper and Lower Extremity Robotic Devices for Rehabilitation and for Studying Motor Control." *Current Opinion in Neurology*, vol. 16, No. 6, pp. 705-710.

Hill, J.W. (1987). "Hydraulically Powered Lower Limb Orthosis." *Theory and Practice of Robots and Manipulators, Proceedings of RoManSy 1986—6$^{th}$ CISM-IFToMM Symposium*, The MIT Press, pp. 182-192.

Hollander K. et al. (2006). "An Efficient Robotic Tendon for Gait Assistance." *Journal of Biomechanical Engineering*, vol. 128, No. 5, pp. 788-791.

Irby, S. et al. (Jun. 1999). "Automatic Control Design for a Dynamic Knee-Brace System," *IEEE Transactions on Rehabilitation Engineering* 7(2):135-139.

Jaukovic, N.D. (1981), "Active Peroneal Orthosis." *Proceedings of the International Symposium on External Control of Human Extremities*, pp, 13-20.

Johnson, D. et al. (1996). "Development of a Mobility Assist for the Paralyzed, Amputee, and Spastic Patient," *IEEE Proceedings of the 15$^{th}$ Southern Biomedical Engineering Conference*, pp. 67-70.

Kasaoka, K. et al. (2001). "Predictive Control Estimating Operator's Intention for Stepping-up Motion by Exoskeleton Type Power Assist System HAL," *Proceedings of the 2001 IEEE/RJS: International Conference on Intelligent Robots and Systems*, Maui, Hawaii, pp. 1578-1583.

Kawamoto, H. et al. (2002). "Power Assist System HAL-3 for Gait Disorder Person," Lecture Notes in Computer Science (LNCS), *Proceedings of the Eighth International Conference on Computers Helping People with Special Needs (ICCHP), 2398:196-203.

Kawamoto, H. et al. (2002). "Comfortable Power Assist Control Method for Walking Aid by HAL-3," *IEEE Proceedings of the International Conference on Systems, Man, and Cybernetics (SMC)*, 6 pgs.

Kawamoto, H. et al. (2003). "Power Assist Method for HAL-3 Using EMG-Based Feedback Controller." *Proceedings of the IEEE International Conference on Systems, Man and Cybernetics*, pp. 1648-1653.

Kawamoto, H. et al. (Nov. 2003). "Power Assist Method for HAL-3 Estimating Operator's Intention Based on Motion Information." *Proceedings of the 2003 IEEE International Workshop on Robot and Human Interactive Communication*, Millbrae, California, pp. 67-72.

Kazerooni, H. et al. (Apr. 2005). "On the Control of Berkeley Lower Extremity Exoskeleton (BLEEX)," *Proceedings of IEEE International Conference on Robotics and Automation*, Barcelona, Spain, pp. 4364-4371.

Kazerooni, H. et al. (Mar. 2006). "The Berkeley Lower Extremity Exoskeletons." *ASME Journal of Dynamics Systems, Measurements and Control*, vol. 128, pp. 14-25.

Kazerooni, H. et al. (Jan. 2007). "That which does not stabilize, will only make us stronger." *The International Journal of Robotics Research*, vol. 26, No. 1, pp. 75-89.

Kosso, E.V. (1973). "A Minimum Energy Exoskeleton." *Proceedings of the 1973 Carnahan Conference on Electronic Prosthetics*, pp. 86-89.

Kuo, A.D. (Feb. 2002). "Energetics of Actively Powered Locomotion Using the Simplest Walking Model." *Journal of Biomechanical Engineering*, vol. 124, pp. 113-120.

Lazarevic, S.R. et al. (1978). "Logic Control of Partial Active Orthoses via Real Time Computing Systems." *Proceedings of the International Symposium on External Control of Human Extremities*, pp. 247-257.

Lee, S, et al. (Oct. 2002). "Power Assist Control for Leg with HAL-3 Based on Virtual Torque and Impedence Adjustment." *Proceedings of 2002 IEEE Conference on Systems, Man and Cybernetics*, vol. 4, pp. 6-9.

Lee, S. et al. (Oct. 2002). "Power Assist Control for Walking Aid with HAL-3 Based on EMG and Impedence Adjustment Around Knee Joint," *Proceedings of the IEEE/RJS International Conference on Intelligent Robots and Systems (IROS)*, Lausanne, Switzerland, pp. 1499-1504.

Lim, M. Z. M. (Dec. 2000). "An Analysis on the Performance of an Underactuated Lower Extremity Enhancer," Master of Science Thesis submitted to the Mechanical Engineering Department at the University of California, Berkeley, pp. 1-33.

Liu, X. et al. (Oct. 2004). "Development of a Lower Extremity Exoskeleton for Human Performance Enhancement." *Proceedings of IEEE/RSJ International Conference on Intelligent Robots and Systems*, Sendal, Japan, pp. 3889-3894.

Low, K.H. et al. (Jul. 2005). "Development of NTU Wearable Exoskeleton System for Assistive Technologies." *Proceedings of the IEEE International Conference on Mechatronics & Automation*, Niagara Falls, Canada, pp. 1099-1106.

Misuraca, J. et al. (Nov. 2001). "Lower Limb Human Muscle Enhancer," *Proceedings of IMECE01: International Mechanical Engineering Conference and Exposition*, New York, New York, pp. 1-7.

Mori, Y. (Apr. 2004), "Development of Straight Style Transfer Equipment for Lower Limbs Disabled," *Proceedings of the 2004 IEEE International Conference on Robotics and Automation*, New Orleans, Louisiana, pp. 2486-2491.

Morris, S. et al. (Oct. 2002). "Shoe-Integrated Sensor System for Wireless Gait Analysis and Real-Time Feedback," *Proceedings of the Second Joint EMBS/BMES Conference*, Houston, Texas, pp. 2468-2469.

Mosher, R. S. (Jan. 1967). "Handyman to Hardiman," *Automotive Engineering Congress, Society of Automotive Engineers*, Detroit, Michigan, pp. 1-12.

Naruse, K. et al. (Nov. 2003). "Design of Compact and Lightweight Wearable Power Assist Device," *Proceedings of IMECE '03, 2003 ASME International Mechanical Engineering Congress and Exposition*, Washington, D.C., pp. 1-8.

Popovic, D. et al. (1990). "Powered Hybrid Assistive System." *Proceedings of the International Symposium on External Control of Human Extremities*, pp. 177-186.

Pratt, J. E. et al. (Apr. 2004). "The RoboKnee: An Exoskeleton for Enhancing Strength and Endurance During Walking," *Proceedings of the IEEE International Conference on Robotics and Automation*, New Orleans, Louisiana, pp. 2430-2435.

Rabischong, J.P. et al. (1975) "The Amoil Project." *Proceedings of the $5^{th}$ International Symposium on External Control of Human Extremities*, ETAN, Dubrovnik, Yugoslavia.

Rabischong, E. et al. (1990). "Control and Command of a Six Degrees of Freedom Active Electrical Orthosis for Paraplegic Patient." *Proceedings of IEEE International Workshop on Intelligent Robots and Systems*, pp. 987-991.

Racine, J. L. C. (2003). "Control of a Lower Exoskeleton for Human Performance Amplification," PhD Thesis submitted to the University of California, Berkeley, pp. 1-832.

Rehnmark, F. L. (May 1997). "Dynamic Simulation and Design of a Powered Underactuated Assistive Walking Device," Master of Science Thesis submitted to the Graduate School at the University of California, Berkeley, pp. 1-35.

Saito, Y. et al. (Jul. 2005). "Development of Externally Powered Lower Limb Orthosis with Bilateral-servo Actuator," *Proceedings of the IEEE $9^{th}$ International Conference on Rehabilitation Robotics*, Chicago, Illinois, pp. 394-399.

Sawicki, G.S. et al. (Jul. 2005). "Powered Lower Limb Orthoses: Applications in Motor Adaptation and Rehabilitation." *Proceedings of the 2005 IEEE $9^{th}$ International Conference on Rehabilitation and Robotics*, Chicago, Illinois, pp. 206-211.

Valiente, A. (2005). "Design of a Quasi-Passive Parallel Leg Exoskeleton to Augment Load Carrying for Walking." Graduate Thesis, Massachusetts Institute of Technology, Department of Mechanical Engineering.

Van Den Bogert, A. J. (Oct. 2003). "Exotendons for Assistance of Human Locomotion," *Biomedical Engineering Online* 2(17):1-8.

Vukobratovic, M. et al. (Jan. 1974). "Development of Active Anthropomorphic Exoskeletons," *Medical and Biological Engineering*, pp. 66-80.

Vukobratovic, M. et al. (1981). "New Model of Autonomous 'Active Suit' for Distrophic Patients." *Proceedings of the International Symposium on External Control of Human Extremities*, pp. 32-42.

Vukobratovic, M. et al. (2002). "Humanoid Robots," The Mechanical Systems Design Handbook: *Modeling, Measurement and Control*, CRC Press, Chapter 27.

Walsh, C.J. et al. (2006). "Biomimetic Design of an Under-Actuated Leg Exoskeleton for Load-Carrying Augmentation." Graduate Thesis, Trinity College Dublin, Department of Mechanical Engineering.

Walsh, C.J. et al. (May 2006). "Development of a Lightweight, Underactuated Exoskeleton for Load-carrying Augmentation," *Proceedings of the 2006 IEEE International Conference on Robotics and Automation*, Orlando, Florida, pp. 3485-3491.

Walsh, C.J. et al. (Oct. 2006). "An Autonomous, Underactuated Exoskeleton for Load-carrying Augmentation." *Proceedings of the 2006 IEEE/RSJ International Conference on Intelligent Robots and Systems*, Beijing, China, pp. 1410-1415.

Yamamoto, K. et al. (2002). "Development of Power Assisting Suit for Assisting Nurse Labor," *JSME International Journal*, Series C, 45(3):703-711.

Yamamoto, K. et al. (2003). "Development of Power Assisting Suit (Miniaturization of Supply System to Realize Wearable Suit)," *JSME International Journal*, Series C, 46(3):923-930.

Zoss, A. (2003). "Mechanical Design Implementation of an Exoskeleton," Master of Science Thesis submitted to the University of California, Berkeley, pp. 1-140.

Zoss, A. et al. (Apr. 2006). "Biomechanical Design of the Berkeley Lower Extremity Exoskeleton (BLEEX)." *IEEE/ASME Transactions of Mechatronics*, vol. 11, No. 2, pp. 128-138.

* cited by examiner

Primary Examiner — Quang D Thanh
(74) Attorney, Agent, or Firm — Diederiks & Whitelaw, PLC

(57) ABSTRACT

A lower extremity exoskeleton, configurable to be coupled to a person, includes two leg supports configurable to be coupled to the person's lower limbs, an exoskeleton trunk configurable to be coupled to the person's upper body, which is rotatably connectable to the thigh links of the leg supports allowing for the flexion and extension between the leg supports and the exoskeleton trunk, two hip actuators configured to create torques between the exoskeleton trunk and the leg supports, and at least one power unit capable of providing power to the hip actuators wherein the power unit is configured to cause the hip actuator of the leg support in the swing phase to create a torque profile such that force from the exoskeleton leg support onto the person's lower limb during at least a portion of the swing phase is in the direction of the person's lower limb swing velocity.

9 Claims, 39 Drawing Sheets

EXOSKELETON AND METHOD FOR CONTROLLING A SWING LEG OF THE EXOSKELETON

CROSS-REFERENCE TO RELATED APPLICATIONS

This application represents a National Stage application of PCT/US2009/051563 entitled "An Exoskeleton and Method for Controlling a Swing Leg of the Exoskeleton" filed Jul. 23, 2009 which claims the benefit of U.S. Provisional Patent Application No. 61/129,843 entitled A METHOD FOR CONTROLLING THE SWING LEG OF AN EXOSKELETON, filed Jul. 23, 2008.

BACKGROUND OF THE INVENTION

1. Field of the Invention

The present invention relates generally to exoskeleton systems that decrease the wearer's energy expenditure. More specifically, this invention describes an exoskeleton that, among other components, includes two hip actuators to power its leg supports and decreases the wearer's energy expenditure during the swing phase of the exoskeleton leg support. Since a person's oxygen consumption is related to the locomotion energy expenditure, the exoskeleton described here decreases a person's oxygen consumption when it is worn by the person for locomotion.

2. Discussion of the Prior Art

In a wide variety of situations, people of ordinary ability often consume a great deal of energy when walking or carrying a load. U.S. Patent Application Publication No. 2006/0260620 entitled "Lower Extremety Exoskeleton" filed on Apr. 1, 2009 and incorporated herein by reference, describes several embodiments of exoskeleton systems that allow their wearers to carry heavy loads. A paper entitled "The Effects of a Lower Body Exoskeleton Load Carriage Assistive Device on Oxygen Consumption and Kinematics During Walking With Loads," K. N. Gregorczyk, J. P. Obusek, L. Hasselquist, J. M. Schiffman, C. K. Bensel, D. Gutekunst and P. Frykman, 25th Army Science Conference, Florida, USA, 2006, reports a set of experiments on an exoskeleton that was designed and built primarily based on U.S. Patent Application Publication No. 2006/0260620. The authors (all from Natick Soldier System Center) state that the exoskeleton that is built based on the '620 Publication increases the wearers' energy expenditure, although it increases the load carrying ability of its wearer. Another attempt to improve load carrying ability is set forth in the paper entitled "A QUASI-PASSIVE LEG EXOSKELETON FOR LOAD-CARRYING AUGMENTATION", C. J. Walsh, K. Endo, and H. Herr, International Journal of Humanoid Robotics, 2007. However, the quasi-passive exoskeleton taught by Walsh et al. increases its wearer's oxygen consumption. More specifically, the exoskeleton described has no actuation and power unit and therefore will not be able to transfer power from the exoskeleton to the person. This means that this type of system, regardless of the location and strength of its springs, will not decrease its wearer's energy expenditure. Since oxygen consumption is proportional to energy expended, a wearer's oxygen consumption will not be decreased.

Based on the above, opportunities exist to provide a general purpose exoskeleton device which will decrease the wearer's energy consumption for locomotion while the device is worn. Providing an exoskeleton that decreases the locomotion energy consumption of its wearer would allow a wearer to walk and carry heavy objects while reducing the wearer's energy expenditure. In particular, this patent application describes several embodiments of exoskeleton devices that decrease their wearers' energy expenditure during swing phases.

SUMMARY OF THE INVENTION

The opportunities described above are addressed in several embodiments of a lower extremity exoskeleton wearable by a person. The lower extremity exoskeleton described here is configurable to be coupled to a person and, among other components, comprises: two leg supports configurable to be coupled to the person's lower limbs; two knee joints, each of which is configured to allow flexion and extension between a respective shank link and respective thigh link; an exoskeleton trunk, which is configurable to be coupled to the person's upper body and is rotatably connectable to the thigh links of the leg supports, allowing for the flexion and extension between the leg supports and the exoskeleton trunk; two hip actuators, which are configured to create torques between the exoskeleton trunk and leg supports; and at least one power unit, which is capable of providing power to the hip actuators, among other components. In operation, when the lower extremity exoskeleton is worn by the person, one leg support is in the stance phase and the other leg support is in the swing phase, the power unit is configured to cause the hip actuator of the leg support in the swing phase to create a torque profile such that the force from the leg support in the swing phase onto the corresponding wearer's lower limb is in the direction of the wearer's lower limb swinging velocity. Since the force onto the wearer's lower limb is in the direction of the wearer's lower limb swinging velocity, the energy expenditure by the wearer during swing phase is decreased.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION OF THE INVENTION

Figure 1:
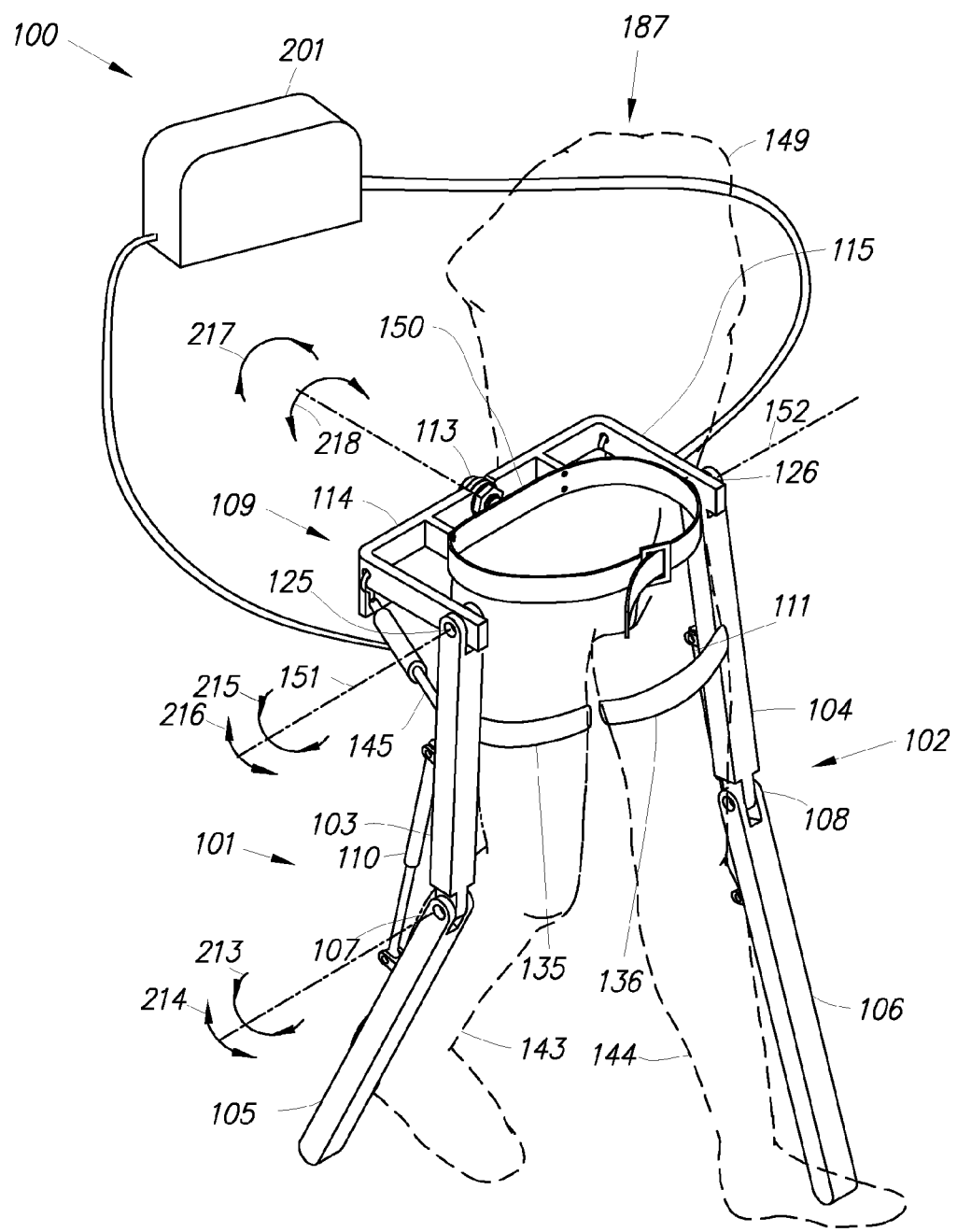
FIG. 1 is a front perspective drawing of an exoskeleton of the present invention.
Figure 2:
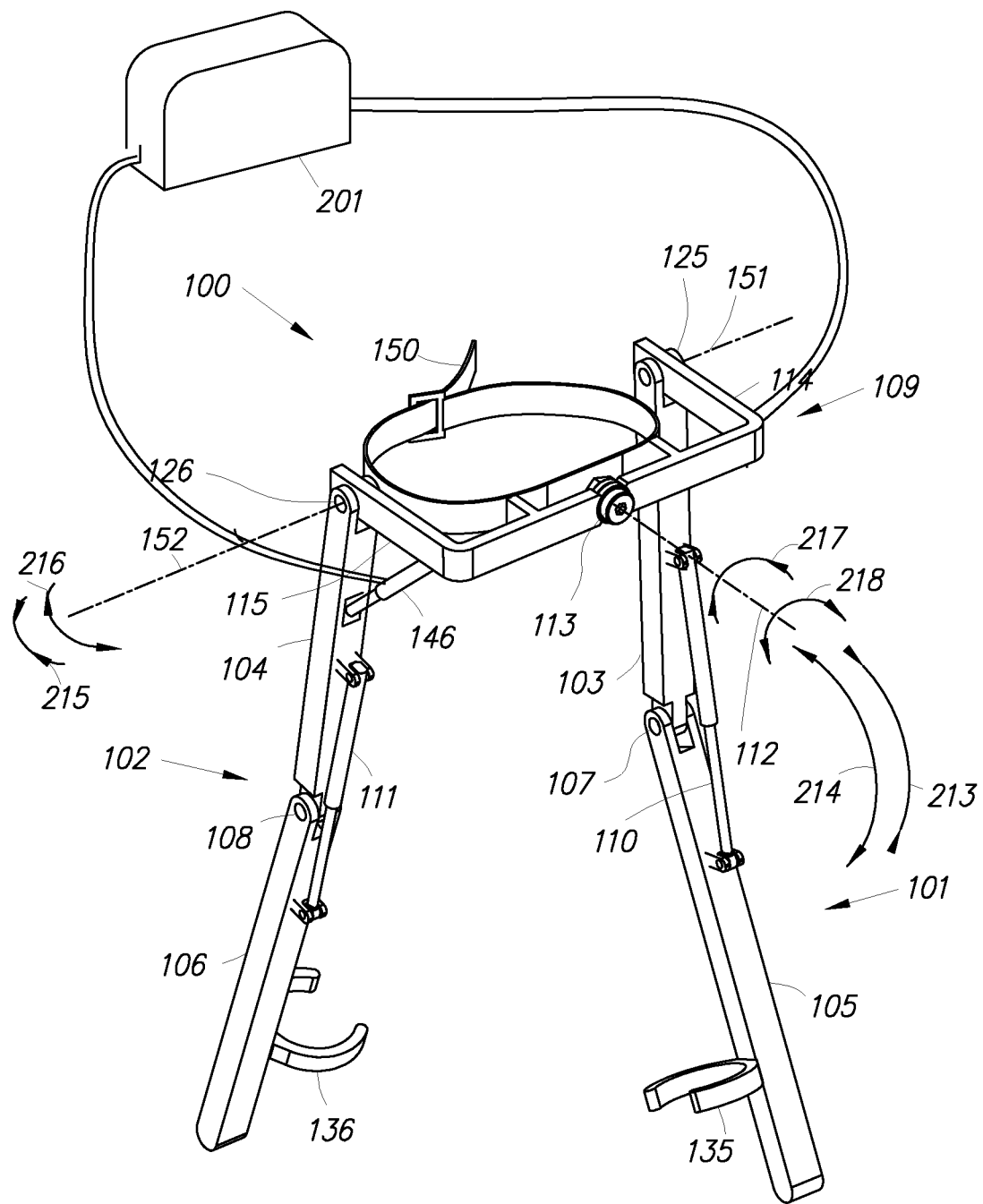
FIG. 2 is a rear perspective drawing of the exoskeleton of FIG. 1.

In accordance with an embodiment of the present invention, FIG. 1 is a perspective drawing illustrating a lower extremity exoskeleton 100 wearable by a person 187 that is able to decrease the wearer's energy consumption during walking. Lower extremity exoskeleton 100, in addition to other components, includes two leg supports 101 and 102, which are configured to be coupled to person's lower limbs 143 and 144 and configured to rest on the ground during the stance phase. The leg supports, in addition to other components, include thigh links 103 and 104 and shank links 105 and 106. Two knee joints 107 and 108 are configured to allow flexion and extension between the shank link and the thigh link of the leg supports (shown by a knee flexion arrow 213 and a knee extension arrow 214 respectively) during the corresponding leg support swing phase. However, two knee joints 107 and 108 in some embodiments are configured to resist flexion between the shank link and the thigh link of the leg supports during the corresponding leg support stance phase. Lower extremity exoskeleton 100 further comprises an exoskeleton trunk 109. Exoskeleton trunk 109, among other components, comprises an upper body interface device 150. Exoskeleton trunk 109 is configurable to be coupled to the person's upper body 149 through upper body interface device 150. Person's upper body 149 means any location generally above the thighs including the buttock. Examples of upper body interface device 150 comprise an element or combination of elements including, without limitation, vests, belts, straps, shoulder straps, chest straps, body cast, harness, and waist belts. Exoskeleton trunk 109 is rotatably connectable to leg supports 101 and 102 at hip flexion-extension joints 125 and 126, allowing for the hip flexion and extension rotations (shown by hip extension arrow 215 and hip flexion arrow 216 respectively) of leg supports 101 and 102 about hip flexion-extension axes 151 and 152 respectively. Leg supports 101 and 102 are configurable to be coupled to the person's lower limbs 143 and 144 through lower limb interface straps 135 and 136. In some embodiments, such as shown in FIG. 1, lower limb interface straps 135 and 136 are coupled to thigh links 103 and 104. In some embodiments, such as shown in FIG. 2, lower limb interface straps 135 and 136 are coupled to shank links 105 and 106. In some embodiments, lower limb interface straps are coupled to both shank links and thigh links. Each lower limb interface strap 135 and 136 comprises an element or combination of elements including, without limitation, straps, bars, c-shaped brackets, a body cast, and elastomers.

In operation, person 187 couples to (i.e., wears) lower extremity exoskeleton 100 through upper body interface device 150 (a simple belt in the case of FIG. 1) and by coupling two leg supports 101 and 102 through lower limb interface straps 135 and 136. Lower extremity exoskeleton 100, among other things, further comprises two hip actuators 145 and 146 which are configured to create torques between exoskeleton trunk 109 and leg supports 101 and 102. Right hip actuator 145 is shown in FIG. 1 and left hip actuator 146 is shown in FIG. 2. Lower extremity exoskeleton 100, among other components, further comprises at least one power unit 201 capable of providing power and coupled to hip actuators 145 and 146. In some embodiments, only one power unit 201 provides power to hip actuators 145 and 146. In some embodiments, each hip actuator receives power from separate power units. Hip actuators 145 and 146 comprise any device or combination of devices capable of providing torque. Examples of hip actuators 145 and 146 include, without limitation, electric motors, AC (alternating current) motors, brush-type DC (direct current) motors, brushless DC motors, electronically commutated motors (ECMs), stepping motors, hydraulic actuators, pneumatic actuators, and combinations thereof. In some embodiments, hip actuators 145 and 146 are powered by compressed gas. In some embodiments, exoskeleton trunk 109 is configured to hold a rear load behind person 187. In some embodiments, exoskeleton trunk 109 is configured to hold a load in front of person 187.

Figure 3:
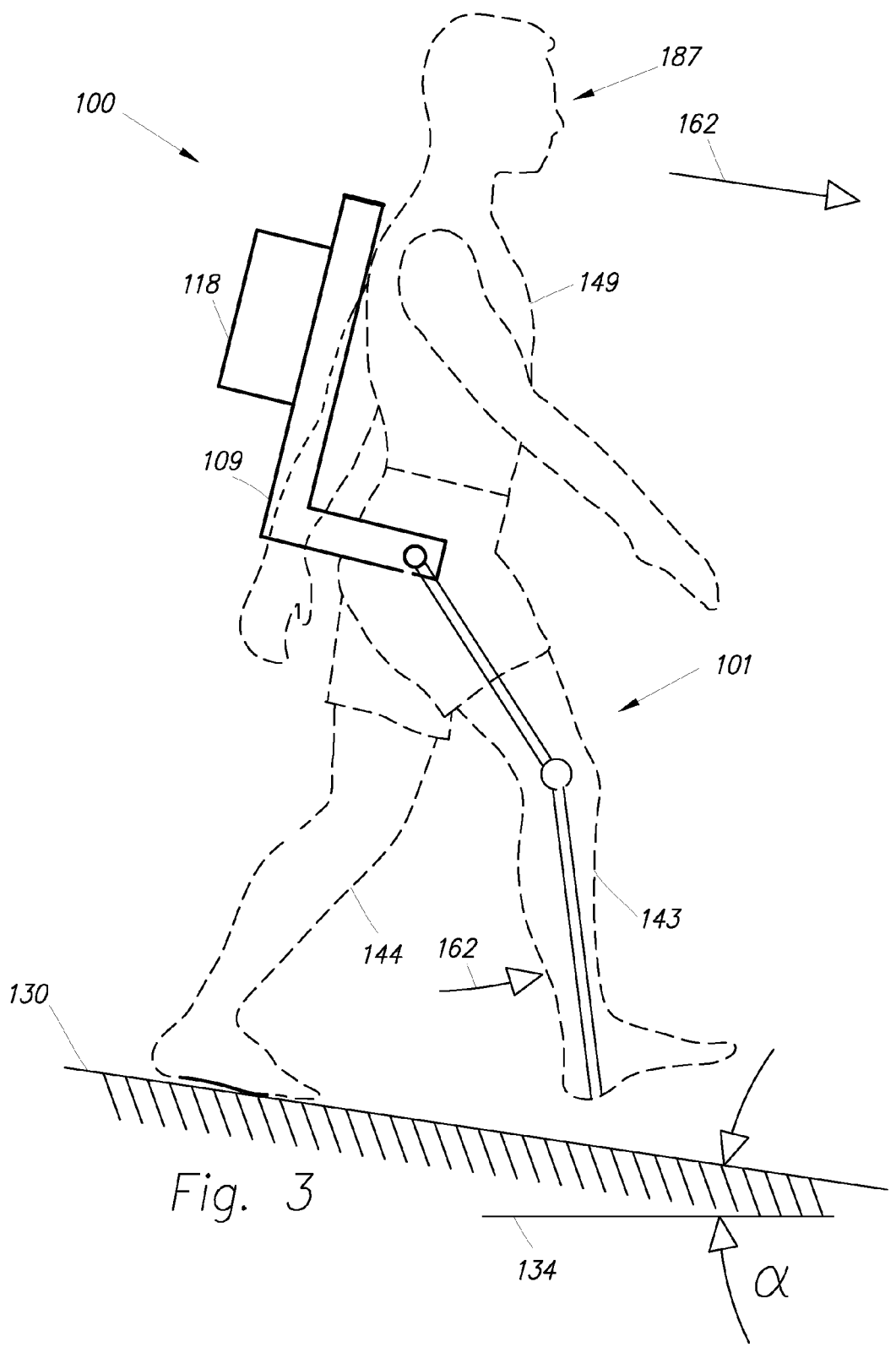
FIG. 3 depicts an alternative exoskeleton of the present invention in a stance phase.

FIG. 3 shows a configuration of lower extremity exoskeleton 100 where right leg support 101 and person's right lower limb 143 are in the swing phase and left leg support 102 and person's left lower limb 144 are in the stance phase (left leg support 102 is not shown in FIG. 3). In this embodiment, it should be noted that exoskeleton trunk 109 has been designed to extend along the person's back to hold a rear load 118. Further note that the following analysis clearly holds for the reverse configuration where left leg support 102 is in swing phase and right leg support 101 is in stance phase.

In operation, when right leg support 101 is in the swing phase, power unit 201 is configured to cause the corresponding right hip actuator 145 of right leg support 101 to create a torque profile. Due to this torque profile, right leg support 101 and person's right lower limb 143 swing, as shown in FIG. 3. The mechanical work produced by right hip actuator 145 during the entire swing phase is denoted by. The total mechanical energy (kinetic energy plus potential energy) of right leg support 101 at the beginning of the swing phase is denoted by. The total mechanical energy of right leg support 101 at the end of the swing phase is denoted by $E_C$. The energy wasted to friction and other losses during the swing phase of right leg support 101 are denoted by $E_{LOSS}$. If $W_{ACTUATOR}$ is larger than $(E_C-E_A+E_{LOSS})$, then energy is transferred from right hip actuator 145 to swing person's right lower limb 143, and its magnitude is $[W_{ACTUATOR}-(E_C-E_A+E_{LOSS})]$. If $W_{ACTUATOR}$ (i.e., mechanical energy produced by right hip actuator 145) is smaller than the $(E_C-E_A+E_{LOSS})$, then energy is transferred from person's right lower limb 143 to swing leg support 101, and its magnitude is $[(E_C-E_A+E_{LOSS})-W_{ACTUATOR}]$. In summary:

If $W_{ACTUATOR}>(E_C-E_A+E_{LOSS})$, energy transferred to person's right lower limb 143=$W_{ACTUATOR}-(E_C-E_A+E_{LOSS})$ If $W_{ACTUATOR}<(E_C-E_A+E_{LOSS})$, energy transferred from person's right lower limb 143=$(E_C-E_A+E_{LOSS})-W_{ACTUATOR}$.

The required energy to move exoskeleton right leg support 101 through the swing phase when right leg support 101 is not worn by person 187 is $(E_C-E_A+E_{LOSS})$. This means, to transfer energy to person's right lower limb 143 during the swing phase of right leg support 101, the energy supplied by power unit 201 to right hip actuator 145 of right leg support 101 must be larger than the energy required to move right leg support 101 through the same trajectory during the swing phase when person 187 is not present. An incremental mechanical energy transferred to person 187 during the swing phase will result in an incremental decrease in the wearer's energy required during the swing phase. Since the wearer's oxygen consumption is proportional to the energy expenditure, a decrease in the wearer's energy required for swinging a leg leads to less oxygen consumption for the wearer. The above teaches that during at least one segment of the swing phase of leg support 101, right hip actuator 145 of right leg support 101 should create a torque profile such that mechanical energy is transferred to person 187 from swinging leg support 101. If the transferred mechanical energy is sufficiently large during that segment, the wearer's oxygen consumption is reduced while walking.

One way to ensure that energy is transferred from right hip actuator 145 to move person's right lower limb 143 during the swing phase is to ensure that the torque profile of right hip actuator 145, during a portion of the swing phase, is larger than the torque required to move right leg support 101 through the same swinging trajectory when person 187 is not present. This is described below.

Figure 4:
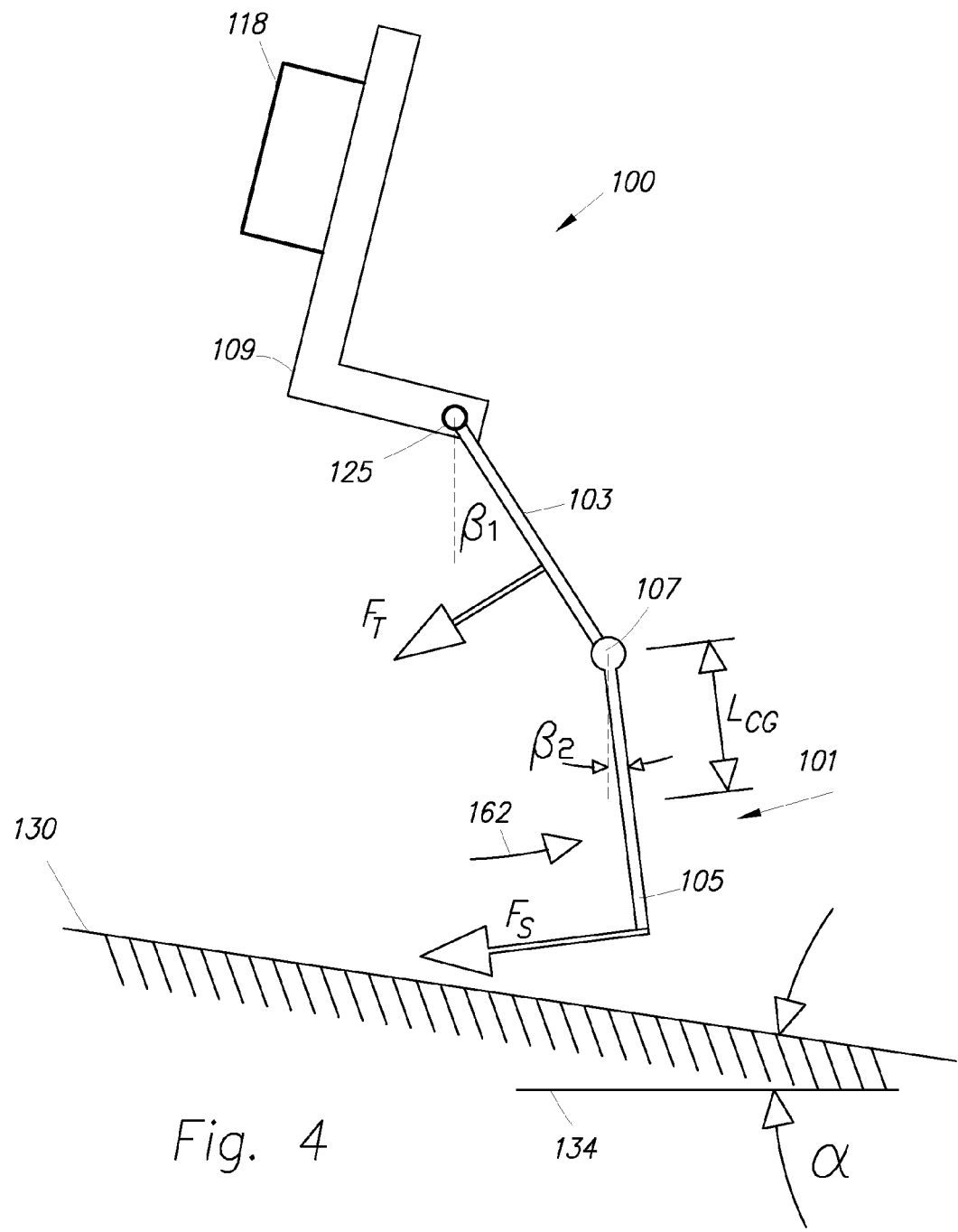
FIG. 4 depicts forces and dimensions associated with the exoskeleton of FIG. 3 in the stance phase.

FIG. 4 shows a configuration of lower extremity exoskeleton 100 when right leg support 101 is in the swing phase (the same configuration as FIG. 3 without the person drawn). Support surface or ground 130 has a slope of with the horizontal ground 134. Person's upper body 149 is coupled to exoskeleton trunk 109 by an upper body interface device 150, such as the one depicted in FIG. 1. Assume for a moment, for the sake of simplicity, that exoskeleton trunk 109 is not moving. This assumption is given here to simplify the equations and to better understand the conditions needed to decrease the wearer's energy expenditure. The results arrived at can be extended to the situation where exoskeleton trunk 109 travels forward.

Figure 18:
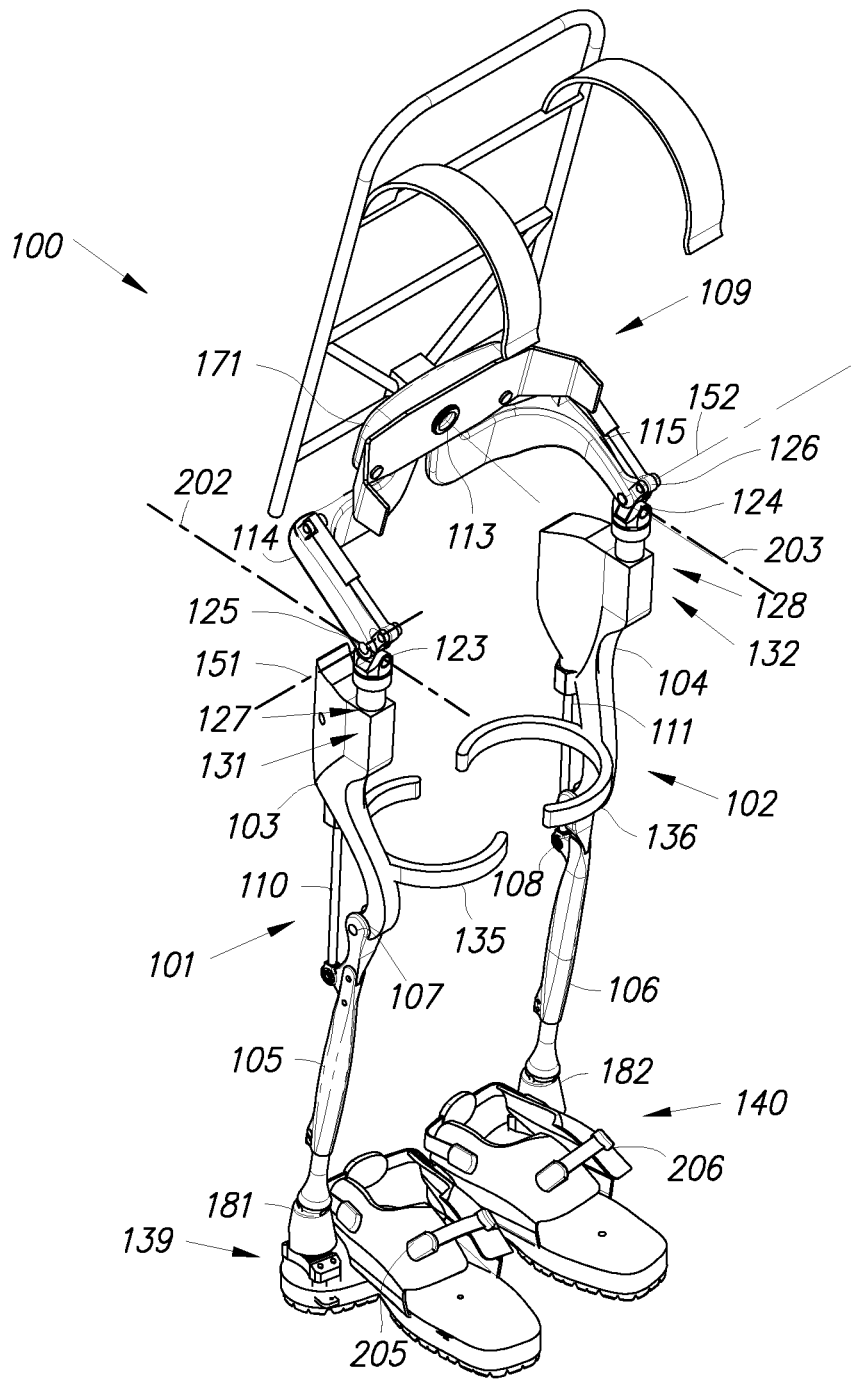
FIG. 18 is a perspective drawing of an alternative exoskeleton of the present invention including two hip resilient elements and exoskeleton feet.

In some embodiments of the invention, wearer's lower limb 143 and leg support 101 are coupled to each other by lower limb interface strap 135. In some embodiments of the invention, wearer's lower limb 143 and leg support 101 are coupled to each other through exoskeleton feet 139 and 140 as shown in FIG. 18. The type of coupling between wearer's lower limb 143 and leg support 101 dictates the locations of the interaction forces between wearer's lower limb 143 and leg support 101. FIG. 4 shows the situation where two forces from wearer's lower limb 143 (not shown in FIG. 4) are imposed on leg support 101. Force $F_T$ is imposed on thigh link 103 and force $F_S$ is imposed on shank link 105 by lower limb 143. Regardless of the type of coupling between wearer's lower limb 143 and leg support 101, it should be understood that these forces create a torque from wearer's lower limb 143 onto leg support 101 about hip flexion-extension joint 125. The summation of all torques from wearer's lower limb 143 onto leg support 101 is denoted as $T_H$. Positive values for $T_H$ indicate clockwise torque from wearer's lower limb 143 onto leg support 101. The torque provided by right hip actuator 145 (depicted in FIG. 1) between exoskeleton trunk 109 and right leg support 101 is denoted by $T_E$. Positive values for $T_E$ indicate counterclockwise torque to swing leg support 101 along the forward swing direction 162 shown in FIGS. 3 and 4. The kinetic and potential energy of the system shown in FIG. 4 are expressed by equations (1) and (2).

$$\text{Potential Energy} = -M_{THIGH}L_{TCG}g\text{Cos}(\beta_1) - M_{SHANK}g[L_{THIGH}\text{Cos}(\beta_1) + L_{SCG}\text{Cos}(\beta_2)] \quad (1)$$

$$\text{Kinetic Energy} = \frac{(M_{SHANK}L_{THIGH}^2 + I_{THIGH})\dot{\beta}_1^2}{2} + \frac{(I_{SHANK})\dot{\beta}_2^2}{2} + M_{SHANK}L_{THIGH}L_{SCG}\dot{\beta}_1\dot{\beta}_2\text{Cos}(\beta_1 - B_2) \quad (2)$$

where:

$M_{SHANK}$: mass of exoskeleton shank link 105 of right leg support 101

$M_{THIGH}$: mass of exoskeleton thigh link 103 of right leg support 101

$L_{THIGH}$: Length of right thigh link 103

$L_{SCG}$: distance between center of mass of shank link 105 and knee joint 107

$L_{TCG}$: distance between center of mass of thigh link 103 and hip flexion-extension joint 125

$\beta_1$: thigh angle with the vertical line (positive value is shown in FIG. 4)

$\beta_2$: shank angle with the vertical line (positive value is shown in FIG. 4)

$I_{THIGH}$: moment of inertia of thigh link 103 about hip flexion-extension joint 125

$I_{SHANK}$: moment of inertia of shank link 105 about its center of mass

Using the Lagrangian Method for the right leg support 101 when exoskeleton trunk 109 is not moving and right leg support 101 is swinging reveals that the algebraic summation of the torque provided by right hip actuator 145, $T_E$, and the torque from wearer's lower limb 143, $T_H$, dictates how leg support 101 swings and is shown by equation (3).

$$T_E - T_H = (M_{SHANK}L_{THIGH}^2 + I_{THIGH})\ddot{\beta}_1 + M_{SHANK}L_{SCG}L_{THIGH}[\dot{\beta}_2^2\text{Sin}(\beta_1 - \beta_2) + \ddot{\beta}_2\text{Cos}(\beta_1 - \beta_2)] + M_{THIGH}L_{TCG}g\text{Sin}(\beta_1) + M_{SHANK}L_{THIGH}g\text{Sin}(\beta_1) + T_F \quad (3)$$

where:

$T_H$ the torque on right leg support from person's right lower limb (positive value is in the clockwise direction, opposite to forward swing direction)

$T_E$: torque generated by right hip actuator (positive value is along forward swing direction)

$T_F$: friction torque opposing the motion of right leg support during swing

The right hand side of equation (3) represents the required torque to move right leg support 101 during swing phase through the same trajectory when right leg support 101 is not worn by the person's right lower limb 143. We will consider three cases:

Case 1) As can be examined from equation (3), if the hip actuator torque, $T_E$, is such that it is larger than the entire term on the right side of equation (3), then the torque from person's right lower limb 143 onto right leg support 101, $T_H$, is positive. This means that if the hip actuator torque is chosen such that it is larger than the entire dynamics of the swinging leg (i.e., the addition of the inertial, gravitational, and frictional torques), then the torque from the person's right lower limb 143 onto right leg support 101 is positive (i.e., clockwise). This further means that the torque from right leg support 101 onto person's right lower limb 143 is along the forward swing direction 162. When the torque on person's right lower limb 143 is in the direction of the swing velocity, mechanical power is transferred from right leg support 101 (or from lower extremity exoskeleton 100) to person's right lower limb 143. Since the time integral of this mechanical power during a period of the forward swing phase (i.e., when person's right lower limb 143 moves forwardly) is positive, mechanical energy is transferred to person 187 during that particular period. Mechanical energy transferred to person 187 during a period of the forward swing phase will result in an incremental decrease in the wearer's energy required for swing motion. An incremental decrease in the wearer's energy required for swing motion leads to less oxygen consumption and lower heart rate during locomotion.

The situation of Case 1 (described above) teaches that to reduce the wearer's walking energy expenditure, during at least one portion of the swing phase of a leg support, the hip actuator of the swinging leg support should create a torque profile such that the torque from the swinging leg support onto the person's corresponding lower limb is in the direction of the person's swing velocity. If the torque from the swinging leg support onto the corresponding person's lower limb is sufficiently large, then the wearer's energy expenditure during the swing phase will be reduced. If the torque from the swinging leg support onto the corresponding person's lower limb is sufficiently large, then the wearer's oxygen consumption is reduced while walking.

The situation of Case 1 also teaches that to reduce the wearer's walking energy expenditure during at least one portion of the swing phase of a leg support, the hip actuator of the swinging leg support should create a torque profile such that the force from the swinging leg support onto the person's corresponding lower limb is in the direction of the person's swing velocity. This means that the wearer's lower limb needs to be pushed forward by the swinging leg support during at least a segment of the swing phase when the lower limb is moving forward. If the force from the swinging leg support onto the corresponding person's lower limb is sufficiently large, then the wearer's energy expenditure during the swing phase will be reduced. If the force from the swinging exoskeleton leg support onto said corresponding person's lower limb is sufficiently large, then the wearer's oxygen consumption is reduced while walking.

The above Case 1 further teaches that to reduce the wearer's walking energy expenditure, during at least one portion of the swing phase of a leg support, the hip actuator of the swinging leg support should create a torque profile which is larger than the torque required to move the swinging leg support during that said portion of the swing phase through the same trajectory when not worn by the person. If the torque profile created by the actuator of the swinging leg support is sufficiently large, the wearer's energy expenditure during the swing phase will be reduced. If the torque profile created by the actuator of the swinging leg support is sufficiently large, the wearer's oxygen consumption is reduced while walking.

Case 2) As can be examined from equation (3), if the hip actuator torque, $T_E$, is such that it is smaller than the entire term on the right side of equation (3), then the torque from person's right lower limb 143 onto right leg support 101, $T_H$, is negative. This means that if the hip actuator torque is chosen so that it is smaller than the entire dynamics of the swinging leg (i.e., the summation of the inertial, gravitational, and frictional torques), then the torque from the person's lower limb 143 onto right leg support 101, $T_H$, is in the anticlockwise direction. This indicates that the torque on person's right lower limb 143 is in the clockwise direction (i.e., opposite to forward swing direction 162). When the torque on person's right lower limb 143 is in the opposite direction of the lower limb's swing velocity, power is transferred from right lower limb 143 (i.e., person 187) to leg support 101 (i.e., lower extremity exoskeleton 100). Since the time integral of this mechanical power during a period of the swing time is negative, mechanical energy is transferred from person 187 to help swing leg support 101. Mechanical energy transferred from person 187 during the swing phase will result in an incremental increase in the wearer's energy required for swinging a lower limb. An incremental increase in the wearer's energy required for swinging the wearer's lower limb and the exoskeleton leg support leads to the wearer consuming more oxygen and having a higher heart rate while walking. The right hand side of equation (3) represents the torque required to move exoskeleton leg support 101 in swing phase through the same trajectory when not worn by person 187.

The situation of Case 2 teaches that if the torque from leg support 101 onto person's lower limb 143 during a period of the swing phase is in the opposite direction to the lower limb's swing velocity, the wearer's walking energy expenditure will be increased. The situation of Case 2 also teaches that if the forces from leg support 101 onto person's lower limb 143 during a period of the swing phase are in the opposite direction to the lower limb's swing velocity, the wearer's walking energy expenditure will be increased. The above Case 2 further teaches that if the torque profile from the hip actuator during a period of the swing phase is smaller than the required torque to move the exoskeleton leg support in the swing phase through the same trajectory when not worn by person's lower limb, the wearer's walking energy expenditure will be increased. An incremental increase in the wearer's energy required for swinging the wearer's lower limb and the exoskeleton leg support leads to the wearer consuming more oxygen and having a higher heart rate while walking.

Case 3) As can be examined from equation (3), if the hip actuator torque, $T_E$ is such that it is equal to the entire term on the right side of equation (3), then the torque from person's right lower limb 143 onto right leg support 101, $T_E$ is zero. This means that if the hip actuator torque is chosen to be exactly equal to the entire dynamics of the swing leg (i.e., the summation of the inertial, gravitational, and frictional torques, then the interaction torque between the person's lower limb and the exoskeleton leg support is zero). This means that the wearer does not feel the exoskeleton leg support during the swing phase and therefore, the power that the wearer is spending to swing his/her lower limb is the same as what he/she would be spending when swinging his/her lower limb without any exoskeleton. This means no energy is transferred between the exoskeleton and its wearer during the swing phase. In this case, the wearer's energy expenditure neither increases nor decreases due to the swing action.

The above analysis shows how a lower extremity exoskeleton can reduce its wearer's energy expenditure during the swing phase. An exoskeleton system that has two arms, in addition to two lower extremities, can also reduce its wearer's energy expenditure as long as the exoskeleton's lower extremities of the exoskeleton function according to the teaching described above.

In general, any lower extremity exoskeleton, regardless of the number of actuators and their locations on the exoskeleton system, decreases its wearer's energy expenditure during swing phase as long as the force from the exoskeleton leg support onto the wearer's lower limb during the swing phase is along the direction of the person's swing leg velocity. When the force on the person's lower limb during the swing phase is along the direction of the person's swing leg velocity, regardless of the exoskeleton architecture, mechanical power is transferred from the exoskeleton to the person. Mechanical energy transferred to the person during a portion of the swing phase will result in an incremental decrease in the wearer's energy required for locomotion during the swing phase. An incremental decrease in the wearer's energy required for locomotion leads to less oxygen consumption and lower heart rate while walking.

Figure 9:
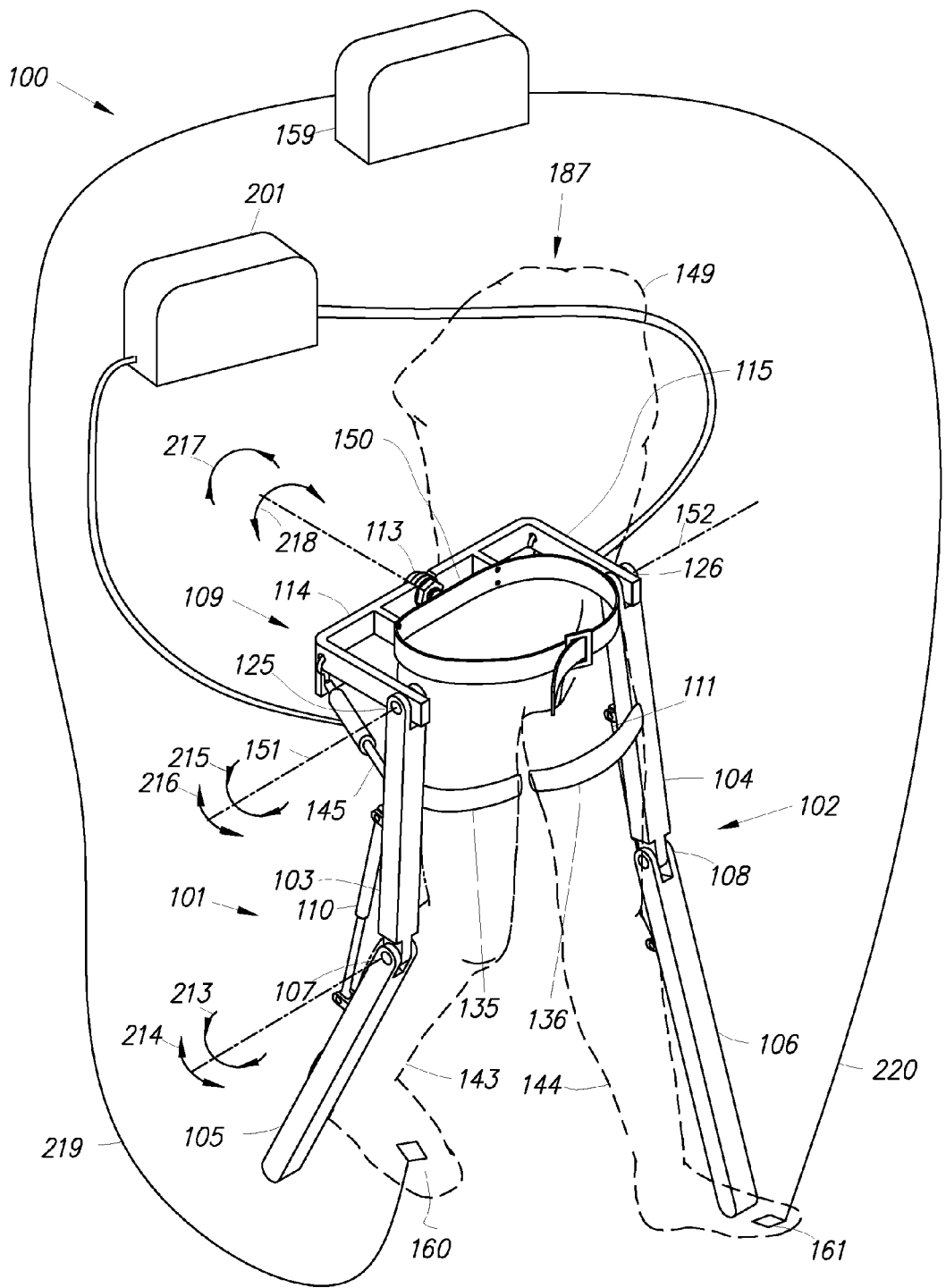
FIG. 9 is a perspective drawing of an alternative exoskeleton of the present invention including stance sensors in communication with a signal processor.

In some embodiments of the invention, lower extremity exoskeleton 100 comprises at least one signal processor 159 capable of controlling hip actuators 145 and 146, as depicted in FIG. 9. Signal processor 159 comprises an element or combination of elements selected from a group including analog devices, analog computation modules, digital devices including, without limitation, small-, medium-, and large-scale integrated circuits, application specific integrated circuits, programmable gate arrays, and programmable logic arrays, electromechanical relays, solid state switches, MOSFET switches, and digital computation modules including, without limitation, microcomputers, microprocessors, microcontrollers, and programmable logic controllers. In operation, to decrease the wearer's energy expenditure, signal processor 159, among other tasks, computes a torque profile that satisfies the condition described in Case 1 above. This torque is then produced by hip actuators 145 and 146 during their respective swing phases. There are many ways of implementing the condition described in Case 1, and some methods are described below.

In some embodiments, signal processor 159 computes a torque profile as described in Case 1 above for hip actuators 145 and 146. In some embodiments, the hip actuator torque can be controlled to satisfy the condition described in Case 1 by creating a closed loop control by measuring the hip actuator torque or force as the feedback variable. A skilled control engineer will be able to develop a controller to satisfy the condition described in Case 1 above.

Figure 5:
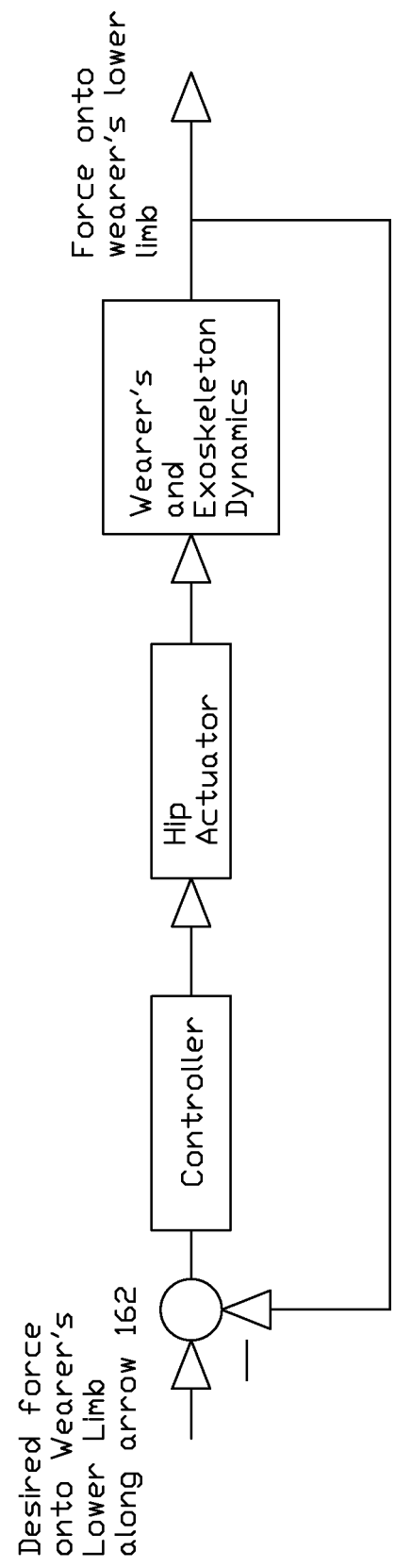
FIG. 5 is a diagram depicting the use of a closed loop controller to control force applied in accordance with the present invention.

FIG. 4 shows that in order to reduce the wearer's energy expenditure during the swing phase, the force on wearer's lower limb 143 should be in the direction of the swing velocity during a portion of the swing phase. In other words, the wearer's lower limb should be pushed in the direction of motion by the exoskeleton's lower limb during a portion of the swing phase. This can be done either in a closed loop fashion or in an open loop fashion. In the closed loop fashion, one can develop a control algorithm to ensure a force is imposed on wearer's lower limb 143 that creates a torque along the swing velocity. In other words, the wearer's lower limb 143 is pushed forward during a portion of the swing phase. In some embodiments, this can be done by adding a force sensor between wearer's lower limb 143 and right leg support 101 and creating a closed loop force controller. The closed loop controller measures the force between wearer's lower limb 143 and right leg support 101 and creates a torque for hip actuator 145 to ensure that this force on wearer's lower limb 143 is pushing wearer's lower limb 143 in the direction of motion. FIG. 5 shows a general embodiment of the control block diagram where the force on wearer's lower limb 143 is measured and compared with a desired force onto wearer's lower limb 143 in the direction of the swing velocity. To reduce the wearer's energy expenditure during the swing phase, the controller is used to ensure that the force on wearer's lower limb 143 follows the desired force which is along forward swing direction 162. This means that to reduce the wearer's energy expenditure, the controller ensures wearer's lower limb 143 is pushed in the direction of motion during a portion of the swing phase. The desired force on wearer's lower limb should be chosen to be comfortable for the user.

In some embodiments, one can create an algorithm that ensures the torque created by the hip actuator satisfies the condition of Case 1 without measuring any force between wearer's lower limb 143 and right leg support 101 as a feedback variable. One can create a torque profile for $T_E$ where $T_E$ is larger than the right hand side of equation (3). This case requires that one computes the right hand side of equation (3) during the swing phase. For example, $T_E$ can be expressed such as $$T_E = (M_{SHANK} L_{THIGH}^2 + I_{THIGH}) \ddot{\beta}_1 + M_{SHANK} L_{SCG} L_{THIGH} [\dot{\beta}_2^2 \sin(\beta_1 - \beta_2) + \ddot{\beta}_2 \cos(\beta_1 - \beta_2)] + M_{THIGH} L_{TCG} g \sin(\beta_1) + M_{SHANK} L_{THIGH} g \sin(\beta_1) + T_F + f \quad (4)$$

where $f$ is a function that guarantees that the torque profile from hip actuator, $T_E$, during a portion of the swing phase is larger than the required torque to move the leg support in swing phase through the same trajectory when not worn by the person's lower limb. In some embodiments, $f$ is a constant quantity. In some embodiments, $f$ is a constant and positive quantity. In some embodiments, $f$ is a function of time. The choice of $T_E$, as shown by equation (4), ensures that the person's lower limb is pushed along the direction of swing during a portion of the swing phase.

In some embodiments, one can create a torque profile for $T_E$ where $T_E$ is larger than the right hand side of equation (3) without computation of the right hand side of equation. For example, $T_E$ can be expressed as:

$$T_E = g \quad (5)$$

where g is a function larger than the right hand side of equality (3) during a portion of the swing phase. In some embodiments, g is a constant quantity and larger than the right hand side of equality (3) during a portion of the swing phase. In some embodiments, g is a function of time and larger than the right hand side of equality (3) during a portion of the swing phase. In some embodiments, g is a function of the percentage of the swing phase duration and larger than the right hand side of equality (3).

Practitioners can arrive at various values of function g to ensure the wearer's lower limb is comfortably pushed forward during the swing phase and we will discuss some that are particularly advantageous. As mentioned earlier, if $W_{ACTUATOR}$ (mechanical work produced by the hip actuator) during the time that the leg support swings is larger than the energy needed to swing the exoskeleton leg support, then energy is transferred from the hip actuator to swing the person's lower limb. One way to ensure such energy transfer to the wearer is described in Case 1 above. One does not have to ensure that $T_E$ is larger than the right hand side of equation (3) at all times to ensure energy transfers to the wearer. Torque $T_E$ during swing phase can be chosen to be large enough only for a portion of the swing phase. In some embodiments, the torque $T_E$ may be constant for a set percentage of the swing phase, and then reduced to zero during the remainder of the swing phase. In some embodiments, torque $T_E$ could start at a maximum at the beginning of the swing phase and decay as a linear function of time, reaching zero later in the swing phase. In all of the above cases, as long as the mechanical work produced by the hip actuator during the swing phase is larger than the energy needed to swing the exoskeleton leg support, then energy is transferred from the hip actuator to move the person's lower limb. Because the exact length of a swing cycle cannot be known until the swing leg contacts the ground, one might estimate the length of the current swing cycle based on the length of previous swing cycle(s) of that leg and/or the other leg. Therefore, $T_E$, in some embodiments, can be formed based on the previous step (or steps) as any arbitrary function as long as energy is transferred to the wearer as described in Case 1 above.

The time to start applying torque in the swing direction is very important. One must realize that there is a short period during walking that the human's lower limbs, both 143 and 144, are both in contact with the ground. For example, when lower limb 144 strikes the ground, lower limb 143 is still in on the ground. Shortly after 144 strikes the ground, lower limb 143 separates from the ground (usually called toe-off). The duration between heel strike of lower limb 144 and toe-off lower limb 143 is called the double stance phase. Our experiments show that the torque imposed on the leg support that is about to go through the toe-off should be in the same direction of forward swing 162 right after the heel strike of the other leg support. In other words, power unit 201 must be configured to cause right hip actuator 145 of right leg support 101 to begin imposing a torque on leg support 101 in forward swing direction 162 when leg support 102 strikes the ground. Similarly, the power unit 201 must be configured to cause left hip actuator 146 of left leg support 102 to begin imposing a torque on leg support 102 in forward swing direction 162 when leg support 101 strikes the ground. Of course, the torque imposed on any of these leg supports during the double stance will continue through at least a portion of their swing phase to ensure energy transfer to the wearer's corresponding lower limb. In some embodiments, the torque on leg support 101 is chosen based on a set of information collected during at least one previous step. This could include, for example, an estimate of the current walking speed. In some embodiments, the torque on leg support 101 is chosen such that the force from leg support 101 onto the corresponding person's lower limb 143 is in the direction of the person's lower limb forward swing 162. In some embodiments, the torque is calculated to maximize the force from leg support 101 onto the corresponding person's lower limb 143 without the person becoming uncomfortable. In some embodiments, the force from leg support 101 onto the corresponding person's lower limb 143 is sufficiently large such that the wearer's oxygen consumption is reduced while walking. In some embodiments, torque on leg support 101 rises to a nominal value and stays substantially constant during toe-off of leg support 101. In some embodiments, torque on leg support 101 rises to a nominal value and varies no more than fifty percent from its nominal value during double stance and through toe-off of leg support 101. In some embodiments, torque on leg support 101 is substantially unidirectional. In some embodiments, torque on leg support 101 rises to a nominal value and stays within fifty percent of its nominal value during double stance, toe-off, and the majority of the period from toe-off to heel strike of said first leg support.

Figure 27:
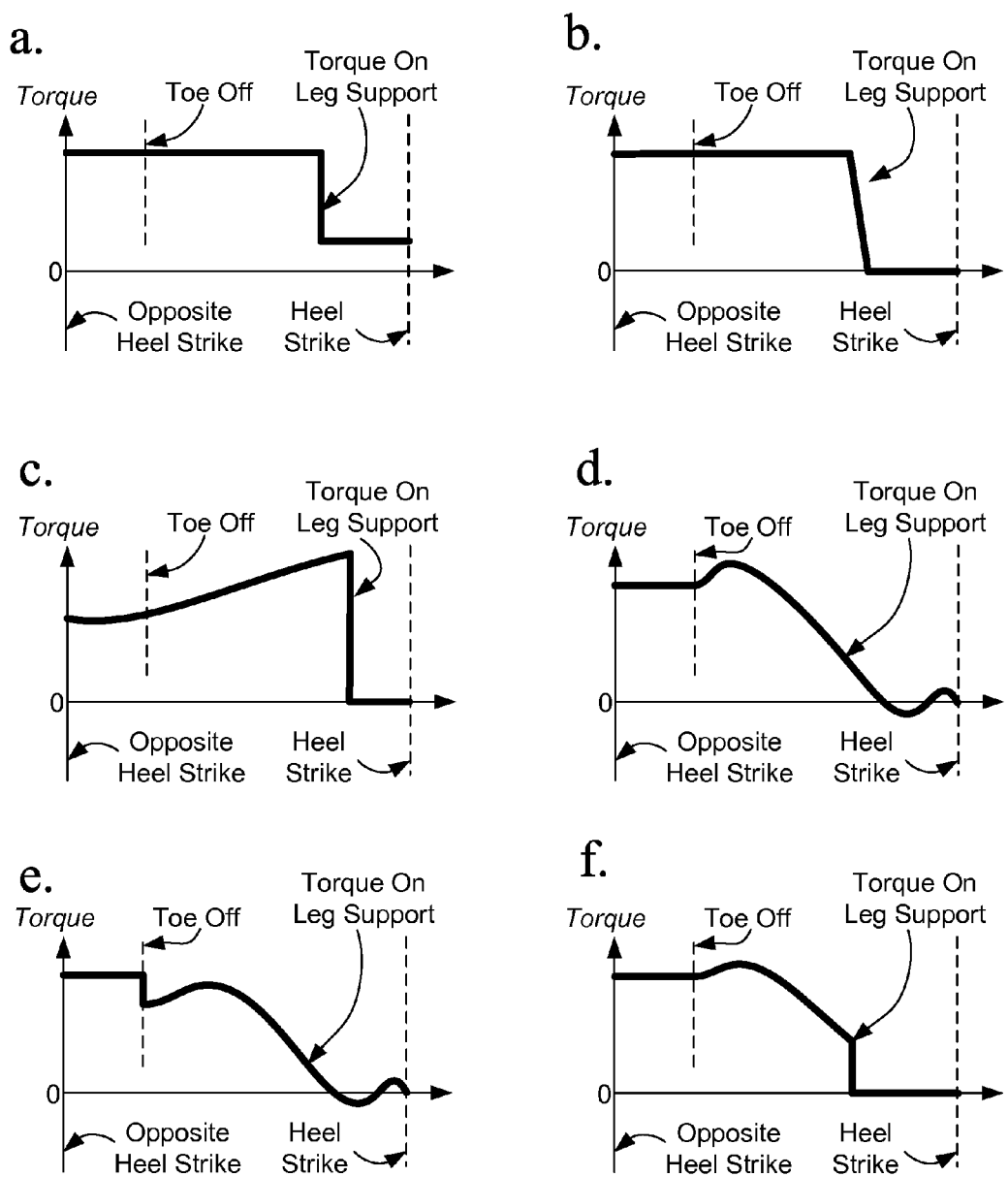
FIGS. 27a-27f are graphs representing various power transfer profiles which may be generated utilizing the exoskeleton of the present invention.

Some examples of advantageous hip torque profiles are shown in FIGS. 27a-27f. The plot of FIG. 27a shows a torque profile g where the torque on a leg support rises to a constant value immediately upon the heel strike of the opposite leg support, and then stays constant throughout toe-off and the majority of swing until finally changing to a value near zero at the end of the swing phase in order to allow the user to decelerate the swinging leg at the end of swing phase. In some situations, the torque at the end of swing phase may actually be zero, which is shown in FIG. 27b. The plot of FIG. 27b also shows that the torque may ramp down to zero in a variety of ways such as the linear slope shown.

Another example which we have also demonstrated is shown in FIG. 27c. The plot of FIG. 27c shows a torque profile g that starts out relatively constant at the heel strike of the opposite leg support and then smoothly increases through toe-off and into the swing phase until it turns off in late swing phase. Another example is shown in FIG. 27d. In this plot, torque profile g rises quickly to a constant value at the heel strike of the opposite leg support, remains constant until the toe-off, and then transitions to a torque proportional to and in the same direction as the current hip angular velocity. In practice, the initial constant torque and the proportionality constant (to knee angular velocity) are selected in order to insure that there is a relatively smooth transition between the constant torque value and the torque calculated using the proportionality to the hip angular velocity. We have found that using a value of torque after toe-off that is proportional to and in the same direction as the current hip angular velocity is one way to compute a torque in real time which mimics the computation of $T_E$ given by equation (4). Of course, one could transition at toe-off to computing the entire value of $T_E$ as given by equation (4) or estimate $T_E$ in a different manner with more than one term. In one embodiment, the torque after toe-off is calculated by summing a term proportional to the current angular velocity of the hip joint with a value which is proportional to the sine of the angle of the thigh link with respect to gravity.

The plot of FIG. 27e has the same characteristics of the plot in FIG. 27d, but the transition to a torque proportional to speed is rather abrupt, although still acceptable. Also, it should be noted that in both FIGS. 27d and 27e, the torque which is proportional to velocity can be removed during late swing and replaced with a torque command near zero in order to insure that the user is not fighting with the torque in order to decelerate the knee in late swing. This is shown by FIG. 27f.

In all of the cases shown in FIGS. 27a-27f, the magnitude of the torque and the duration of the torque profile must be controlled to insure two things: 1) that the torque is large but not uncomfortable and 2) that the torque reduces at the proper time in late swing. In practice, the magnitude of the initial constant torque shown in all the plots of FIGS. 27a-27f is set by a combination of factors which might include a user setting and the current walking speed of the user (taken from previous steps). The user setting is used to set the general level of assistance in swing at all walking speeds, and it is set according to the user's preference. The current walking speed is used to scale the magnitude of the torque so that the user gets more assistance at high walking speeds and less at low speeds. The proper duration of the torque profile (the time at which it reduces in late swing) may be determined from the current walking speed, it may be determined by the swing angle, or it may be determined from other system variables.

In some embodiments, it is a signal processor 159 that increases actuator torque, $T_E$, to provide more assistance at higher walking speeds. When it becomes known to signal processor 159 that person 187 has begun to walk faster, signal processor 159 increases the actuator torque or force. In some embodiments, signal processor 159 becomes aware that person 187 has begun to walk faster when the torque from the exoskeleton leg support onto the person's lower limb during swing is not sufficiently larger along forward swing direction 162 or is in the opposite direction to the forward swing direction 162. In some embodiments, measuring the force between the exoskeleton leg support and the person's lower limb reveals that the person has increased its walking speed. When the force from the exoskeleton leg support onto the person's lower limb during swing is not sufficiently large along forward swing direction 162 or is in the opposite direction to the forward swing direction 162, it is evidence that person 187 has increased its walking speed.

Signal processor 159, in some embodiments, is mounted to exoskeleton trunk 109. In some embodiments, signal processor 159 is located inside power unit 201. Signal processor 159 may be a simple mechanical device consisting of a hydraulic or pneumatic circuit or it may include electronic elements as well.

Figure 6:
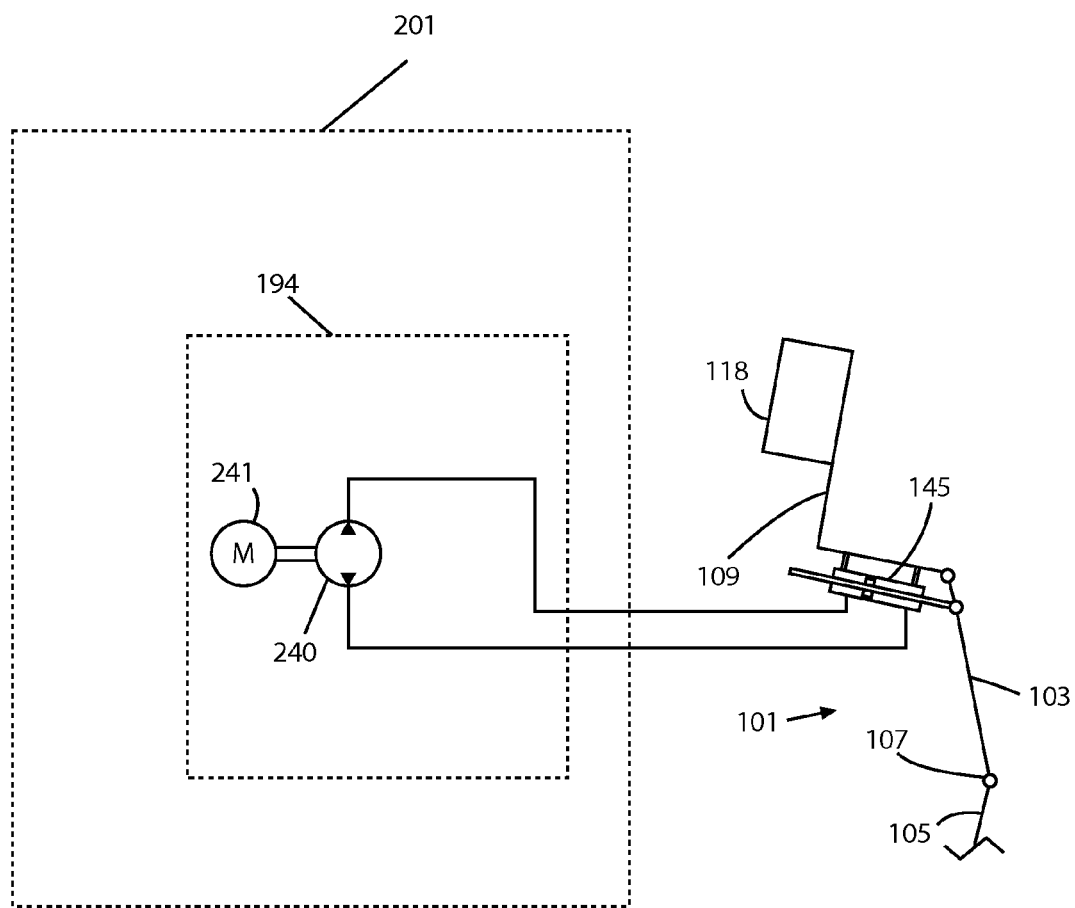
FIG. 6 is a schematic drawing of a power unit of the present invention.

In some embodiments, hip actuators 145 and 146 each comprise of a hydraulic hip actuator. In these embodiments, at least one power unit 201 provides hydraulic power to hip actuators 145 and 146. In some embodiments, only one power unit 201 provides hydraulic power to hydraulic hip actuators 145 and 146. In some embodiments, each hydraulic hip actuator receives hydraulic power from separate power units. In some embodiments, power unit 201, as shown in FIG. 6, among other components, comprises at least one hydraulic circuit 194 connectable to at least one of hydraulic hip actuators 145 and 146, and modulates the hydraulic fluid flow to and from hydraulic hip actuators 145 and 146. In some embodiments, hydraulic hip actuators 145 and 146 are hydraulic piston-cylinders. In some embodiments, hydraulic hip actuators 145 and 146 are rotary hydraulic vane type hydraulic actuators. In some embodiments, as shown in FIG. 6, hydraulic circuit 194, among other components, comprises a hydraulic pump 240 coupled to an electric motor 241.

By controlling electric motor 241, a torque profile can be implemented on hip actuators 145 and 146 to satisfy the condition described in Case 1 above. Since the torque is a function of the hydraulic pressure and the hip actuator geometry, the hip actuator torque can be controlled by creating a closed loop control on the electric motor 241 by measuring the hydraulic pressure as the feedback variable. In some embodiments, the hip actuator torque can be controlled to satisfy the condition described in Case 1 above by creating a closed loop control on the electric motor 241 by measuring the hip actuator torque or force as the feedback variable.

Figure 7:
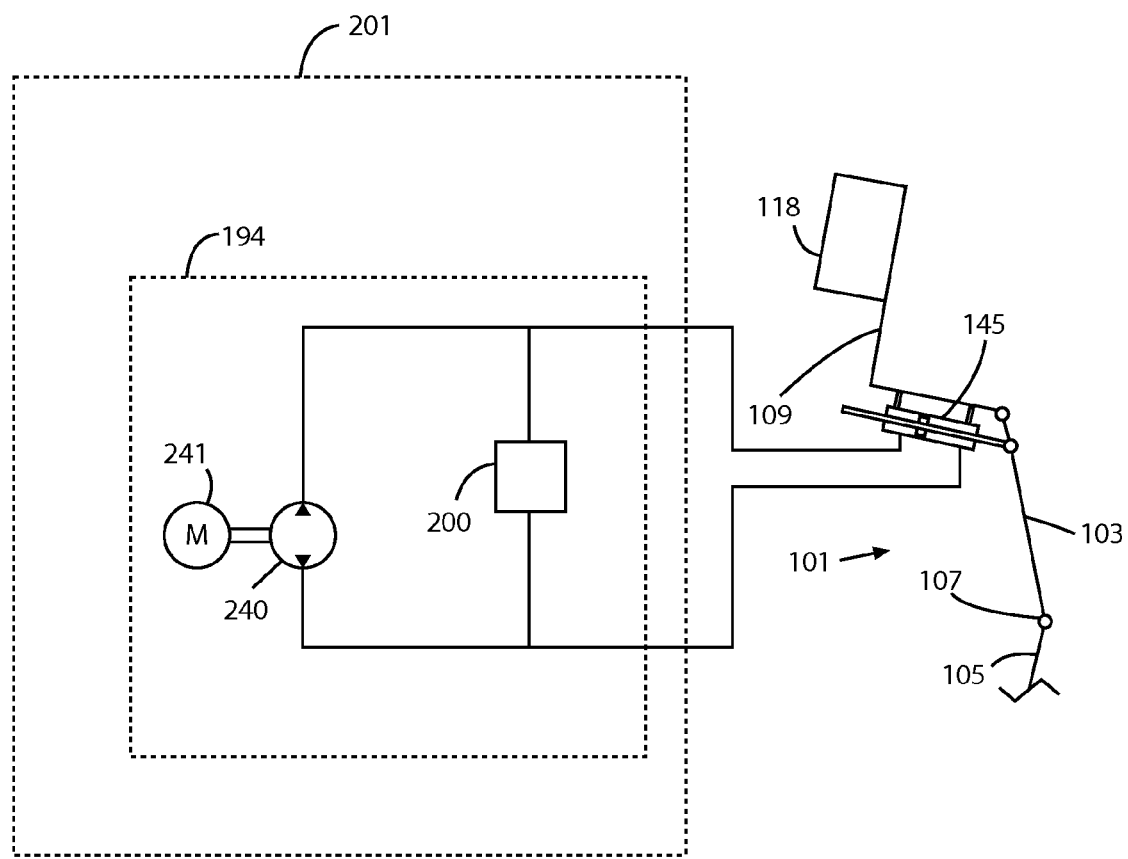
FIG. 7 is a schematic drawing of an alternative power unit of the present invention including a flow restrictive valve.

In some embodiments, as shown in FIG. 7, hydraulic circuit 194, among other components, further comprises an actuated flow-restricting valve 200 capable of redirecting hydraulic fluid from hydraulic right hip actuator 145 around hydraulic pump 240. In operation, when hydraulic pump 240 is in use, actuated flow-restricting valve 200 is closed. In operation, when it is necessary to reduce the power consumption, electric motor 241 will not be powered. In that case, actuated flow restricting valve 200 may be opened so that unpowered electric motor 241 and pump 240 will not impede the motion of right hip actuator 145.

Figure 8:
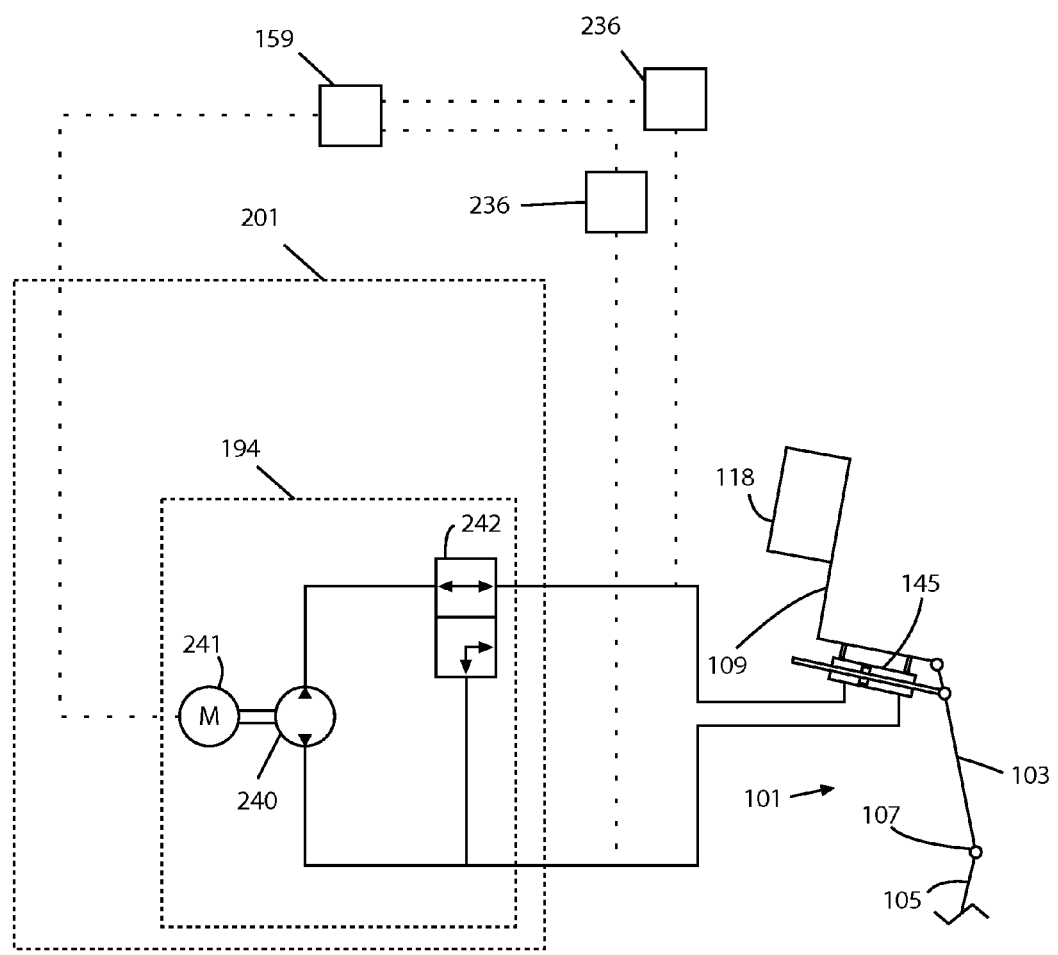
FIG. 8 is a schematic drawing of an alternative power unit of the present invention including a three-way valve.

In some embodiments, as shown in FIG. 8, hydraulic circuit 194, among other components, further comprises a three-way valve 242. In operation, while power unit 201 provides hydraulic power to right hip actuator 145, three-way valve 242 connects hydraulic right hip actuator 145 to hydraulic pump 240. In operation, when it is necessary to reduce the power consumption, electric motor 241 will not be powered. In that case, three-way valve 242 may redirect hydraulic fluid from hydraulic right hip actuator 145 around hydraulic pump 240 so that unpowered electric motor 241 and pump 240 will not impede the motion of right hip actuator 145. A practitioner skilled in the art can realize that a hydraulic circuit usually has many other components associated with safety and other features not discussed here. FIGS. 6, 7 and 8 show only those components that are needed to accomplish the described tasks.

Hydraulic hip actuators 145 and 146 comprise of any hydraulic actuators or combination of actuators capable of converting pressurized hydraulic fluid into force or torque. Examples of hydraulic actuators include, without limitation, linear hydraulic piston-cylinders, rotary hydraulic actuators, rack-and-pinion-type rotary actuators, and rotary hydraulic vane type actuators where pressurized hydraulic fluid generates force or torque by pushing against moving surfaces.

Actuated flow restricting valve 200 comprises any valve or combination of valves capable of performing the indicated functions. Examples of actuated flow restricting valve 200 include, without limitation, flow control valve, pressure control valve, actuated needle valves, solenoid valves, and on-off valves.

Hydraulic pump 240 comprises any pump or combination of pumps capable of performing the indicated functions. Examples of hydraulic pump 240 include, without limitation gear pump, vane pump, axial piston pump, and radial piston pump.

Electric motor 241 comprises any device or combination of devices capable of driving hydraulic pump 240. Examples of motor 241 include, without limitation, electric motors, including, without limitation, AC (alternating current) motors, brush-type DC (direct current) motors, brushless DC motors, electronically commutated motors (ECMs), stepping motors, and combinations thereof. Although we state that electric motor 241 turns hydraulic pump 240, one skilled in the art can realize that both motor 241 and hydraulic pump 240 may have other types of non-rotational couplings such as reciprocating linear motion.

In some embodiments where hip actuators 145 and 146 are hydraulic actuators, signal processor 159 computes a torque profile as described in Case 1 above for hip actuators 145 and 146 by controlling electric motor 241. Since the torque is a function of the hydraulic pressure and the hip actuator geometry, the hip actuator torque, in some embodiments as shown in FIG. 8, can be controlled by creating a closed loop control on the electric motor 241 by measuring the hydraulic pressure as the feedback variable. A pressure sensor indicated at 236 measures the pressure of the hydraulic fluid and signal processor 159 ensures that the pressure is regulated to the desired value. The closed loop control of the hip actuator torque allows one to generate arbitrary known torque profiles for the hip actuator during the swing phase to ensure energy is transferred to the wearer. In some embodiments, the generated torque is a function of the system states during the previous step (or steps) and ensures the condition of Case 1 above is satisfied. In some embodiments, the hip actuator torque can be controlled to satisfy the condition described in Case 1 above by creating a closed loop control on the electric motor 241 by measuring the hip actuator torque or force as the feedback variable. A skilled control engineer will be able to develop a controller to satisfy the condition described in Case 1 above.

In some embodiments, as shown in FIG. 9, lower extremity exoskeleton 100 comprises at least one stance sensor per leg support which produces a stance signal indicating whether that leg support is in the stance phase. In the embodiment of FIG. 9, leg support 101 includes stance sensor 160, which produces a stance signal 219. Stance signal 219 indicates whether leg support 101 is in the stance phase. Similarly, in the embodiment of FIG. 9, leg support 102 includes stance sensor 161, which produces a stance signal 220. Stance signal 220 indicates whether leg support 102 is in the stance phase. In some embodiments, stance sensors 160 and 161 are coupled to shank links leg support 101 and 102 respectively. In operation, signal processor 159 computes a torque profile to satisfy the condition described in Case 1 above depending on whether stance signals 219 and 220 indicate if leg supports 101 and 102 are either in the stance phase or in the swing phase. In some embodiments, stance sensors 160 and 161 are located inside the human shoe (or boots) soles. In some embodiments, stance sensors 160 and 161 are connectable to the bottom of human shoes or boots.

Further discussing the geometry of the exoskeleton shown in FIG. 1, exoskeleton trunk 109, in addition to other components, comprises two hip links 114 and 115 rotatably connectable to thigh links 103 and 104 at hip flexion-extension joints 125 and 126, allowing for the flexion and extension of leg supports 101 and 102 about hip flexion-extension axes 151 and 152 respectively. In some embodiments, hip links 114 and 115 are rotatably connected to each other at hip abduction-adduction joint 113, allowing for abduction and/or adduction of leg supports 101 and 102. Abduction and adduction of leg supports 101 and 102 are shown by arrows 217 and 218 respectively.

Figure 10:
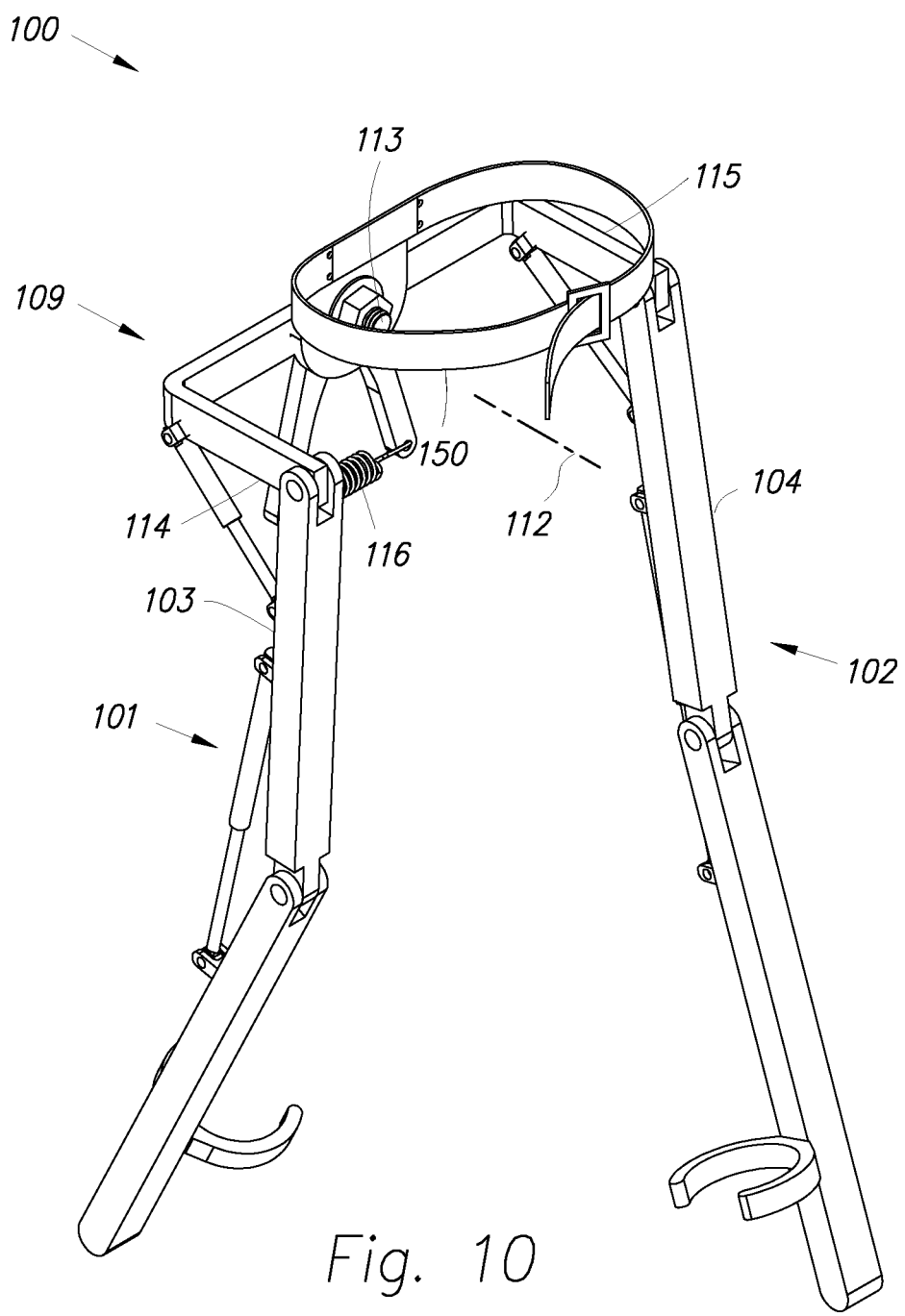
FIG. 10 is a perspective drawing of an alternative exoskeleton of the present invention including a hip resilient element.

FIG. 10 shows another embodiment of the invention where exoskeleton trunk 109 further comprises a hip resilient element 116 configured to apply a torque between hip links 114 and 115. Examples of a hip resilient element include, without limitation, extension spring, compression spring, leaf spring, gas spring, air spring, rubber, elastomer, surgical tube, bungee cord, and combinations thereof. The stiffness of hip resilient element 116 may be chosen such that its force generally holds up the weight of the leg supports 101 or 102 during swing phase.

Figure 11:
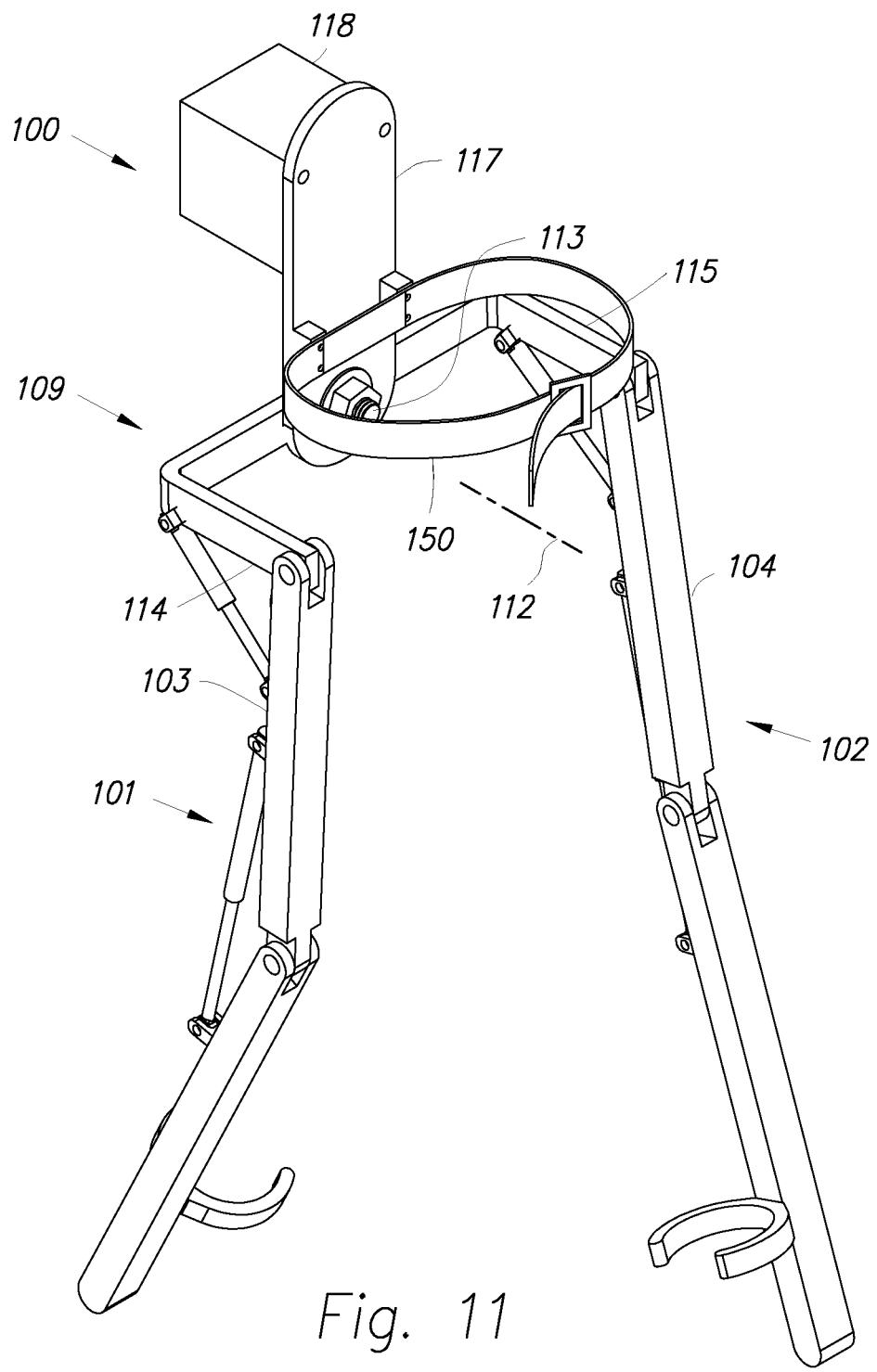
FIG. 11 is a perspective drawing of an alternative exoskeleton of the present invention including a connecting bracket for carrying a rear load.

In some embodiments, exoskeleton trunk 109 is configured to hold a rear load 118 behind person 187. FIG. 11 is a perspective drawing wherein exoskeleton trunk 109, among other components, further comprises a connecting bracket 117 configured to transfer the weight of a rear load 118 to exoskeleton trunk 109.

Figure 12:
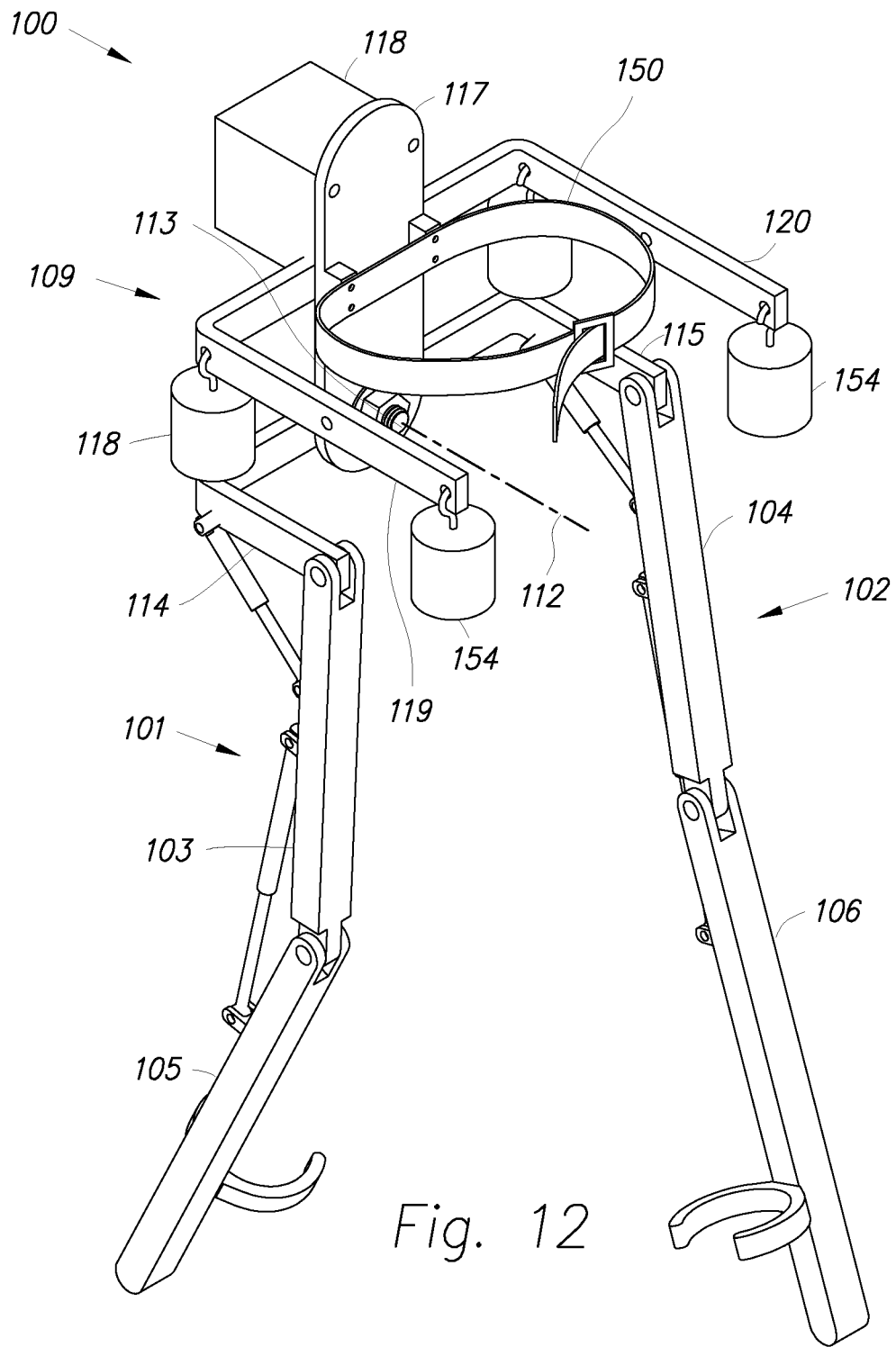
FIG. 12 is a perspective drawing of an alternative exoskeleton of the present invention including extension frames for carrying a front load.

In some embodiments as shown in FIG. 12, connecting bracket 117 further comprises extension frames 119 and 120 configured to hold front load 154 in front of person 187. Examples of rear load 118 and front load 154 include without limitation, backpack, baby carrier, food containers, sacks, boxes, water jugs, tool boxes, barrels, ammunition, weaponry, bedding, first aid supplies, golf bags, mail bags, camera, steadycam, leaf blower, compressor, electromechanical machineries, and combinations thereof. In some embodiments, rear load 118 and/or front load 154 is another person being carried by person 187. In some embodiments, exoskeleton trunk 109 supports a portion of the weight of person 187 through human upper body interface device 150.

Figure 13:
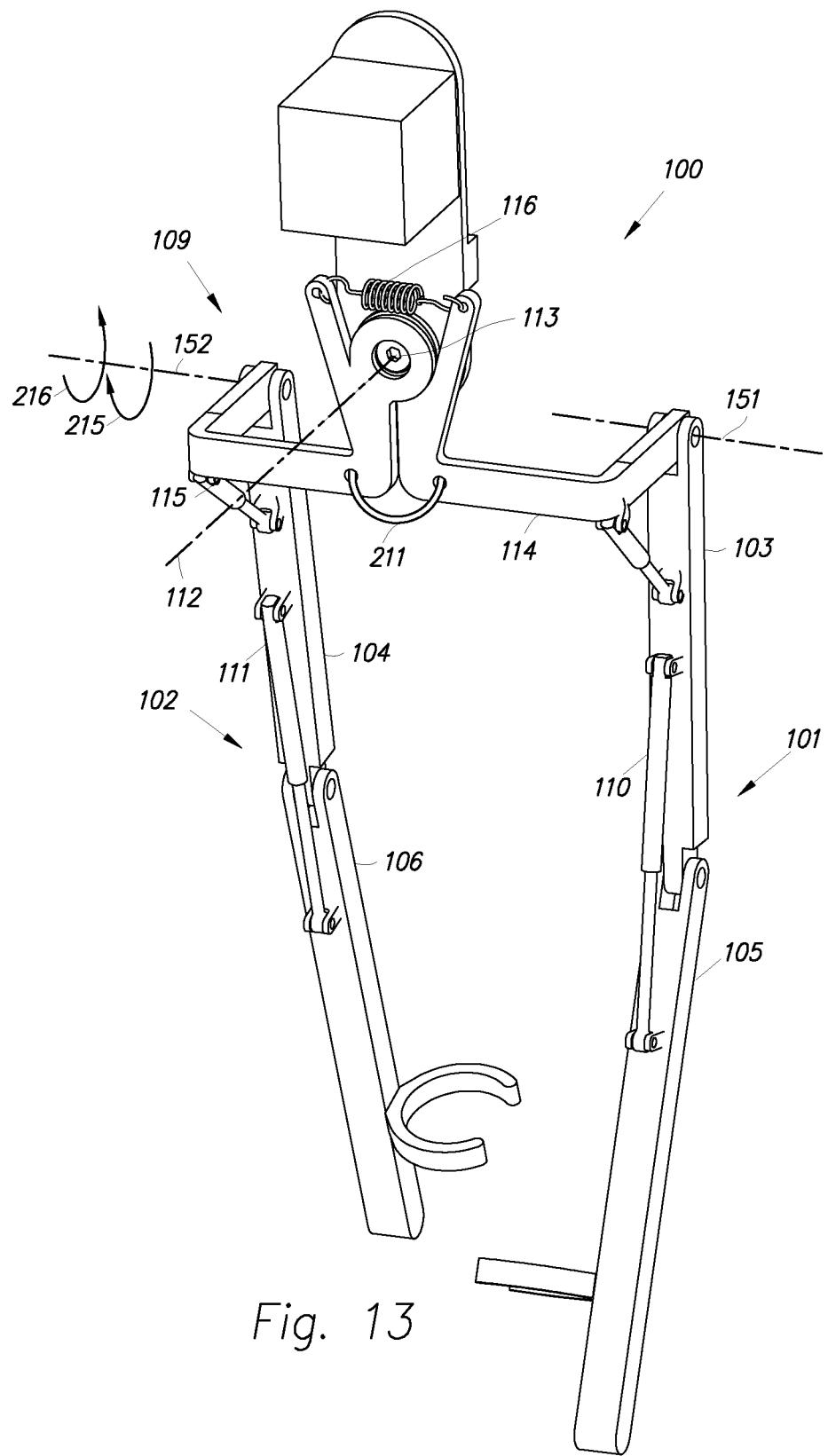
FIG. 13 is a perspective drawing of an alternative exoskeleton of the present invention including a hip abduction stop.

Some embodiments, as shown in FIG. 13, may also include a hip abduction stop 211 which limits or prevents hip links 114 and 115 from abducting with respect to each other. In the particular embodiment shown in FIG. 13, hip abduction stop 211 is created using a wire rope. Wire rope hip abduction stop 211 prevents abduction of leg supports 101 and 102 past some angle from occurring but allows adduction of leg supports 101 and 102.

Figure 14:
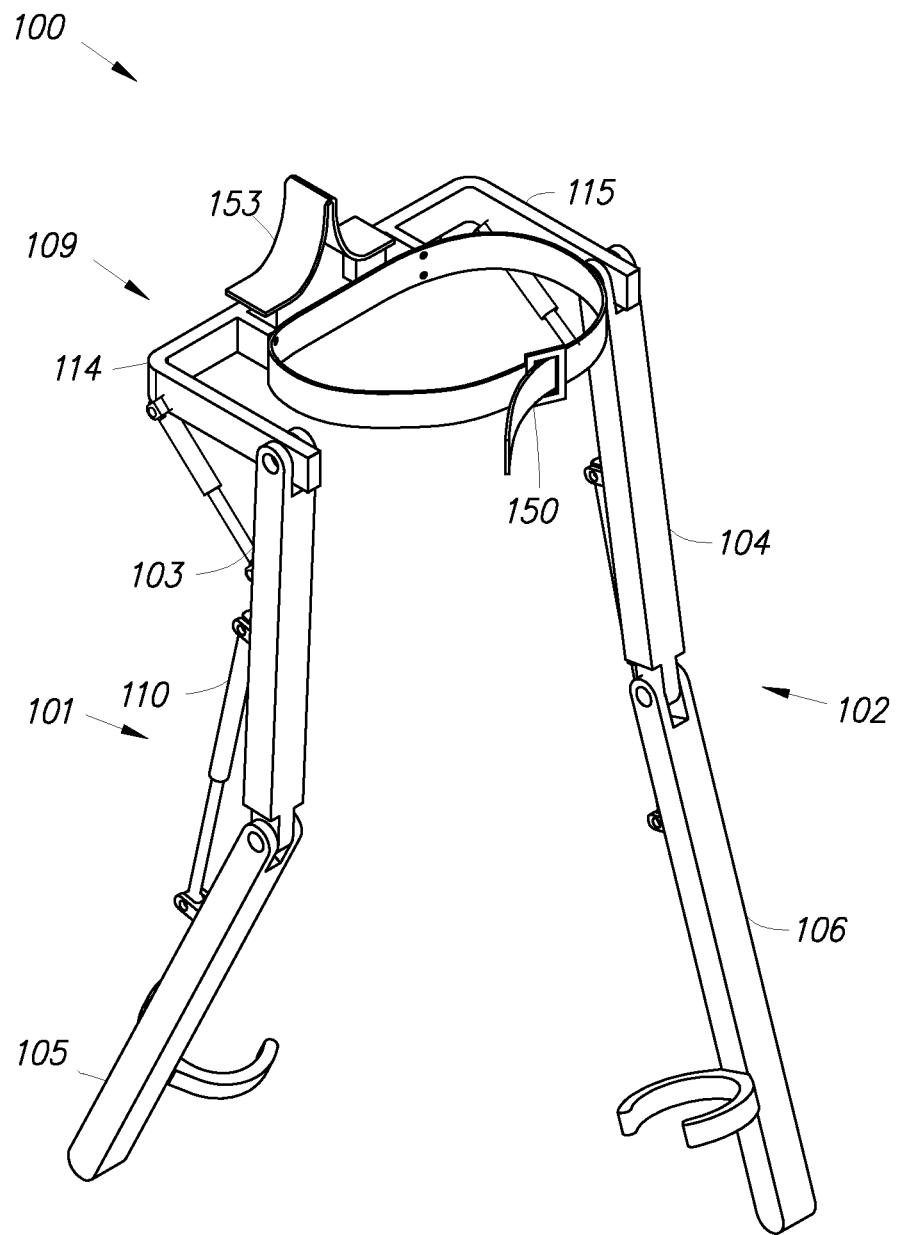
FIG. 14 is a perspective drawing of an alternative exoskeleton of the present invention including a hip resilient element in the form of a leaf spring.

In accordance with another embodiment of the invention, FIG. 14 is a perspective drawing where exoskeleton trunk 109 includes two hip links 114 and 115 rotatably connectable to thigh links 103 and 104 allowing for flexion and extension of leg supports 101 and 102 relative to exoskeleton trunk 109, wherein hip links 114 and 115 are compliantly connected to each other, allowing for abduction and/or adduction of leg supports 101 and 102. In the example shown in FIG. 14, this is accomplished by a leaf spring acting as hip resilient element 153.

Figure 15:
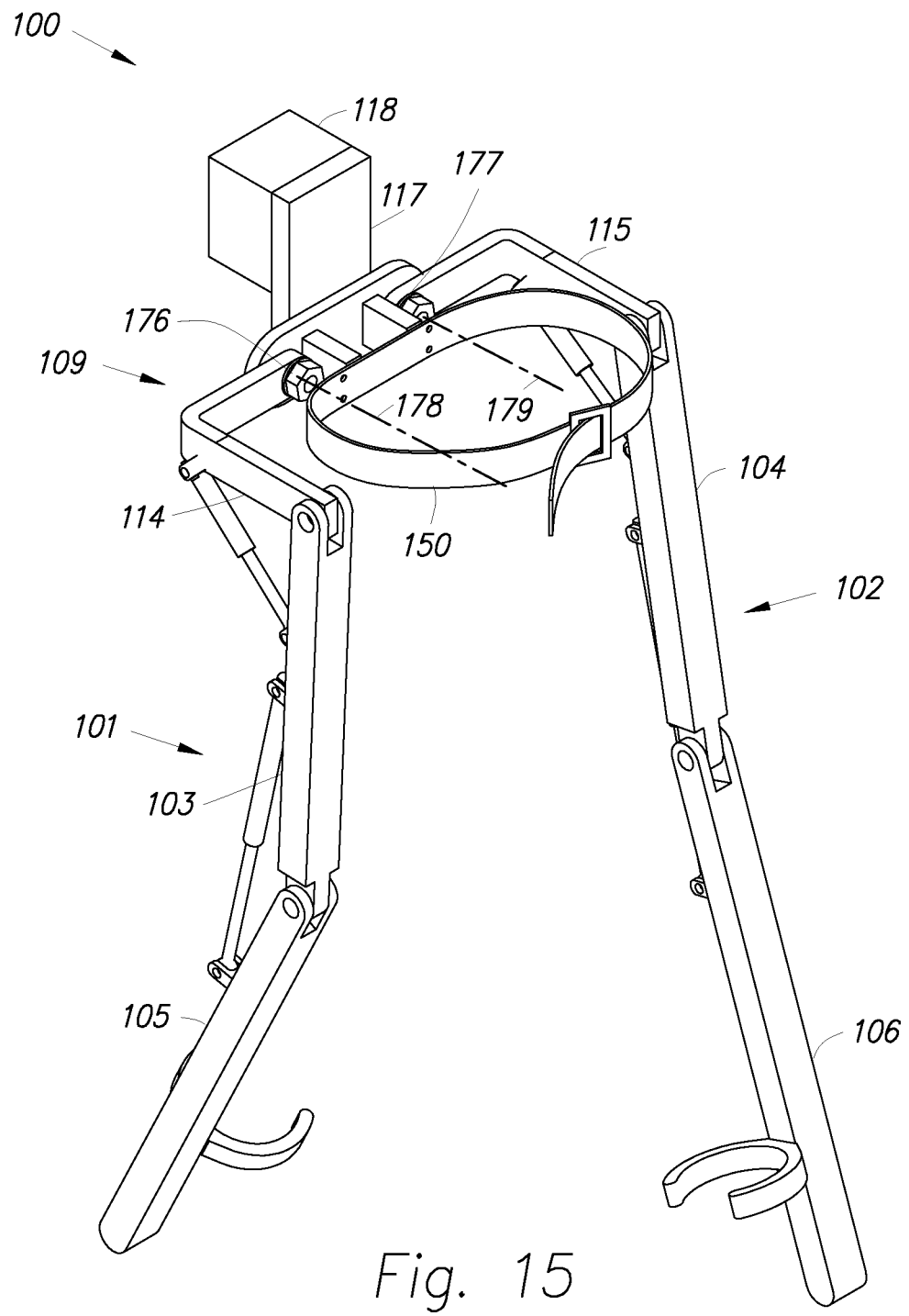
FIG. 15 is a perspective drawing of an alternative exoskeleton of the present invention including two hip resilient elements.

In accordance with another embodiment of the invention, FIG. 15 is a perspective drawing wherein exoskeleton trunk 109, among other components, further comprises a connecting bracket 117 configured to transfer the weight of a rear load 118 to exoskeleton trunk 109. Exoskeleton trunk 109 further comprises two hip links 114 and 115 rotatably connectable to thigh links 103 and 104 allowing for flexion and extension of leg supports 101 and 102 relative to exoskeleton trunk 109.

Hip links 114 and 115 are rotatably connected to connecting bracket 117 via two hip abduction-adduction joints 176 and 177 and rotate about two hip abduction-adduction axes 178 and 179. In some embodiments, hip abduction-adduction axes 178 and 179 are generally parallel to each other. In some embodiments, hip abduction-adduction joints 176 and 177 coincide with each other. Furthermore, in some embodiments, as shown in FIGS. 9-12, hip abduction-adduction joints 176 and 177 coincide with each other forming hip abduction-adduction joint 113, and hip abduction-adduction axes 178 and 179 become one hip abduction-adduction axis 112.

Figure 16:
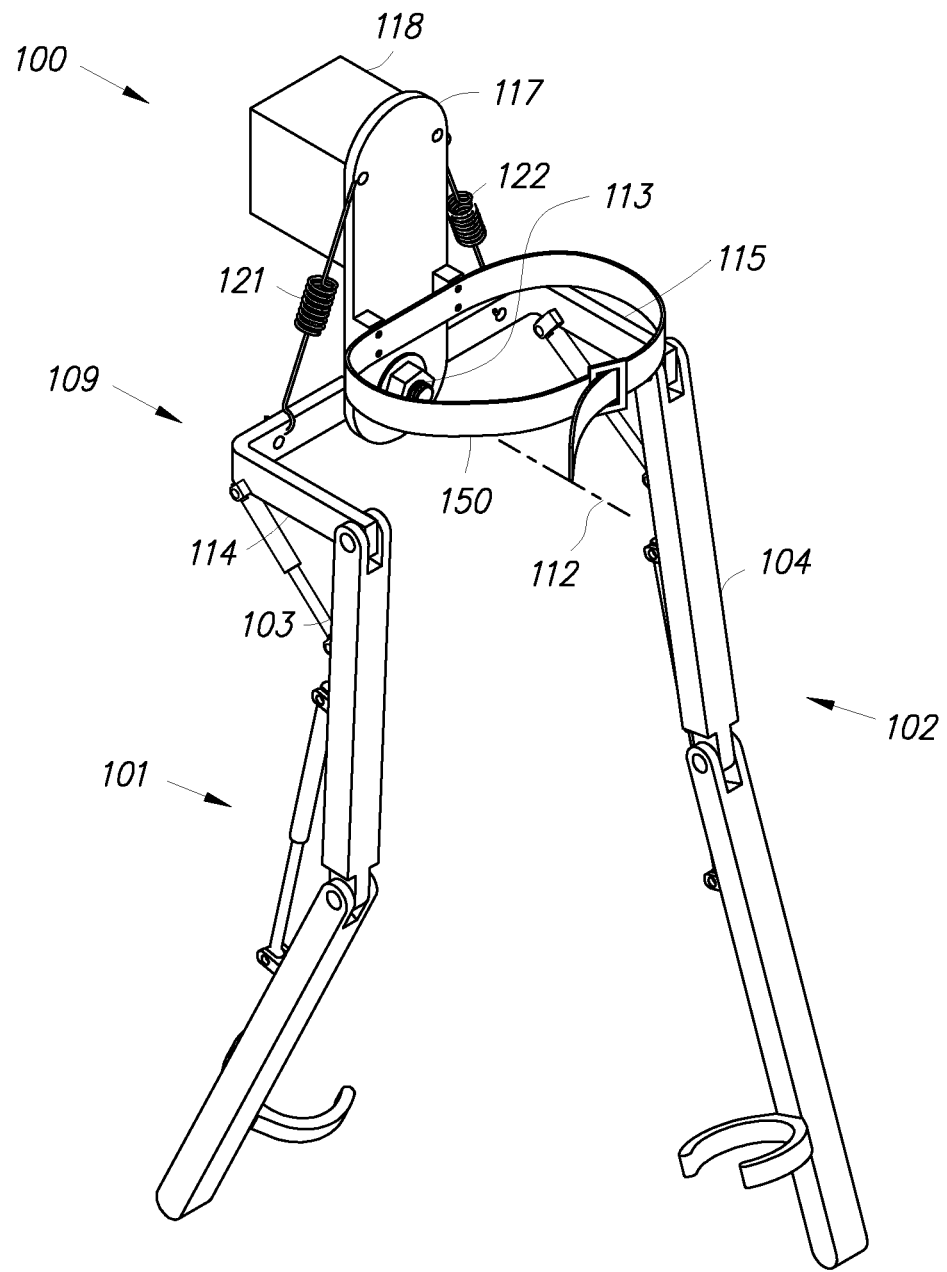
FIG. 16 is a perspective drawing of an alternative exoskeleton of the present invention including two hip joints.

In some embodiments, as shown in FIG. 16, exoskeleton trunk 109 further comprises abduction-adduction hip resilient elements 121 and 122 configured to apply torques between hip links 114 and 115 and connecting bracket 117. Examples of hip abduction-adduction resilient elements include, without limitation, extension spring, compression spring, gas spring, air spring, rubber, surgical tube, leaf springs, bungee cord, and combinations thereof. The stiffness of abduction-adduction hip resilient elements 121 and 122 may be chosen such that its force generally holds up the weight of the leg supports 101 or 102 during swing phase and aid the person in keeping the load oriented vertically while walking.

Figure 17:
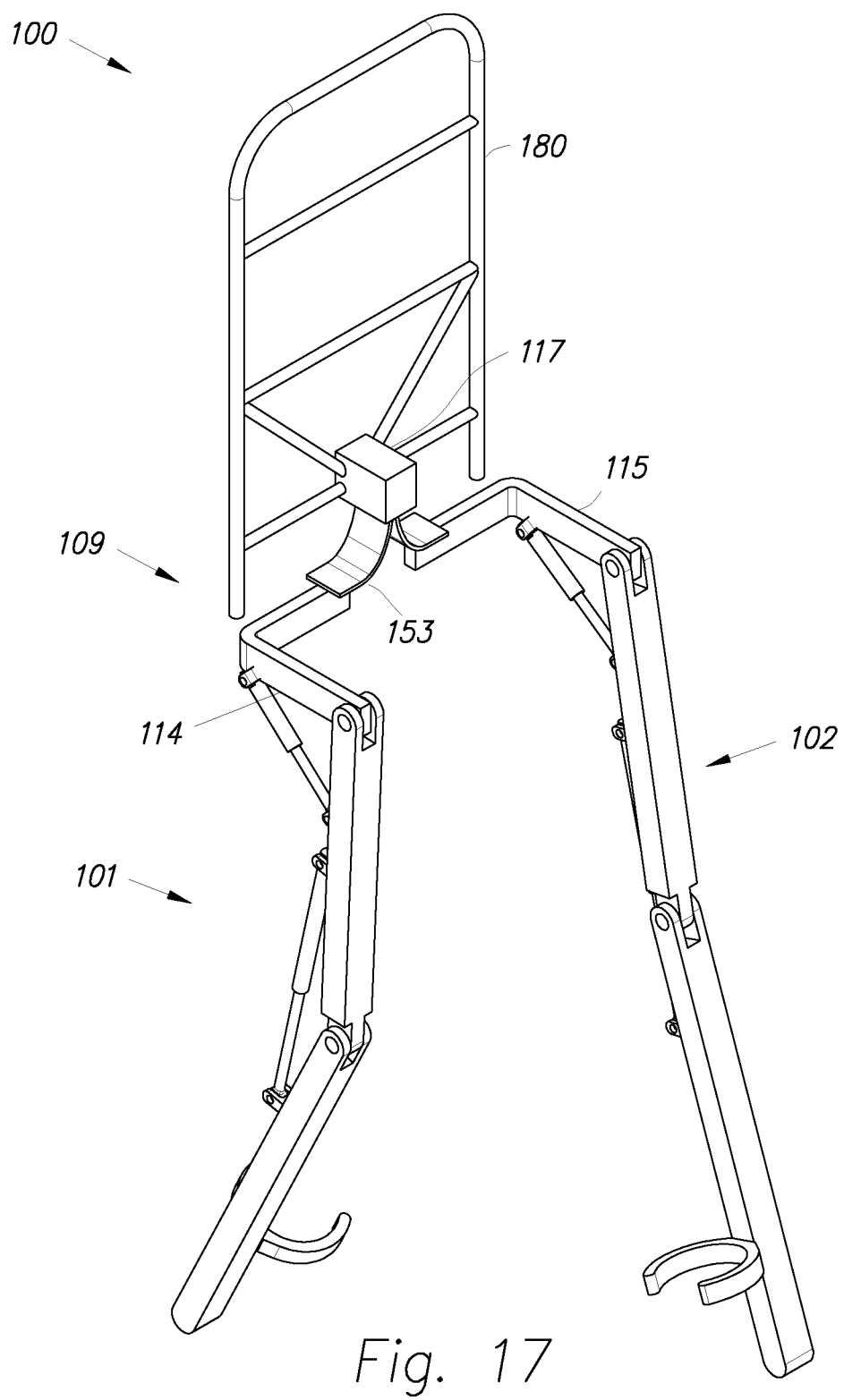
FIG. 17 is a perspective drawing of an alternative exoskeleton of the present invention including a back pack frame.

In some embodiments, as shown in FIG. 17, hip links 114 and 115 are compliantly connected to connecting bracket 117. In the embodiment shown in FIG. 17, this is accomplished by a hip resilient element 153 which, in this case, is a leaf spring.

In some embodiments, as shown in FIG. 17, exoskeleton trunk 109 comprises a backpack frame 180 that allows a backpack to be coupled to lower extremity exoskeleton 100. In some embodiments, backpack frame 180 is connected to connecting bracket 117. The upper body interface devices 150 (such as a belt and shoulder straps) have been omitted in this figure for clarity; however, upper body interface devices 150, in some embodiments, can be coupled to backpack frame 180 or connecting bracket 117.

In accordance with another embodiment depicted in FIG. 18, leg supports 101 and 102 further include thigh abduction-adduction joints 123 and 124 which are configured to allow abduction and/or adduction of leg supports 101 and 102 about thigh abduction-adduction axes 202 and 203 respectively. In some embodiments, thigh abduction-adduction joints 123 and 124 are located below hip flexion-extension joints 125 and 126. These joints are shown in greater detail in FIG. 19 which is a partial view of the same embodiment of FIG. 18.

Figure 19:
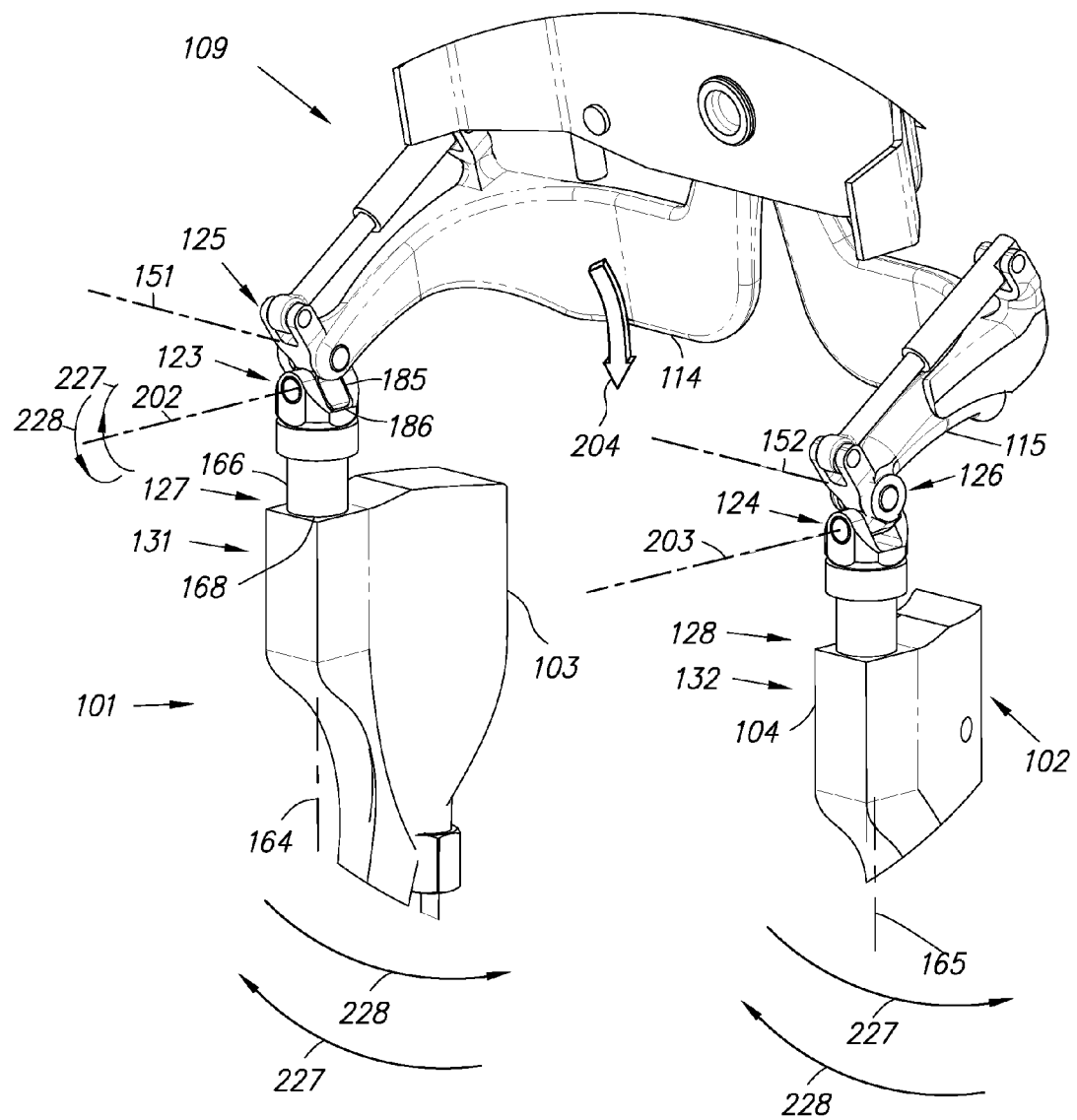
FIG. 19 is a partial view of the exoskeleton of FIG. 18, showing thigh joint details.

In some embodiments, as shown in FIG. 19, right leg support 101 includes a thigh adduction stop 185 which limits or prevents right thigh link 103 from adducting at thigh abduction-adduction joints 123 and 124. Abduction and adduction of right leg support 101 are shown by arrows 227 and 228 respectively. In the particular embodiment shown in FIG. 19, right thigh abduction-adduction joint 123 includes a thigh adduction stop 185 which bears on a thigh stop surface 186. Thigh adduction stop 185 limits the adduction of thigh abduction-adduction joint 123. The unrestricted adduction of right thigh abduction-adduction joint 123 during stance phase would cause right hip link 114 to move downwardly along arrow 204 during stance, thereby dropping (lowering) the load. Such abduction-only joints for thigh abduction-adduction joints 123 and 124 are useful in allowing the person to squat naturally. In some embodiments like the one shown in FIGS. 18 and 19, such abduction joints are generally located below hip flexion-extension joints 125 and 126.

Figure 20:
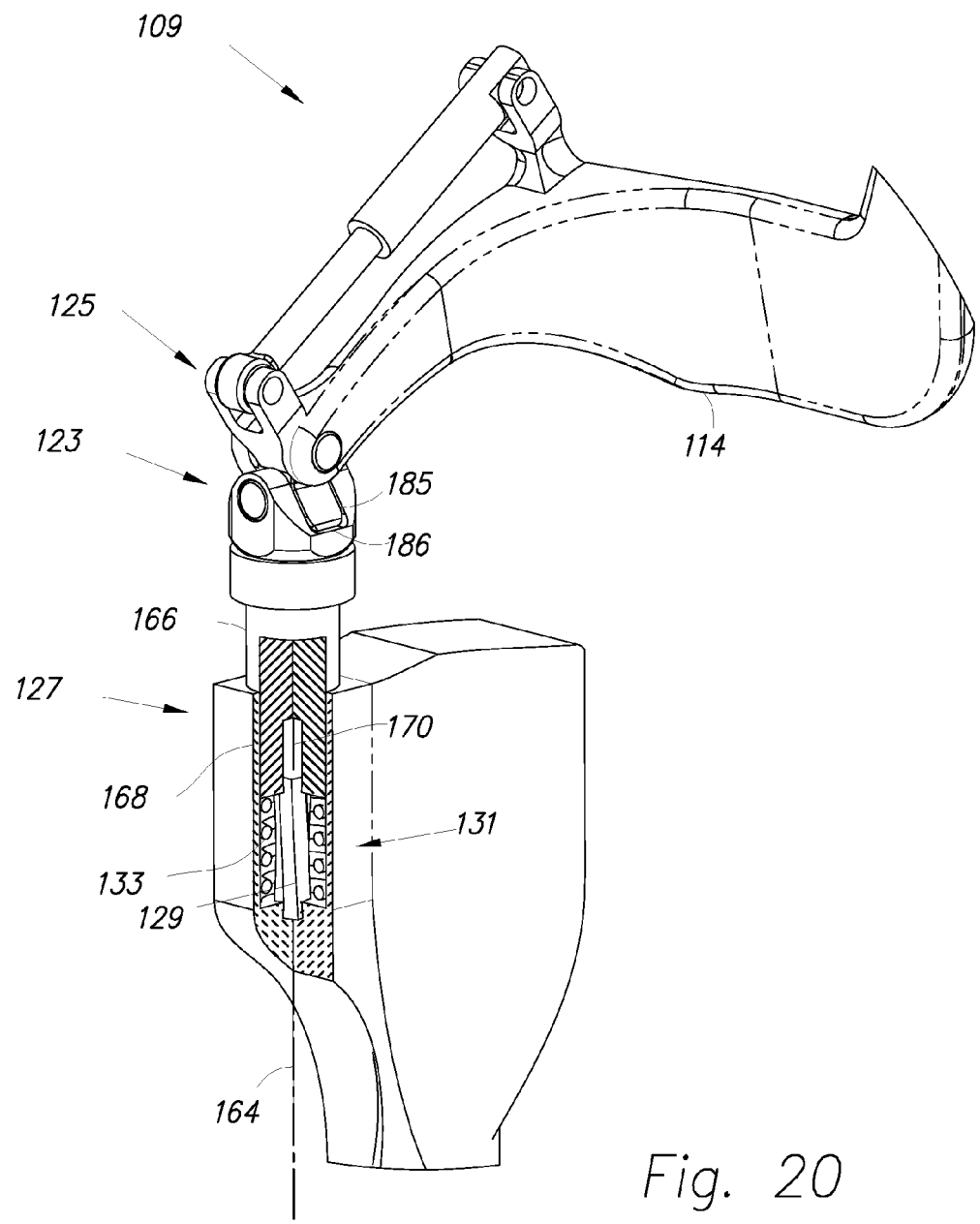
FIG. 20 is a partial view of the exoskeleton of FIG. 18, showing details of a compression-elongation mechanism.

In some embodiments, as shown in FIGS. 18 and 19, leg supports 101 and 102 further include leg rotation joints 127 and 128 configured to allow rotation of leg supports 101 and 102. Leg rotation joints 127 and 128 are generally located above knee joints 107 and 108. Lines 164 and 165 represent the leg rotation axes of leg rotation joints 127 and 128. In FIGS. 19 and 20, this is accomplished by providing a sliding contact between the right hip rotation shaft 166 and the right hip rotation journal 168. The parts included in the joint which prevent it from pulling apart have been omitted for simplicity, but one skilled in the art will note that there are many ways of retaining such shafts in such journals.

In some embodiments, as shown in FIG. 20, leg rotation joints 127 and 128 further comprise of a rotation resilient element 129. This rotation resilient element acts as a torsion spring and provides a restoring torque which generally restores the leg support back to the neutral position shown in FIG. 18. Rotation resilient element 129 can be constructed in many ways with the particular cross section shown in FIG. 20 being advantageous when using an elastomeric material to construct the element. Rotation resilient element 129 is shown partially deflected for illustration purposes.

Also, in some embodiments, as shown in FIG. 19 and FIG. 20, leg supports 101 and 102 further comprise of compression-elongation mechanisms 131 and 132 configured to change the distance between exoskeleton trunk 109 and the respective knee flexion-extension joints 107 and 108. In some embodiments, compression-elongation mechanisms 131 and 132 allow for changes in the distance between the hip flexion-extension joints 125 and 126 and the respective flexion-extension knee joints 107 and 108. The compression-elongation mechanisms contracts by right hip rotation shaft 166 sliding further into the right hip rotation journal 168 (shown for right leg 101 only). The leg rotation resilient element 129 is allowed to slide into a clearance cavity 170. In some embodiments, compression-elongation mechanisms 131 and 132 further comprise of a right leg compression-elongation resilient element 133. This leg compression-elongation resilient element acts as a spring and provides a restoring force which generally restores the leg support back to a neutral configuration. In the embodiment of FIG. 20, this is illustrated by a helical compression spring.

In some embodiments, as shown in FIG. 18, exoskeleton hip mechanism cover 171 may cover some components of exoskeleton including parts of hip links 114 and 115, hip resilient element, or abduction-adduction hip resilient elements 121 and 122.

Figure 21:
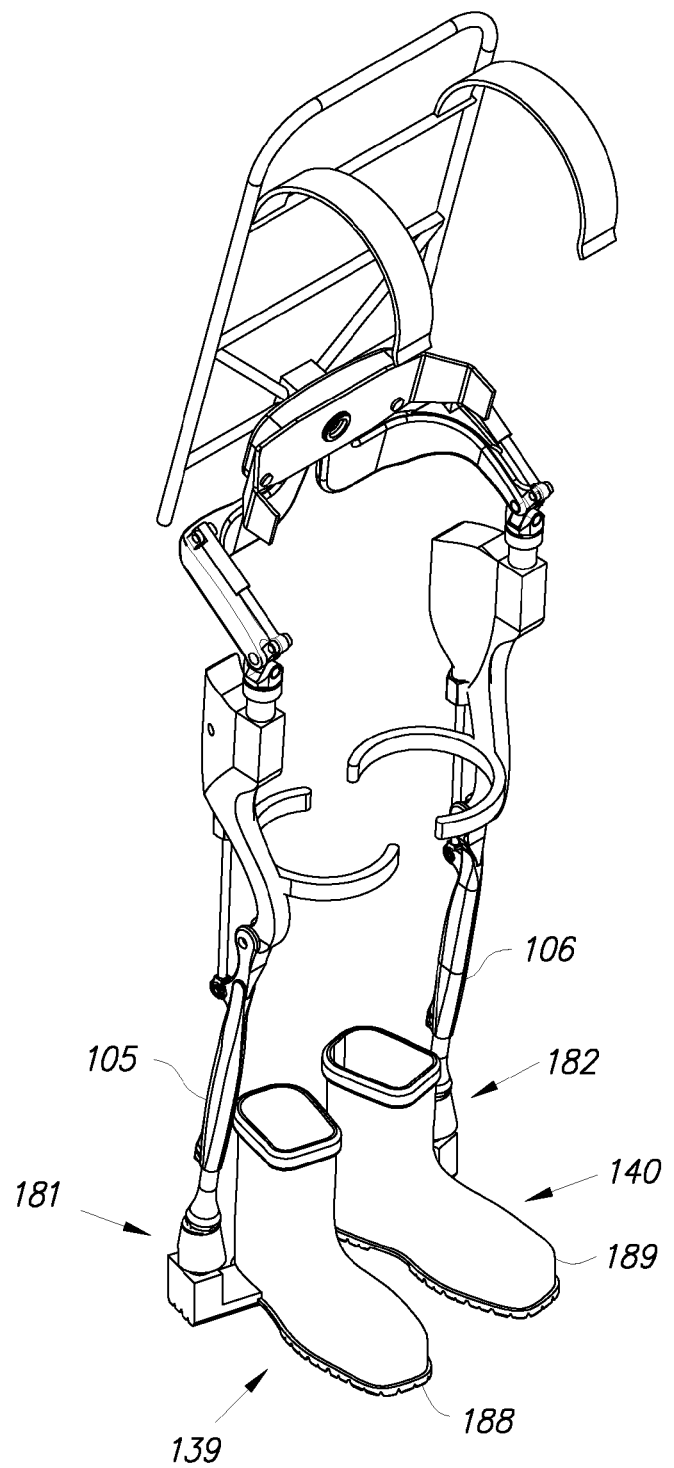
FIG. 21 is a perspective drawing of an alternative exoskeleton of the present invention including shoes.
Figure 22:
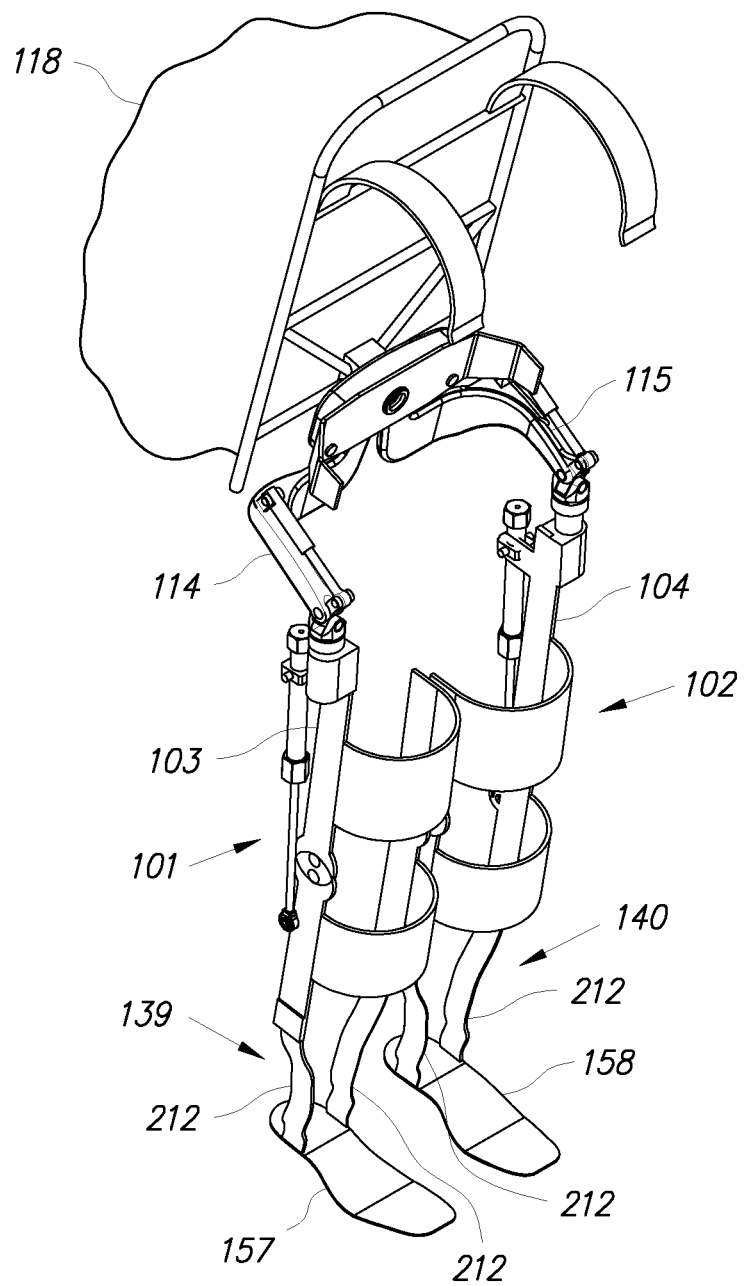
FIG. 22 is a perspective drawing of an alternative exoskeleton of the present invention including insoles.

In some embodiments, as shown in FIG. 18, leg supports 101 and 102 further comprise of exoskeleton feet 139 and 140 coupled to shank links 105 and 106 respectively, allowing the transfer of forces from shank links 105 and 106 to the ground. In operation, exoskeleton feet 139 and 140 are configurable to be coupled to the feet of person 187. In some embodiments, as shown in FIG. 18, the coupling to the person's feet is accomplished by using clam-shell type bindings 205 and 206 sometimes found on modern snow shoes. However, there are a great number of methods to make such a connection as can be seen on different types of snow skis, snowboards, snowshoes, and other such devices. In some embodiments, as shown in FIG. 21, exoskeleton feet 139 and 140 comprise of exoskeleton shoes 188 and 189 wearable by person 187, thereby allowing exoskeleton feet 139 and 140 to couple to the feet of person 187. In some embodiments, as shown in FIG. 22, exoskeleton feet 139 and 140 comprise of exoskeleton insoles 157 and 158 insertable inside the person's shoes, allowing exoskeleton feet 139 and 140 to couple to the feet of person 187. Insoles 157 and 158 are flexible and therefore, can bend to match the curvature of the human foot during maneuvers such as squatting. Also, the insole side supports 212 are either compliant or configured to include degrees of freedom to mimic the movement of the human ankle.

Figure 23:
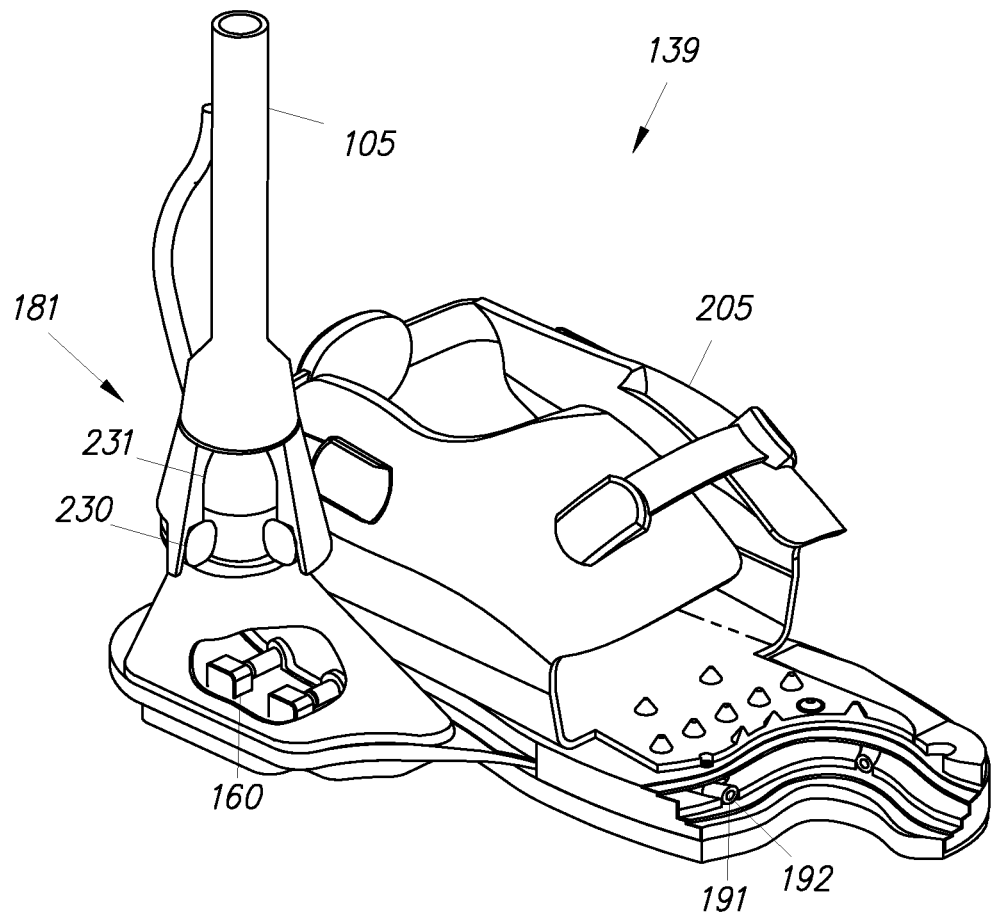
FIG. 23 is partial view of an exoskeleton foot of FIG. 18 including a ball and socket joint.

In some embodiments, as shown in FIG. 18, exoskeleton feet 139 and 140 are compliantly coupled to shank links 105 and 106. This is accomplished using ankle resilient elements 181 and 182. FIG. 23 shows a close-up view of right exoskeleton foot 139. In this example, right ankle resilient element 181 is constructed of a metal ball-and-socket joint 231 surrounded by a doughnut shaped elastomer element 230 which creates compliance in all directions of rotations.

Figure 24:
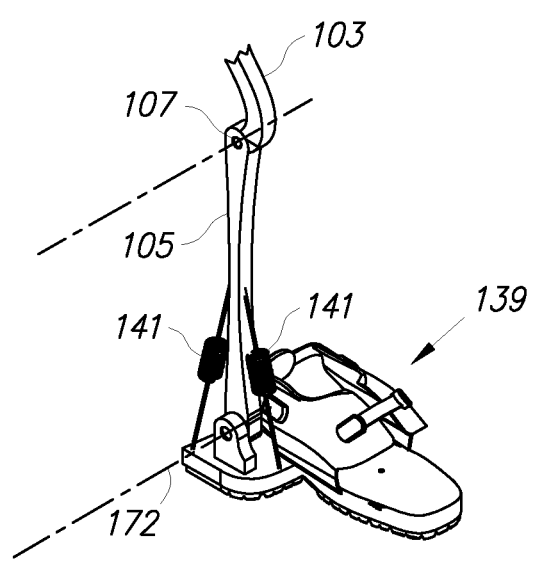
FIG. 24 is a perspective drawing of an alternative exoskeleton foot of the present invention including resilient elements.

In some embodiments, exoskeleton feet 139 and 140 rotate about two plantar-dorsi flexion axes relative to shank links 105 and 106. FIG. 24 shows an embodiment of this type of exoskeleton where right ankle plantar-dorsi flexion axis 172 is generally parallel to the plantar-dorsi flexion axis in the human ankle. In some embodiments, each leg support further comprises at least one ankle plantar-dorsi flexion resilient element 141 resisting the rotation of respective exoskeleton foot about right ankle plantar-dorsi flexion axis 172.

Figure 25:
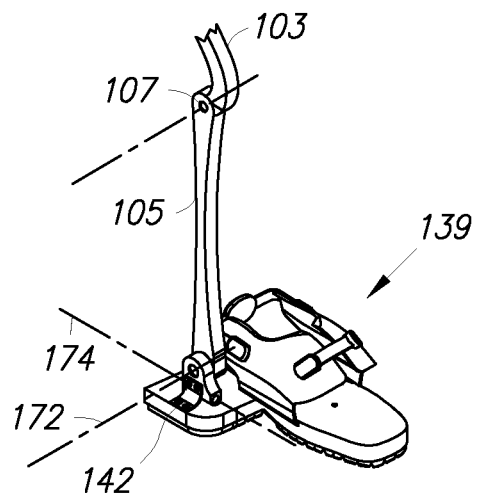
FIG. 25 is a perspective drawing of an alternative exoskeleton foot of the present invention including an abduction-adduction resilient element.

In some embodiments, exoskeleton feet 139 and 140 rotate about two ankle abduction-adduction axes relative to shank links 105 and 106. FIG. 25 shows an embodiment of this type of exoskeleton where right ankle abduction-adduction axis 174 is generally parallel to the abduction-adduction axis in the human ankle. In some embodiments, each leg support further comprises at least one ankle abduction-adduction resilient element 142 resisting the rotation of right exoskeleton foot 139 about right ankle abduction-adduction axis 174.

Figure 26:
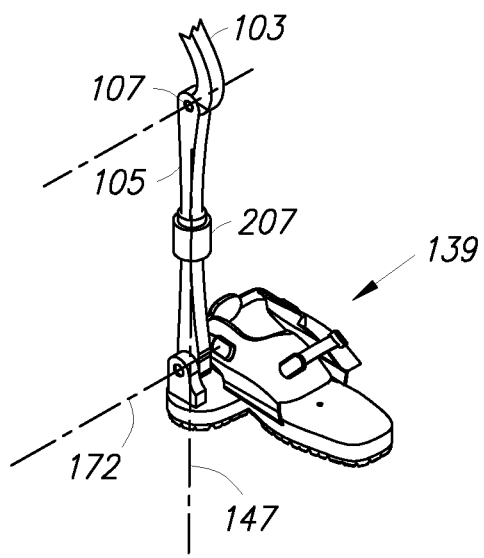
FIG. 26 is a perspective drawing of an alternative exoskeleton foot of the present invention including a shank rotating joint.

In some embodiments, exoskeleton feet 139 and 140 rotate about two ankle rotation axes 147 and 148 relative to shank links 105 and 106. In some embodiments, as shown in FIG. 26, this is accomplished using a shank rotation joint 207 which functions similar to leg rotation joint 127. FIG. 26 shows an embodiment of this type of exoskeleton where right ankle rotation axis 147 is generally parallel to the rotation axis in the human ankle. In some embodiments, resilient elements can be included in the ankle to resist the rotation of right exoskeleton foot 139 about right ankle rotation axis 147.

FIGS. 27a-27f depict torque during the use of the exoskeleton of the present invention as depicted in FIG. 5 and utilizing exoskeleton foot 139. The analysis above describing power transfer between person 187 and lower extremity exoskeleton 100 applies to FIGS. 27a-27f, if one assumes the rotation of right leg support 101 about at a right ankle point.

Figure 28:
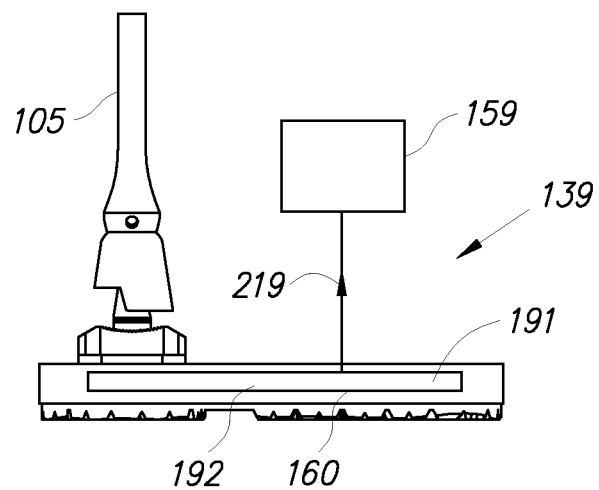
FIG. 28 is a partial cross-sectional side view of an alternative exoskeleton foot of the present invention including an integrated stance sensor.

In some embodiments, as shown in FIG. 28, stance sensors 160 and 161 are integrated into exoskeleton feet 139 and 140. In some embodiments, as shown in FIG. 28, stance sensor 160 is a pressure sensor measuring the pressure in a media 191 trapped in a stance sensor cavity 192 inside right exoskeleton foot 139. FIG. 23 shows an embodiment where a tube is used as a stance sensor cavity 192. In some cases, the stance signals 219 and 220 may take the form of the media 191 itself, ported in a small tube from stance sensor cavity 192 to signal processor 159.

Figure 29:
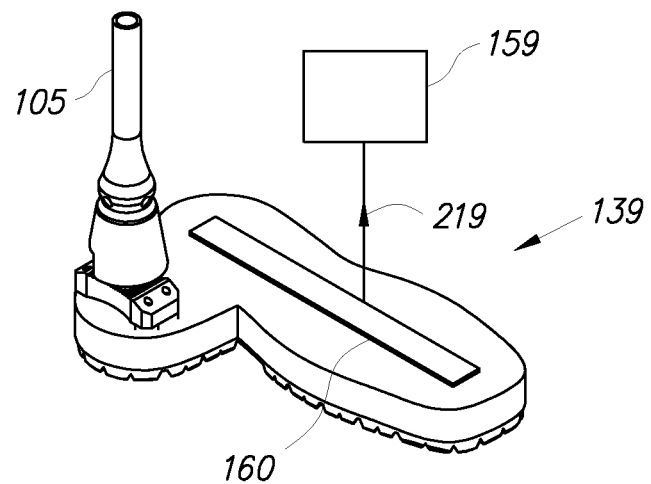
FIG. 29 is a top perspective view of an alternative exoskeleton foot of the present invention including a force sensor.
Figure 30:
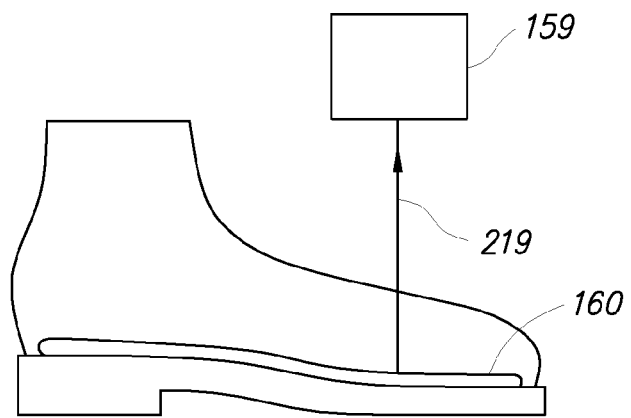
FIG. 30 is a partial cross-sectional side view of an alternative shoe of the present invention including an integrated stance sensor.
Figure 31:
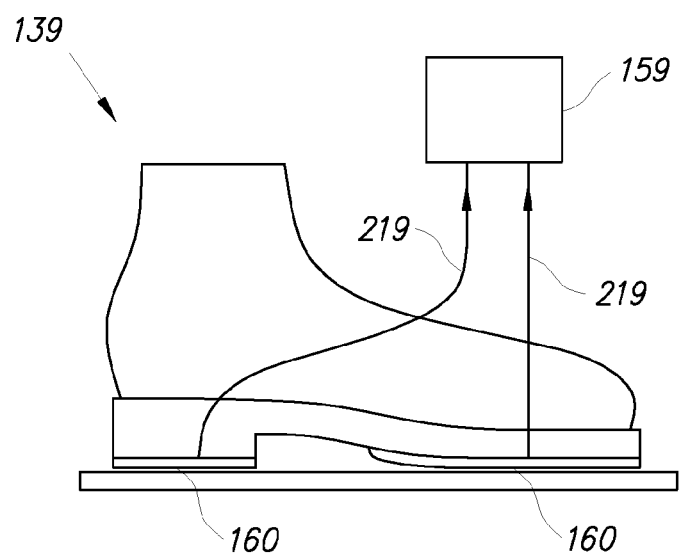
FIG. 31 is a partial cross-sectional side view of an alternative shoe of the present invention including a sole-mounted stance sensor.
Figure 32:
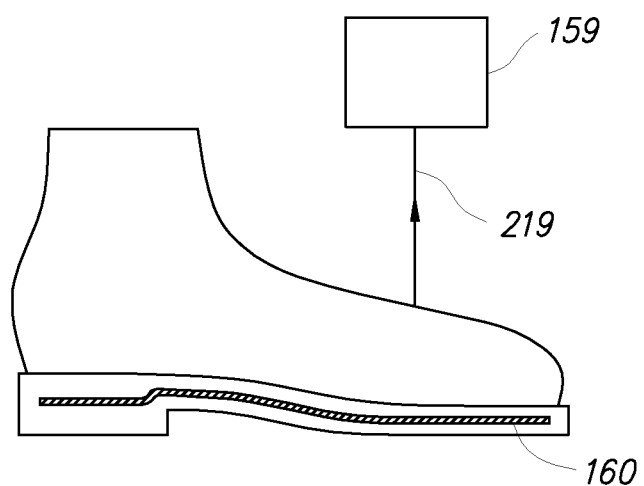
FIG. 32 is a partial cross-sectional side view of an alternative shoe of the present invention including a force sensor incorporated into the shoe sole.

FIG. 29 shows another embodiment wherein stance sensor 160 is a force sensor connectable to right exoskeleton foot 139. In some embodiments, as shown in FIG. 30, stance sensor 160 is located inside the human shoe like an insole and its output signal represents the force on the bottom of the human foot. This type would be particularly useful in embodiments of the invention such as those shown in FIG. 21 or 22. In some embodiments, as shown in FIG. 31, stance sensor 160 is connected to the bottom of the human shoe and senses the force on the bottom of the human foot. In some embodiments, as shown in FIG. 32, stance sensor 160 is located inside the human shoe sole and senses the force on the bottom of the human foot. In some embodiments, stance sensors 160 and 161 are coupled to shank links 105 and 106 respectively.

Stance sensor 160 comprises any sensor or combination of sensors capable of performing the indicated functions. Examples of stance sensor 160 include, without limitation, force sensors, strain-gage based force sensors, piezoelectric force sensors, force sensing resistors, pressure sensors, switches, tape switches, and combinations thereof. In some embodiments, stance sensor 160 is a switch that represents the existence of a force greater than some threshold force on the bottom of the foot of person 187.

Figure 33:
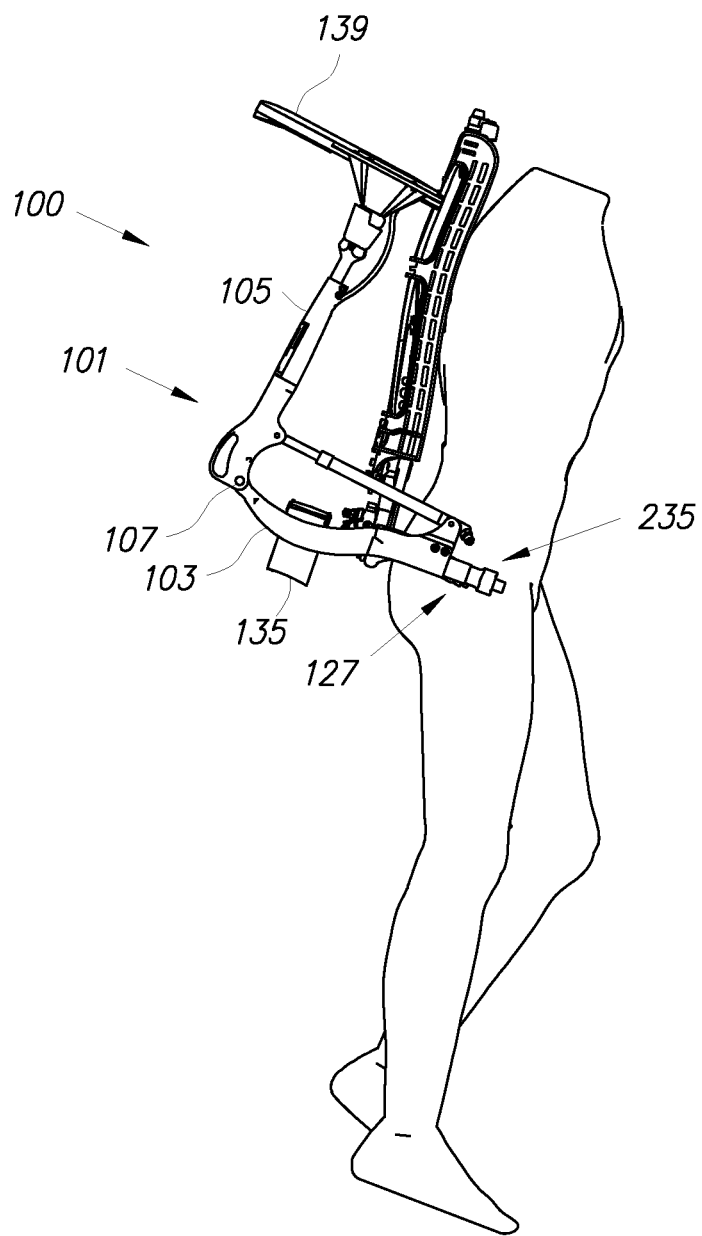
FIG. 33 is a side view of an alternative exoskeleton of the present invention carried in a vertical stowed position.
Figure 34:
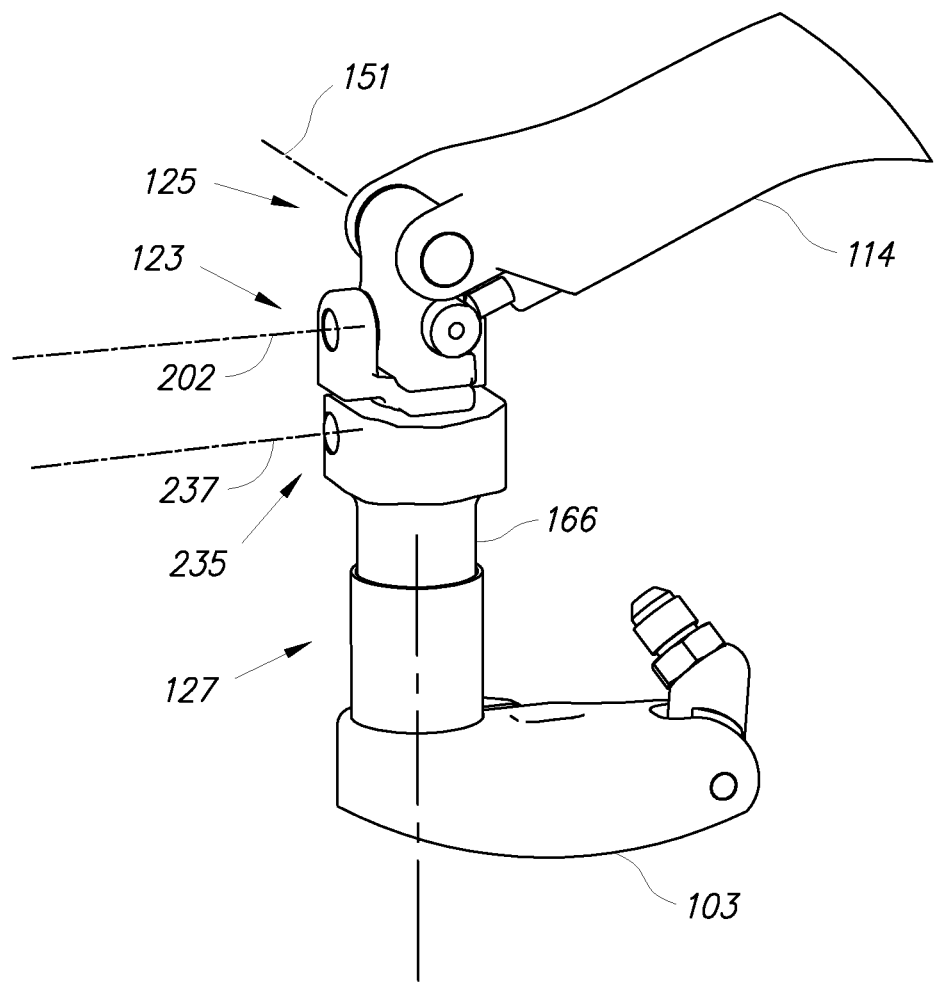
FIG. 34 is a partial perspective view of the exoskeleton of FIG. 33.

Also, shown in FIG. 33 is an additional thigh abduction-adduction joint 235 which is included in order to allow the leg to be stowed in a vertical position when the exoskeleton is not in use but needs to be carried. Right leg support 101 can abduct along an additional right thigh abduction-adduction axis 237. This may be desirable if person 187 no longer has a very heavy load to carry but needs to transport lower extremity exoskeleton 100. In that case, the operator may unstrap the exoskeleton's right leg support 101 and swing the leg outward from his or her body until the right exoskeleton foot 139 is in the air over the operator's head. Then by bending the right knee joint 107 and/or rotating the right leg rotation joint 127, the leg can be positioned such that it stows behind the operator as shown in FIG. 33. This is possible because the right thigh abduction-adduction joint 123 and the additional right thigh abduction-adduction joint 235 each allow for a rotation of approximately ninety degrees about the right thigh abduction-adduction axis 202 and the additional right thigh abduction-adduction axis 237 respectively. Therefore, the total abduction possible is over 180 degrees. This could be accomplished with one thigh abduction-adduction joint which has 180 degrees of travel, but designing such a joint would cause the designer to move the pivot point of the joint outward from the operator a great deal which would result in a wider exoskeleton design. This is undesirable but is a viable alternative design.

In some embodiments, lower extremity exoskeleton 100 (as shown in FIG. 1) comprises two torque generators 110 and 111 which are configured to allow flexion of knee joints 107 and 108 during swing phase and resist flexion of knee joints 107 and 108 during stance phase, thereby allowing the lower extremity exoskeleton 100 to bear a load and transfer the load forces (e.g., load weight) to the ground.

In some embodiments, torque generators 110 and 111 are hydraulic torque generators. In accordance with some embodiments, torque generators 110 and 111 are hydraulic piston cylinders where the motion of the piston relative to the cylinder creates hydraulic fluid flow into or out of the cylinder. In operation, the hydraulic fluid flow into or out of the cylinder may be controlled by a hydraulic valve. The smaller the hydraulic valve orifice size is, the more force is needed to move the piston relative to the cylinder with a given speed. In other words, the more damped the motion of the piston relative to the cylinder needs to be, the smaller the hydraulic valve orifice size should be. If the hydraulic valve orifice size is large, then a small force is required to move the piston relative to the cylinder. Here, impedance of hydraulic torque generators 110 and 111 is defined as the ratio of the required force over the velocity in frequency domain. With this definition, the smaller the hydraulic valve orifice size is, the larger the impedance of the hydraulic torque generator will be.

Figure 35:
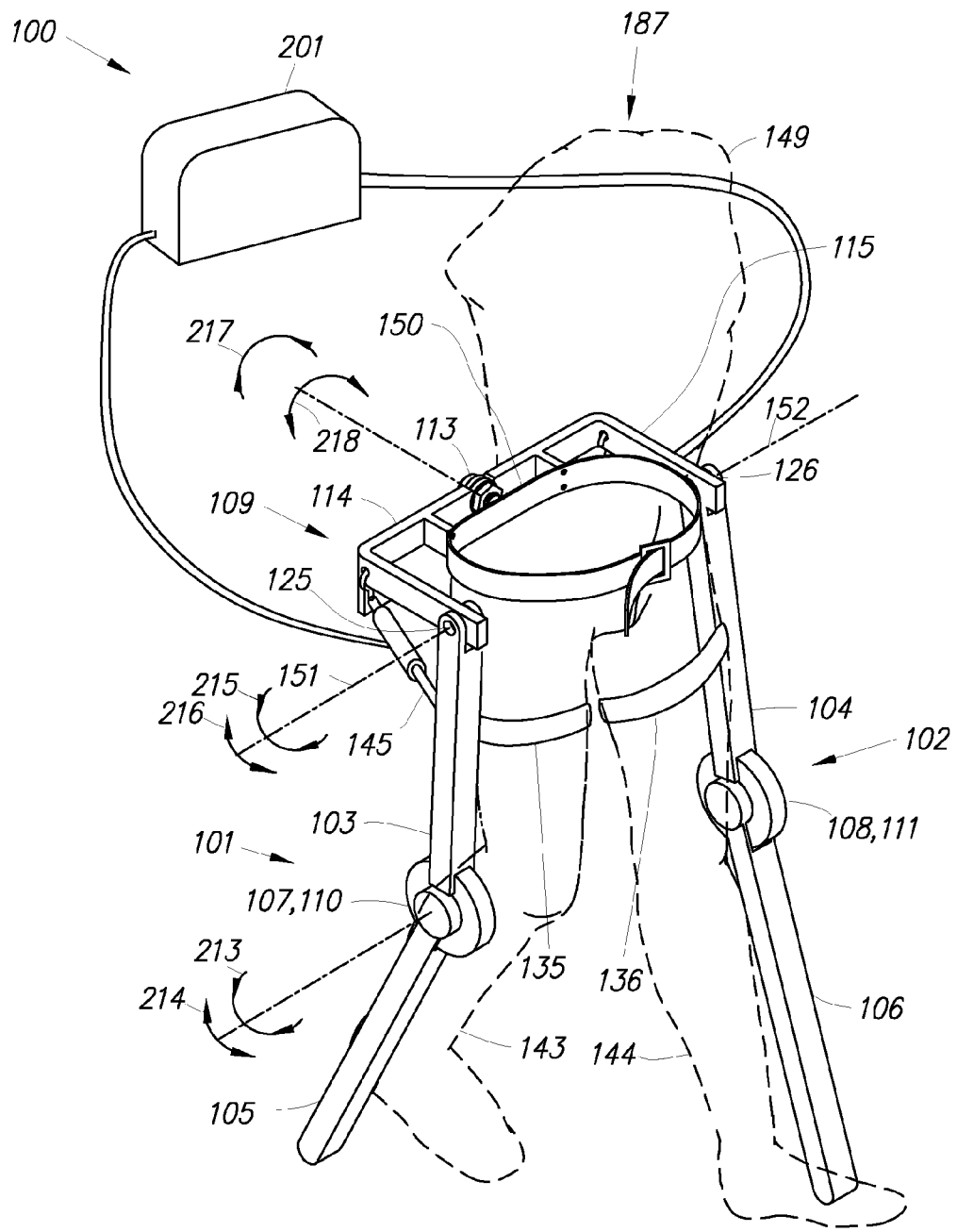
FIG. 35 is a perspective drawing of an alternative exoskeleton foot of the present invention including hydraulic rotary dampers.

In some embodiments, as shown in FIG. 35, torque generators 110 and 111 are hydraulic rotary dampers where the torque produced may be controlled by a hydraulic valve. The smaller the hydraulic valve orifice size is, the more torque is needed to rotate the hydraulic rotary damper with a given speed. In other words, the more damped the rotation of the hydraulic rotary damper needs to be, the smaller the hydraulic valve orifice size should be. Here, impedance of hydraulic rotary generators 110 and 111 is defined as the ratio of the required torque over the angular velocity in frequency domain. With this definition, the smaller the hydraulic valve orifice size is, the larger the impedance of the hydraulic rotary damper will be.

In some embodiments, torque generators 110 and 111 are friction brakes where one can control the resistive torque on knee joints 107 and 108 by controlling the friction torques. In other embodiments, torque generators 110 and 111 are viscosity based friction brakes where one can control the resistive torque on knee joints 107 and 108 by controlling the viscosity of the fluid. In other embodiments, torque generators 110 and 111 are Magnetorheological Fluid Devices where one can control the resistive torque on knee joints 107 and 108 by controlling the viscosity of the Magnetorheological Fluid. One skilled in the art realizes that any of the above devices can be mounted in the invention to function in the same way as the hydraulic rotary dampers shown in FIG. 35.

In some embodiments, signal processor 159 is configured to control torque generators 110 and 111. Signal processor 159 controls the resistance to flexion in knee joints 107 and 108 as a function of stance signals 219 and 220 depicted in FIG. 9. For example, when right stance sensor 160 detects the stance phase in right leg support 101, signal processor 159 will increase the impedance of right torque generator 110 so that right knee joint 107 resists flexion. Conversely, when right stance sensor 160 detects the swing phase in right leg support 101, signal processor 159 will decrease the impedance of right torque generator 110 so that no resistance to flexion occurs in right knee joint 107. Similarly, when stance sensor 161 detects the stance phase in left leg support 102, signal processor 159 will increase the impedance of left torque generator 111 so that left knee joint 108 resists flexion. Conversely, when left stance sensor 161 detects the swing phase in left leg support 102, signal processor 159 will decrease the impedance of left torque generator 111 so that no resistance to flexion occurs in left knee joint 108. Large impedances of torque generators 110 and 111 lead to large resistance of knee joints 107 and 108 to flexion needed during the stance phase. Conversely, small impedances of torque generators 110 and 111 lead to small resistance of knee joints 107 and 108 to flexion needed during swing phase. In some embodiments, signal processor 159 is mounted to torque generators 110 and 111.

In practice, the resistance to flexion in knee joints 107 and 108 during the stance phase need not be constant. In some embodiments, the resistance to flexion at the beginning of the stance phase (approximately the first 20% of the stance cycle) may be extremely high (i.e., knee joints 107 and 108 will be locked in the beginning of stance). During the middle of the stance phase (approximately the 20% to 80% of the stance cycle), the resistance to flexion may be lower, but high enough that knee joints 107 and 108 will only undergo a few degrees of flexion. During the end of the stance cycle (approximately the last 20% of the stance cycle), the resistance to flexion may be low, but still nonzero, so that knee joints 107 and 108 may flex in preparation for the swing cycle.

In some embodiments, each of leg supports 101 and 102 further comprises a torque generator wherein each torque generator comprises a hydraulic piston-cylinder. In these embodiments, power unit 201, among other components, comprises at least one knee hydraulic circuit 190 connectable to torque generators 110 and 111. See FIGS. 36-40. Knee hydraulic circuit 190 is configured to modulate the fluid flow to torque generators 110 and 111. In operation (using right leg support 101 as an example), when right leg support 101 is in a stance phase, knee hydraulic circuit 190 is configured to restrict the fluid flow to right torque generator 110 of right leg support 101. When leg support 101 is in a swing phase, knee hydraulic circuit 190 is configured to allow the fluid flow to right torque generator 110 of right leg support 101. In other words, knee hydraulic circuit 190, when leg support 101 is in a stance phase, is configured to increase the resistance to flexion of right knee joint 107. Knee hydraulic circuit 190, when leg support 101 is in a swing phase, is configured to decrease the resistance to flexion of right knee joint 107. The above behavior is also true for leg support 102. In some embodiments of the invention, lower extremity exoskeleton 100 further comprises at least one stance sensor 160 and 161 per leg supports 101 and 102. Stance sensors 160 and 161 produce stance signals 219 and 220, indicating whether leg supports 101 and 102 are in the stance phase. In some embodiments, knee hydraulic circuit 190 and hydraulic circuit 194 may be coupled to each other or share components. In some embodiments, one knee hydraulic circuit 190 may be used for both torque generator 110 and 111, or each of torque generators 110 and 111 may connect to an independent knee hydraulic circuit 190.

Figure 36:
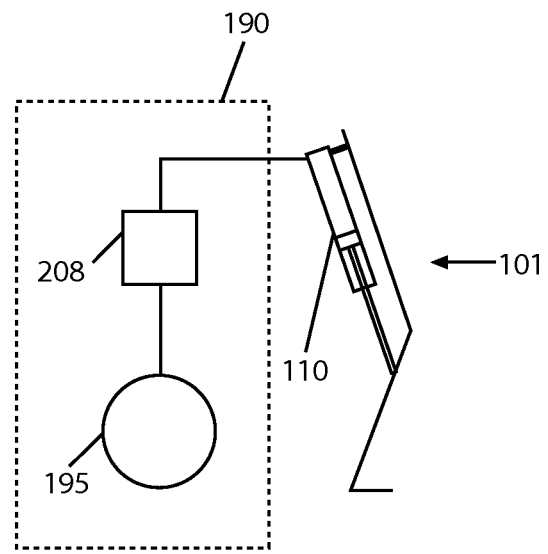
FIG. 36 is a schematic drawing of a knee hydraulic circuit of the present invention.

FIG. 36 shows an embodiment of the invention where knee hydraulic circuit 190 comprises a knee actuated flow-restricting valve 208 connecting right torque generator 110 to a hydraulic reservoir 195. In operation, knee actuated flow-restricting valve 208 restricts the fluid flow during stance phase and allows for minimum resistance fluid flow during the swing phase. Although one reservoir (i.e., reservoir 195) is used to hold hydraulic fluid for both hydraulic circuit 194 and knee hydraulic circuit 190, one can use separate hydraulic reservoirs for hydraulic circuit 194 and knee hydraulic circuit 190.

Figure 37:
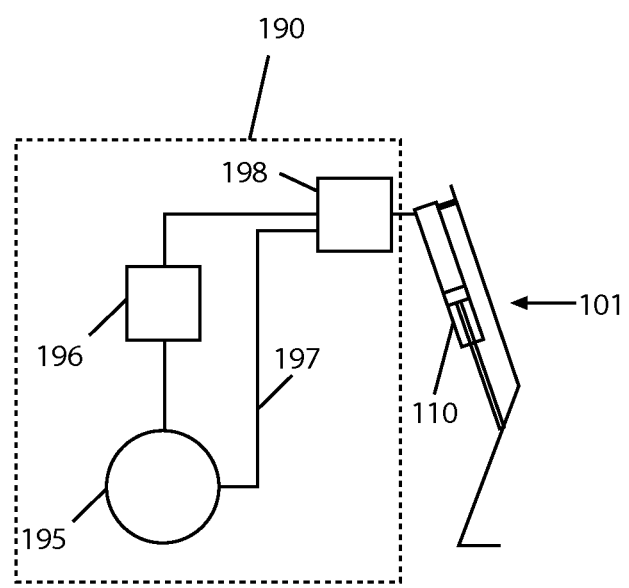
FIG. 37 is a schematic drawing of an alternative knee hydraulic circuit of the present invention including a three-way valve.

FIG. 37 shows an embodiment of the invention where knee hydraulic circuit 190 comprises a hydraulic three-way valve 198 connecting right torque generator 110 to a hydraulic reservoir 195, either through a non-actuated flow restricting valve 196 or a bypass line 197. Hydraulic three-way valve 198 connects right torque generator 110 to hydraulic reservoir 195 through non-actuated flow restricting valve 196 during stance phase, thereby restricting the hydraulic flow and increasing the impedance of right torque generator 110. During swing phase, hydraulic three-way valve 198 connects right torque generator 110 to hydraulic reservoir 195 through bypass line 197, thereby increasing the hydraulic fluid flow and decreasing the impedance of right torque generator 110.

Figure 38:
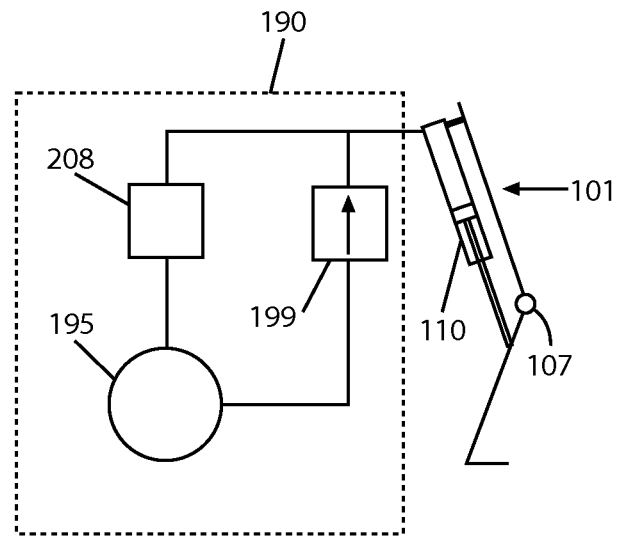
FIG. 38 is a schematic drawing of an alternative knee hydraulic circuit of the present invention including a check valve.

FIG. 38 represents another embodiment of knee hydraulic circuit 190 where a knee actuated flow-restricting valve 208 capable of controlling its orifice size and a check valve 199 connect torque generator 110 to hydraulic, reservoir 195. In operation, during stance phase, signal processor 159 restricts the fluid flow by controlling the orifice of knee actuated flow-restricting valve 208. During swing phase, signal processor 159 opens knee actuated flow-restricting valve 208 and allows for fluid flow to torque generator 110, thereby decreasing the impedance of torque generator 110. Knee actuated flow-restricting valve 208 comprises any valve or combination of valves capable of performing the indicated functions. Examples of knee actuated flow-restricting valve 208 include, without limitation, flow control valves, pressure control valves, and on-off valves. Check valve 199 allows right knee joint 107 to extend easily (no or minimum resistance) at all times.

Figure 39:
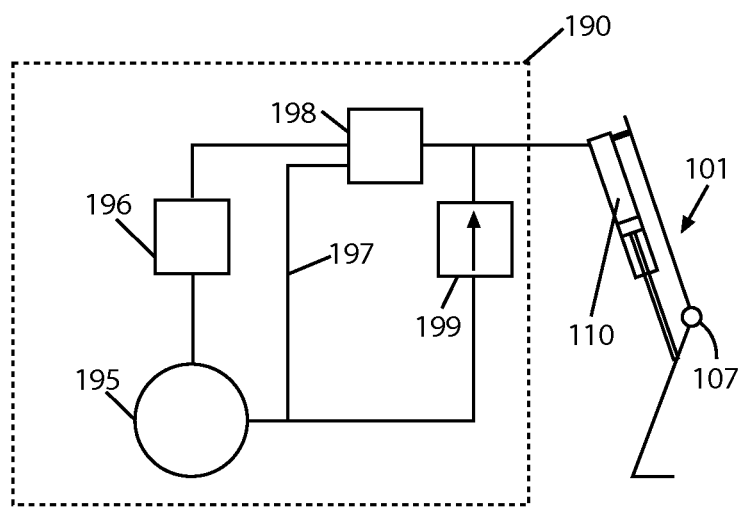
FIG. 39 is a schematic drawing of an alternative knee hydraulic circuit of the present invention including a three-way valve and a check valve.

FIG. 39 represents another embodiment of knee hydraulic circuit 190. This embodiment is similar to the embodiment of FIG. 37 but an additional check valve 199 has been added to allow right knee joint 107 to extend easily (no or minimum resistance) at all times.

Figure 40:
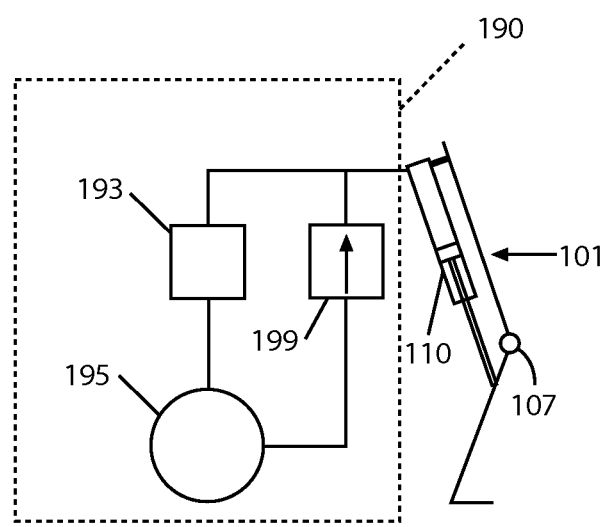
FIG. 40 is a schematic drawing of an alternative knee hydraulic circuit of the present invention including a two-way valve and a check valve.

FIG. 40 represents another embodiment of knee hydraulic circuit 190 where a two-way valve 193 capable of selecting between a set orifice size or fully open orifice, and check valve 199 connect torque generator 110 to hydraulic reservoir 195. During stance phase, signal processor 159 directs the fluid flow to torque generator 110 through the set orifice size of two-way valve 193. During swing phase, signal processor 159 directs the fluid flow to torque generator 110 through the fully open orifice of two-way valve 193. Check valve 199 allows right knee joint 107 to extend easily (no or minimum resistance) at all times.

Figure 41:
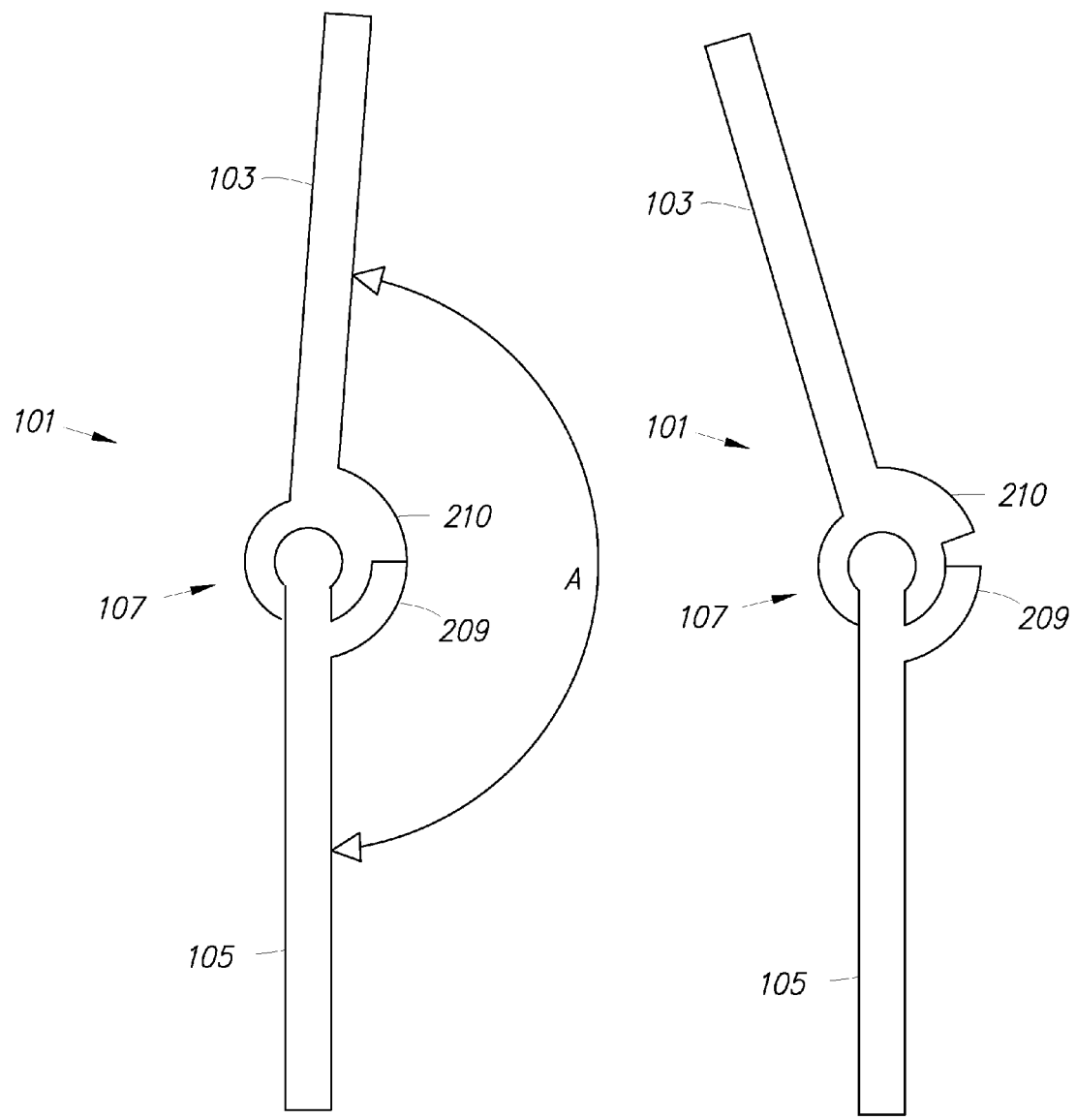
FIG. 41 depicts the function of a locking knee joint in accordance with the present invention.

In some embodiments, leg supports 101 and 102 are configured to allow flexion of the respective knee joints 107 and 108 during the swing phase and to resist flexion of the respective knee joints 107 and 108 during the stance phase by locking the knees. One such locking knee is shown in FIG. 41. FIG. 41 shows right leg support 101 in two configurations. In FIG. 41, right shank link 105 includes a shank stop 209 which bears on thigh stop 210 when the knee is hyperextended. The angle of right knee joint 107 at hyper-extension is illustrated as A in FIG. 41. Since this angle is less than 180 degrees, knee joint 107 or 108 will go "over-center" when approaching hyper-extension, meaning that the knee will tend to lock against the stops if leg supports 101 or 102 is subject to a compressive load, as would be the case for right leg support 101 in the situation illustrated in FIG. 41. One skilled in the art will note that there are many such over-center mechanisms which generally tend to force the load vector on the leg support to pass in front of the knee joint.

Figure 42:
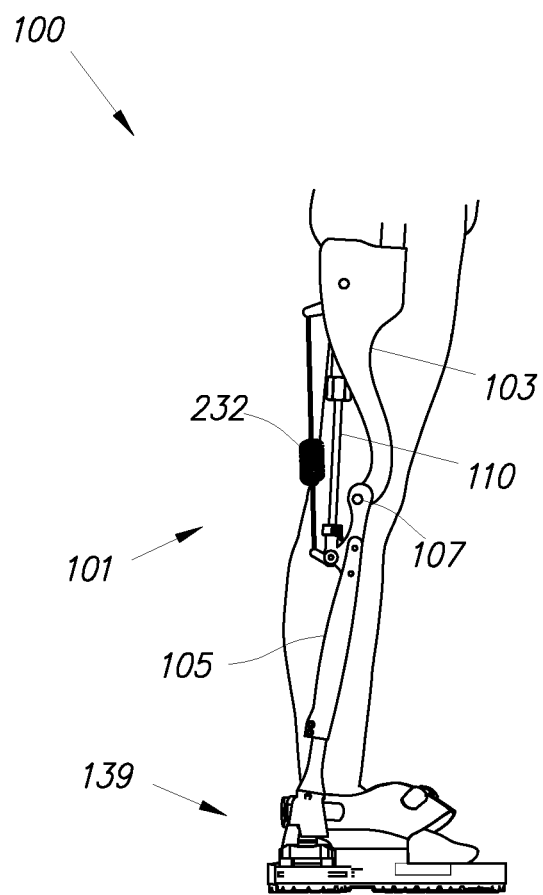
FIG. 42 is a side view of an alternative right leg support of the present invention including knee resilient elements in parallel with torque generators.
Figure 43:
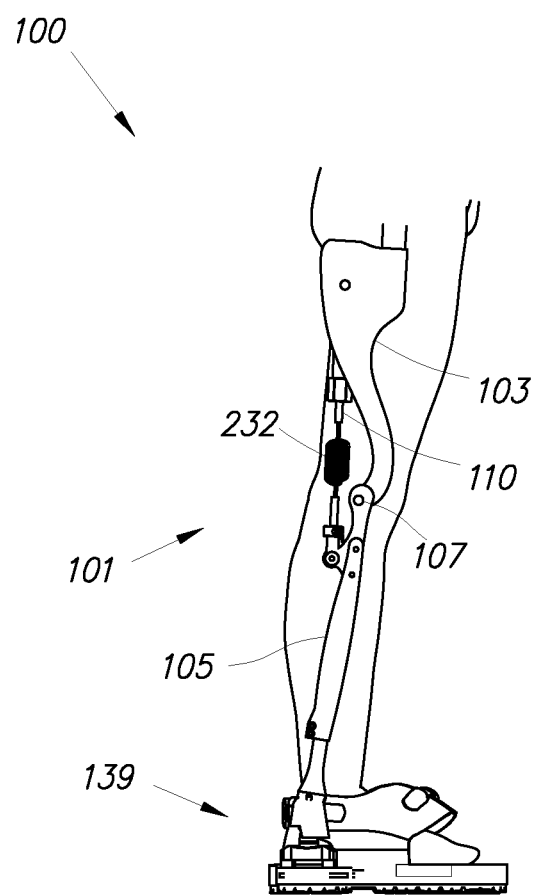
FIG. 43 is a side view of an alternative right leg support of the present invention including knee resilient elements in series with torque generators.

In some embodiments, lower extremity exoskeleton 100 further comprises knee resilient elements 232 which are configured to encourage flexion of knee joints 107 and 108. This decreases the person's effort needed to flex knee joints 107 and 108 during the swing phase. In some embodiments, as shown in FIG. 42, knee resilient elements 232 are in parallel with torque generators 110 and 111. In some embodiments knee resilient elements 232, as shown in FIG. 43, are in series with torque generators 110 and 111. In some embodiments, lower extremity exoskeleton 100 comprises knee resilient elements 232 which are configured to encourage extension of knee joints 107 and 108. One skilled in the art will note that there are many methods and locations for installation of knee resilient element 232 to encourage flexion and/or extension of knee joints 107 and 108. It is further understood that knee resilient elements 232 can also be used with the embodiment of the exoskeleton shown in FIG. 41.

Figure 44:
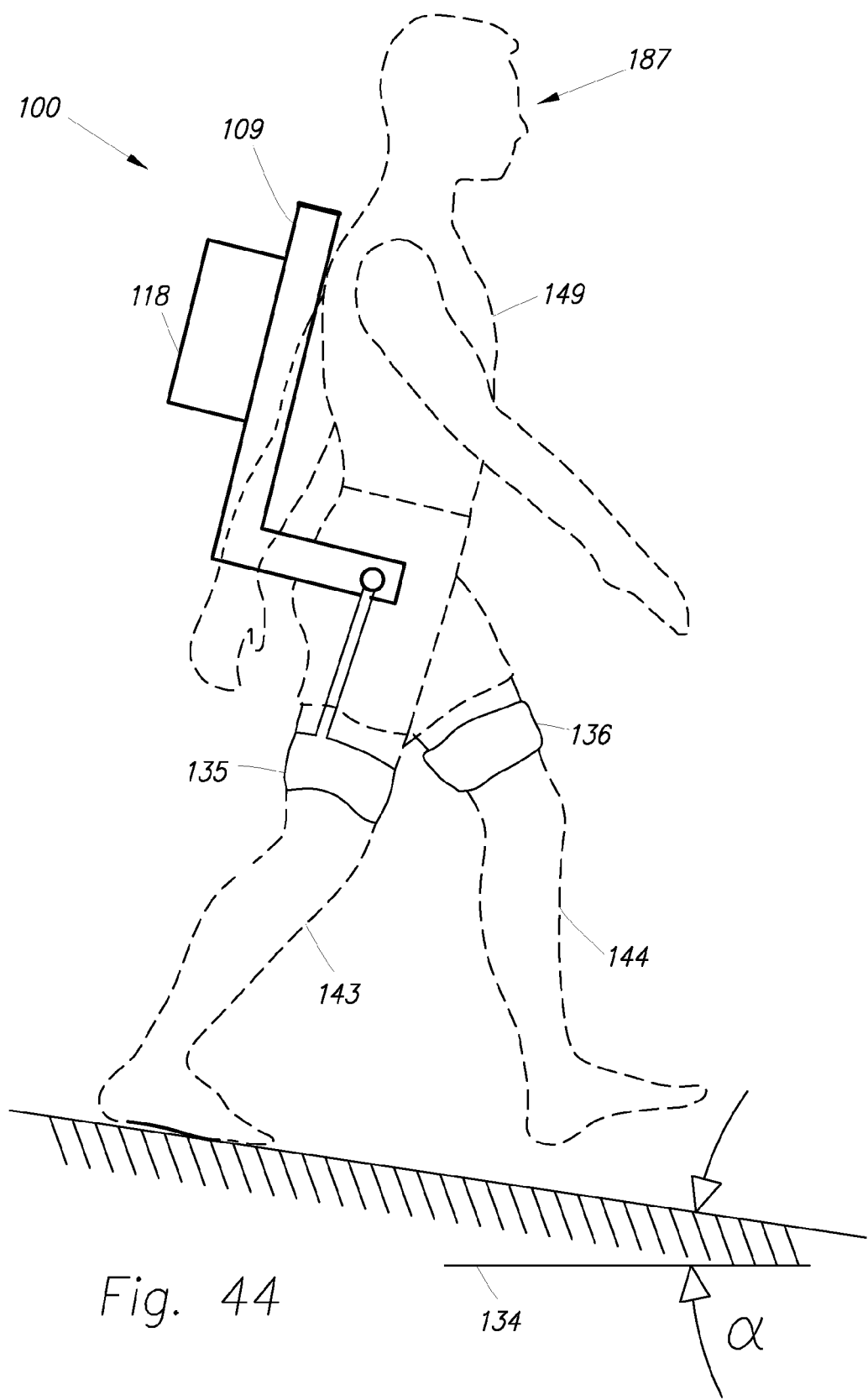
FIG. 44 is a side view of an alternative exoskeleton of the present invention including legs which do not touch the ground.

Although various exemplary embodiments have been described, it will be appreciated by persons skilled in the art that numerous variations and/or modifications may be made to the described device as specifically shown here without departing from the spirit or scope of that broader disclosure. For example, in general, the exoskeleton legs do not have to reach all the way to the ground to decrease the wearer's oxygen consumption. Any leg support including shank links only, as shown in FIG. 44, decrease its wearer's energy expenditure, as long as the force from exoskeleton trunk onto the wearer's upper body is along the person's forward velocity. The mechanical energy transferred to the person during the stance phase will result in an incremental decrease in wearer's energy required for locomotion during the stance phase. An incremental decrease in the wearer's energy required for locomotion leads to less oxygen consumption and a lower heart rate. The various examples are, therefore, to be considered in all respects as illustrative and not restrictive.

The invention claimed is:

1. A method of reducing the energy consumption of a person in motion coupled to an exoskeleton device, the method comprising:
    supplying energy from a power unit of the exoskeleton, which includes said power unit, first and second leg supports rotatably connected to an exoskeleton trunk for attachment to the person's legs, and first and second hip actuators attached to the exoskeleton trunk and the first and second leg supports, to the first hip actuator;
    creating a torque profile;
    imposing a first torque, based on the torque profile, on said first leg support when the first leg support is in a stance phase and the second leg support strikes a support surface so as to also be in a stance phase, with the first torque starting before the first leg support leaves the support surface and enters a swing phase, being in a forward swing direction for the first leg support, and transferring mechanical energy to the person from the first leg support; and
    imposing a second torque on the first leg support, based on the torque profile, in a direction opposite of the forward swing direction when said first leg support subsequently strikes a support surface.

2. The method of claim 1, wherein said first torque rises to a nominal value and stays substantially constant during toe-off of said first leg support.

3. The method of claim 2, wherein said first torque rises to a nominal value and varies no more than fifty percent from said nominal value during double stance and toe-off of said first leg support.

4. The method of claim 1, wherein said first torque is substantially unidirectional.

5. The method of claim 1, wherein said first torque rises to a nominal value and stays within fifty percent of its nominal value during double stance, toe-off, and a majority of a period from toe-off to heel strike of said first leg support.

6. The method of claim 5, wherein said first torque rises to a nominal value and stays within fifty percent of its nominal value then reduces to a value near zero before heel strike occurs.

7. The method of claim 1, wherein said first torque rises to a nominal value and varies no more than fifty percent from said nominal value during a majority of double stance and then transitions to a torque which is calculated from terms including one that is proportional to and in the same direction as an angular velocity of a hip joint of said first leg support.

8. The method of claim 1, wherein said first torque on said first leg support rises to a nominal value and varies no more than fifty percent from said nominal value during a majority of double stance and then transitions to a torque which is calculated from terms including one that is proportional to and in the same direction as an angular velocity of a hip joint of said first leg support and including one that is proportional to the sine of an angle of a thigh link of the first leg support with respect to gravity.

9. A method of controlling an exoskeleton worn by a user, the method comprising:
    supplying energy from at least one power unit of said exoskeleton, which includes first and second leg supports configurable to be coupled to the user's lower limbs, an exoskeleton trunk configurable to be coupled to the user's upper body and rotatably connectable to said first and second leg supports to allow for flexion and extension between each of the first and second leg supports and said exoskeleton trunk, first and second hip actuators configured to create torque between said exoskeleton trunk and respective first and second leg supports, and said at least one power unit providing power to said first and second hip actuators based on at least one created torque profile, to the first hip actuator during at least one segment of a swing phase of the first leg support, wherein the energy is:
a) supplied when both the first and second leg supports are on a supporting surface;
b) initiated before the first leg support leaves the supporting surface; and
c) applied in a forward swing direction, thereby transferring mechanical energy to a lower limb of the user through said first leg support from prior to toe-off and into the swing phase as the lower limb moves in the forward swing direction.

* * * * *